US007003660B2

(12) United States Patent
Vorbach et al.

(10) Patent No.: US 7,003,660 B2
(45) Date of Patent: Feb. 21, 2006

(54) PIPELINE CONFIGURATION UNIT PROTOCOLS AND COMMUNICATION

(75) Inventors: Martin Vorbach, München (DE); Volker Baumgarte, München (DE); Gerd Ehlers, Grasbrunn (DE); Frank May, München (DE); Armin Nückel, Neupotz (DE)

(73) Assignee: PACT XPP Technologies AG, Munich (DE)

(*) Notice: Subject to any disclaimer, the term of this patent is extended or adjusted under 35 U.S.C. 154(b) by 186 days.

(21) Appl. No.: 10/297,959

(22) PCT Filed: Jun. 13, 2001

(86) PCT No.: PCT/EP01/06703

§ 371 (c)(1),
(2), (4) Date: Jun. 19, 2003

(87) PCT Pub. No.: WO02/13000

PCT Pub. Date: Feb. 14, 2002

(65) Prior Publication Data

US 2004/0025005 A1 Feb. 5, 2004

(30) Foreign Application Priority Data

Jun. 13, 2000 (DE) ........................................ 100 28 397
Mar. 5, 2001 (DE) ........................................ 101 10 530

(51) Int. Cl.
*G06F 15/177* (2006.01)

(52) U.S. Cl. ........................... 713/100; 326/37; 326/38; 326/39; 326/40; 326/41; 710/100

(58) Field of Classification Search ................. 713/100; 710/100; 326/37, 38, 39, 40, 41
See application file for complete search history.

(56) References Cited

U.S. PATENT DOCUMENTS 2,067,477 A 1/1937 Cooper
3,242,998 A 3/1966 Gubbins (Continued)

FOREIGN PATENT DOCUMENTS

DE 42 21 278 1/1994
DE 196 51 075 6/1998

(Continued)

OTHER PUBLICATIONS

Arabi et al., "PLD Integrates Dedicated High-speed Data Buffering, Complex State Machine, and Fast Decode Array," conference record on WESCON '93, Sep. 28, 1993, pp. 432–436.

(Continued)

*Primary Examiner*—A. Elamin
(74) *Attorney, Agent, or Firm*—Kenyon & Kenyon

(57) ABSTRACT

An example method of controlling a data processing system having a cellular structure. The method includes transmitting a first configuration word to a first processing unit in the cellular structure. The method also includes processing data with the first processing unit in accordance with the first configuration word. The method also includes transmitting a second configuration word to the first processing unit. The method also includes transmitting a reconfiguration signal to the first unit, the reconfiguration signal indicating that the first unit should begin processing data in accordance with the second configuration word. If the first processing unit has completed processing data in accordance with the first configuration word prior to when the reconfiguration signal is received by the first processing unit, data may be processed by the first processing unit in accordance with the second configuration word. If the first processing unit has not completed processing data in accordance with the first configuration word, data may continue to be processed with the first processing unit in accordance with the first configuration word.

20 Claims, 22 Drawing Sheets

Figure 3:
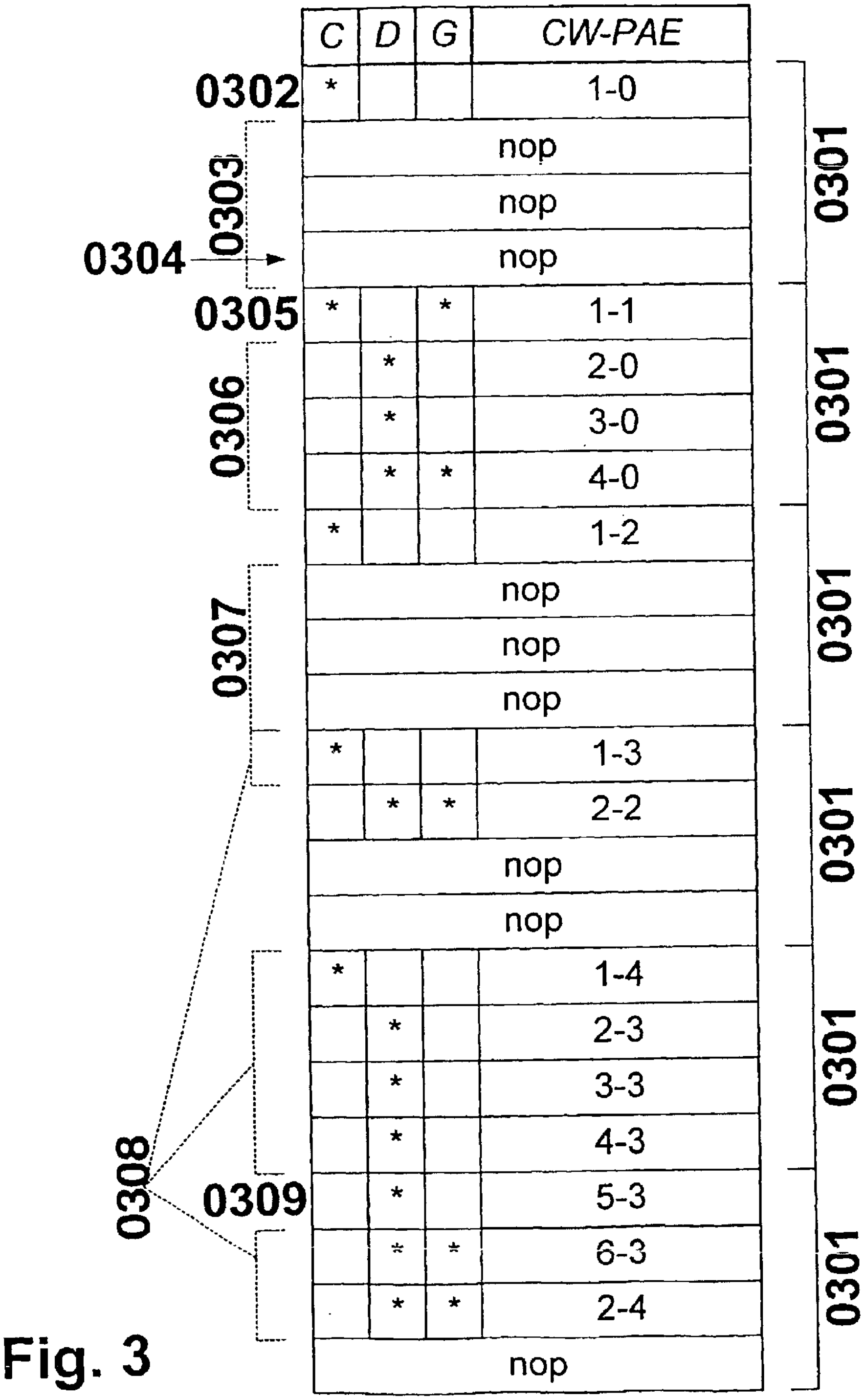

| C | D | G | CW-PAE |
|---|---|---|---|
| * | | | 1-0 |
| | * | | 2-0 |
| | * | | 3-0 |
| | * | * | 4-0 |
| * | | * | 1-1 |
| * | | | 1-2 |
| | * | * | 2-2 |
| * | | | 1-3 |
| | * | | 2-3 |
| | * | | 3-3 |
| | * | | 4-3 |
| | * | * | 5-3 |

0101

U.S. PATENT DOCUMENTS 3,681,578 A 8/1972 Stevens
3,757,608 A 9/1973 Willner
3,855,577 A 12/1974 Vandierendonck
4,498,172 A 2/1985 Bhavsar
4,566,102 A 1/1986 Hefner
4,591,979 A 5/1986 Iwashita
4,663,706 A 5/1987 James et al.
4,682,284 A 7/1987 Schrofer
4,706,216 A 11/1987 Carter
4,720,780 A 1/1988 Dolecek
4,739,474 A 4/1988 Holsztynski
4,761,755 A 8/1988 Ardini et al.
4,811,214 A 3/1989 Nosenchuck et al.
4,852,043 A 7/1989 Guest
4,852,048 A 7/1989 Morton
4,860,201 A 8/1989 Miranker et al.
4,870,302 A 9/1989 Freeman
4,891,810 A 1/1990 de Corlieu et al.
4,901,268 A 2/1990 Judd
4,910,665 A 3/1990 Mattheyses et al.
4,967,340 A 10/1990 Dawes
5,014,193 A 5/1991 Garner et al.
5,015,884 A 5/1991 Agrawal et al.
5,021,947 A 6/1991 Campbell et al.
5,023,775 A 6/1991 Poret
5,043,978 A 8/1991 Nagler et al.
5,047,924 A 9/1991 Matsubara et al.
5,065,308 A 11/1991 Evans
5,081,375 A 1/1992 Pickett et al.
5,109,503 A 4/1992 Cruickshank et al.
5,113,498 A 5/1992 Evan et al.
5,115,510 A 5/1992 Okamoto et al.
5,123,109 A 6/1992 Hillis
5,125,801 A 6/1992 Nabity et al.
5,128,559 A 7/1992 Steele
5,142,469 A 8/1992 Weisenborn
5,144,166 A 9/1992 Camarota et al.
5,193,202 A 3/1993 Lee et al.
5,203,005 A 4/1993 Horst
5,204,935 A 4/1993 Mihara et al.
5,208,491 A 5/1993 Ebeling et al.
5,226,122 A 7/1993 Thayer et al.
RE34,363 E 8/1993 Freeman
5,233,539 A 8/1993 Agrawal et al.
5,247,689 A 9/1993 Ewert
5,274,593 A 12/1993 Proebsting
5,287,472 A 2/1994 Horst
5,294,119 A 3/1994 Vincent et al.
5,301,284 A 4/1994 Estes et al.
5,301,344 A 4/1994 Kolchinsky
5,303,172 A 4/1994 Magar et al.
5,336,950 A 8/1994 Popli et al.
5,347,639 A 9/1994 Rechtschaffen et al.
5,349,193 A 9/1994 Mott et al.
5,353,432 A 10/1994 Richek et al.
5,361,373 A * 11/1994 Gilson ........................... 712/1
5,379,444 A 1/1995 Mumme
5,410,723 A 4/1995 Schmidt et al.
5,418,952 A 5/1995 Morley et al.
5,421,019 A 5/1995 Holsztynski et al.
5,422,823 A 6/1995 Agrawal et al.
5,425,036 A 6/1995 Liu et al.
5,426,378 A 6/1995 Ong
5,428,526 A 6/1995 Flood et al.
5,430,687 A 7/1995 Hung et al.
5,440,245 A 8/1995 Galbraith et al.
5,440,538 A 8/1995 Olsen et al.
5,442,790 A 8/1995 Nosenchuck
5,444,394 A 8/1995 Watson et al.
5,448,186 A 9/1995 Kawata
5,455,525 A 10/1995 Ho et al.
5,457,644 A 10/1995 McCollum
5,465,375 A 11/1995 Thepaut et al.
5,473,266 A 12/1995 Ahanin et al.
5,473,267 A 12/1995 Stansfield
5,475,583 A 12/1995 Bock et al.
5,475,803 A 12/1995 Stearns et al.
5,475,856 A 12/1995 Kogge
5,483,620 A 1/1996 Pechanek et al.
5,485,103 A 1/1996 Pedersen et al.
5,485,104 A 1/1996 Agrawal et al.
5,489,857 A 2/1996 Agrawal et al.
5,491,353 A 2/1996 Kean
5,493,239 A 2/1996 Zlotnick
5,497,498 A 3/1996 Taylor
5,506,998 A 4/1996 Kato et al.
5,510,730 A 4/1996 El Gamal et al.
5,511,173 A 4/1996 Yamaura et al.
5,513,366 A 4/1996 Agarwal et al.
5,521,837 A 5/1996 Frankle et al.
5,522,083 A 5/1996 Gove et al.
5,530,873 A 6/1996 Takano
5,530,946 A 6/1996 Bouvier et al.
5,532,693 A 7/1996 Winters et al.
5,532,957 A 7/1996 Malhi
5,535,406 A 7/1996 Kolchinsky
5,537,057 A 7/1996 Leong et al.
5,537,601 A 7/1996 Kimura et al.
5,541,530 A 7/1996 Cliff et al.
5,544,336 A 8/1996 Kato et al.
5,548,773 A 8/1996 Kemeny et al.
5,555,434 A 9/1996 Carlstedt
5,559,450 A 9/1996 Ngai et al.
5,561,738 A 10/1996 Kinerk et al.
5,570,040 A 10/1996 Lytle et al.
5,574,930 A 11/1996 Halverson, Jr. et al.
5,583,450 A 12/1996 Trimberger et al.
5,586,044 A 12/1996 Agrawal et al.
5,587,921 A 12/1996 Agrawal et al.
5,588,152 A 12/1996 Dapp et al.
5,590,345 A 12/1996 Barker et al.
5,590,348 A 12/1996 Phillips et al.
5,596,742 A 1/1997 Agarwal et al.
5,600,265 A 2/1997 El Gamal Abbas et al.
5,600,845 A * 2/1997 Gilson ......................... 712/39
5,611,049 A 3/1997 Pitts
5,617,547 A 4/1997 Feeney et al.
5,625,806 A 4/1997 Kromer
5,634,131 A 5/1997 Matter et al.
5,649,176 A 7/1997 Selvidge et al.
5,649,179 A 7/1997 Steenstra et al.
5,652,894 A 7/1997 Hu et al.
5,655,069 A 8/1997 Ogawara et al.
5,655,124 A 8/1997 Lin
5,657,330 A 8/1997 Matsumoto
5,659,797 A 8/1997 Zandveld et al.
5,675,743 A 10/1997 Mavity
5,680,583 A 10/1997 Kuijsten
5,713,037 A 1/1998 Wilkinson et al.
5,717,943 A 2/1998 Barker et al.
5,732,209 A 3/1998 Vigil et al.
5,734,921 A 3/1998 Dapp et al.
5,742,180 A 4/1998 Detton et al.
5,748,872 A 5/1998 Norman
5,754,827 A 5/1998 Barbier et al.
5,754,871 A 5/1998 Wilkinson et al.
5,760,602 A 6/1998 Tan
5,761,484 A 6/1998 Agarwal et al.
5,773,994 A 6/1998 Jones
5,778,439 A 7/1998 Timberger et al.
5,784,636 A 7/1998 Rupp

| | | | | |
|---|---|---|---|---|
| 5,794,059 | A | | 8/1998 | Barker et al. |
| 5,794,062 | A | | 8/1998 | Baxter |
| 5,801,715 | A | | 9/1998 | Norman |
| 5,802,290 | A | | 9/1998 | Casselman |
| 5,828,229 | A | | 10/1998 | Cliff et al. |
| 5,828,858 | A | | 10/1998 | Athanas et al. |
| 5,838,165 | A | * | 11/1998 | Chatter ........................ 326/38 |
| 5,844,888 | A | | 12/1998 | Narjjyka |
| 5,848,238 | A | | 12/1998 | Shimomura et al. |
| 5,854,918 | A | | 12/1998 | Baxter |
| 5,859,544 | A | | 1/1999 | Norman |
| 5,865,239 | A | | 2/1999 | Carr |
| 5,867,691 | A | | 2/1999 | Shiraishi |
| 5,867,723 | A | | 2/1999 | Peters et al. |
| 5,884,075 | A | | 3/1999 | Hester et al. |
| 5,887,162 | A | | 3/1999 | Williams et al. |
| 5,887,165 | A | * | 3/1999 | Martel et al. ............... 713/100 |
| 5,889,982 | A | | 3/1999 | Rodgers et al. |
| 5,892,370 | A | | 4/1999 | Eaton et al. |
| 5,892,961 | A | | 4/1999 | Trimberger |
| 5,936,424 | A | | 4/1999 | Young et al. |
| 5,901,279 | A | | 5/1999 | Davis, III |
| 5,915,123 | A | | 6/1999 | Mirsky et al. |
| 5,924,119 | A | | 7/1999 | Sindhu et al. |
| 5,927,423 | A | | 7/1999 | Wada et al. |
| 5,943,242 | A | | 8/1999 | Vorbach et al. |
| 5,956,518 | A | | 9/1999 | DeHon et al. |
| 5,966,534 | A | | 10/1999 | Cooke et al. |
| 5,970,254 | A | | 10/1999 | Cooke et al. |
| 5,978,260 | A | * | 11/1999 | Trimberger et al. ........ 365/182 |
| 6,011,407 | A | * | 1/2000 | New ........................... 326/39 |
| 6,014,509 | A | | 1/2000 | Furtek et al. |
| 6,020,758 | A | * | 2/2000 | Patel et al. ................... 326/40 |
| 6,021,490 | A | | 2/2000 | Vorbach et al. |
| 6,023,742 | A | | 2/2000 | Ebeling et al. |
| 6,034,538 | A | | 3/2000 | Abramovici |
| 6,038,650 | A | | 3/2000 | Vorbach et al. |
| 6,038,656 | A | | 3/2000 | Cummings et al. |
| 6,047,115 | A | | 4/2000 | Mohan et al. |
| 6,049,222 | A | | 4/2000 | Lawman |
| 6,052,773 | A | | 4/2000 | DeHon et al. |
| 6,054,873 | A | | 4/2000 | Laramie |
| 6,081,903 | A | | 6/2000 | Vorbach et al. |
| 6,085,317 | A | | 7/2000 | Smith |
| 6,088,795 | A | | 7/2000 | Vorbach et al. |
| 6,092,174 | A | | 7/2000 | Roussakov |
| 6,105,105 | A | | 8/2000 | Trimberger |
| 6,108,760 | A | | 8/2000 | Mirsky et al. |
| 6,119,181 | A | | 9/2000 | Vorbach et al. |
| 6,122,719 | A | | 9/2000 | Mirsky et al. |
| 6,125,408 | A | | 9/2000 | McGee et al. |
| 6,127,908 | A | | 10/2000 | Bozler et al. |
| 6,150,837 | A | * | 11/2000 | Beal et al. .................... 326/39 |
| 6,150,839 | A | * | 11/2000 | New et al. .................... 326/40 |
| 6,172,520 | B1 | | 1/2001 | Lawman et al. |
| 6,202,182 | B1 | | 3/2001 | Abramovici et al. |
| 6,240,502 | B1 | * | 5/2001 | Panwar et al. ................ 712/15 |
| 6,243,808 | B1 | | 6/2001 | Wang |
| 6,260,179 | B1 | | 7/2001 | Ohsawa et al. |
| 6,263,430 | B1 | | 7/2001 | Trimberger et al. |
| 6,279,077 | B1 | | 8/2001 | Nasserbakht et al. |
| 6,282,627 | B1 | | 8/2001 | Wong et al. |
| 6,288,566 | B1 | | 9/2001 | Hanrahan et al. |
| 6,289,440 | B1 | | 9/2001 | Casselman |
| 6,298,472 | B1 | | 10/2001 | Phillips et al. |
| 6,311,200 | B1 | | 10/2001 | Hanrahan et al. |
| 6,321,366 | B1 | | 11/2001 | Tseng et al. |
| 6,338,106 | B1 | | 1/2002 | Vorbach et al. |
| 6,341,318 | B1 | | 1/2002 | Dakhil |
| 6,347,346 | B1 | | 2/2002 | Taylor |
| 6,349,346 | B1 | | 2/2002 | Hanrahan et al. |
| 6,370,596 | B1 | | 4/2002 | Dakhil |
| 6,378,068 | B1 | | 4/2002 | Foster et al. |
| 6,389,379 | B1 | | 5/2002 | Lin et al. |
| 6,389,579 | B1 | | 5/2002 | Phillips et al. |
| 6,392,912 | B1 | | 5/2002 | Hanrahan et al. |
| 6,404,224 | B1 | * | 6/2002 | Azegami et al. .............. 326/38 |
| 6,405,299 | B1 | | 6/2002 | Vorbach et al. |
| 6,421,817 | B1 | | 7/2002 | Mohan et al. |
| 6,425,068 | B1 | | 7/2002 | Vorbach et al. |
| 6,457,116 | B1 | | 9/2002 | Mirsky et al. |
| 6,477,643 | B1 | | 11/2002 | Vorbach et al. |
| 6,480,937 | B1 | | 11/2002 | Vorbach et al. |
| 6,480,954 | B1 | * | 11/2002 | Trimberger et al. ........... 713/1 |
| 6,496,971 | B1 | * | 12/2002 | Lesea et al. .................. 716/16 |
| 6,513,077 | B1 | | 1/2003 | Vorbach et al. |
| 6,519,674 | B1 | | 2/2003 | Lam et al. |
| 6,526,520 | B1 | | 2/2003 | Vorbach et al. |
| 6,697,979 | B1 | | 2/2003 | Vorbach et al. |
| 6,538,468 | B1 | | 3/2003 | Moore |
| 6,539,477 | B1 | | 3/2003 | Seawright |
| 6,542,998 | B1 | | 4/2003 | Vorbach et al. |
| 6,571,381 | B1 | | 5/2003 | Vorbach et al. |
| 6,657,457 | B1 | | 12/2003 | Hanrahan et al. |
| 6,687,788 | B1 | | 2/2004 | Vorbach et al. |
| 6,704,816 | B1 | * | 3/2004 | Burke ........................ 710/100 |
| 6,717,436 | B1 | * | 4/2004 | Kress et al. .................. 326/40 |
| 2002/0038414 | A1 | | 3/2002 | Taylor et al. |
| 2002/0143505 | A1 | | 10/2002 | Drusinsky |
| 2002/0144229 | A1 | | 10/2002 | Hanrahan |
| 2002/0165886 | A1 | | 11/2002 | Larn |
| 2003/0014743 | A1 | | 1/2003 | Cooke et al. |
| 2003/0046607 | A1 | | 3/2003 | Vorbach |
| 2003/0052711 | A1 | | 3/2003 | Taylor et al. |
| 2003/0055861 | A1 | | 3/2003 | Lai et al. |
| 2003/0056085 | A1 | | 3/2003 | Vorbach |
| 2003/0056091 | A1 | | 3/2003 | Greenberg |
| 2003/0056202 | A1 | | 3/2003 | Vorbach |
| 2003/0093662 | A1 | | 5/2003 | Vorbach et al. |
| 2003/0097513 | A1 | | 5/2003 | Vorbach et al. |
| 2003/0123579 | A1 | | 7/2003 | Safavi et al. |
| 2003/0135686 | A1 | | 7/2003 | Vorbach et al. |
| 2004/0015899 | A1 | | 1/2004 | May et al. |
| 2004/0025005 | A1 | | 2/2004 | Vorbach et al. |

FOREIGN PATENT DOCUMENTS

| | | | |
|---|---|---|---|
| DE | 196 54 593 | A | 7/1998 |
| DE | 196 54 595 | | 7/1998 |
| DE | 196 54 846 | A | 7/1998 |
| DE | 197 04 044 | | 8/1998 |
| DE | 197 04 728 | A | 8/1998 |
| DE | 197 04 742 | | 9/1998 |
| DE | 198 07 872 | A | 8/1999 |
| DE | 198 61 088 | | 2/2000 |
| DE | 199 26 538 | | 12/2000 |
| DE | 44 16 881 | | 12/2001 |
| DE | 100 28 397 | | 2/2002 |
| DE | 100 36 627 | | 4/2002 |
| DE | 101 29 237 | | 4/2002 |
| DE | 102 04 044 | | 8/2003 |
| EP | 0 221 360 | | 5/1987 |
| EP | 0 428 327 | | 5/1991 |
| EP | 0 477 809 | | 4/1992 |
| EP | 0 539 595 | | 5/1993 |
| EP | 0 628 917 | | 12/1994 |
| EP | 0 678 985 | | 10/1995 |
| EP | 0 686 915 | | 12/1995 |
| EP | 0 707 269 | | 4/1996 |
| EP | 0 735 685 | | 10/1996 |
| EP | 0 835 685 | | 10/1996 |
| EP | 0 748 051 | | 12/1996 |
| EP | 0 726 532 | | 7/1998 |

| | | |
|---|---|---|
| EP | 0 926 594 | 6/1999 |
| EP | 1 102 674 | 7/1999 |
| WO | WO90/04835 | 5/1990 |
| WO | WO90/11648 | 10/1990 |
| WO | WO93/11503 | 6/1993 |
| WO | WO94/08399 | 4/1994 |
| WO | WO95/00161 | 1/1995 |
| WO | WO95/26001 | 9/1995 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35299 | 8/1998 |
| WO | WO99/32975 | 7/1999 |
| WO | WO99/40522 | 8/1999 |
| WO | WO99/44120 | 9/1999 |
| WO | WO99/44147 | 9/1999 |
| WO | WO 00 17771 A | 3/2000 |
| WO | WO00/77652 | 12/2000 |
| WO | WO02/13000 | 2/2002 |
| WO | WO02/21010 | 3/2002 |
| WO | WO02/29600 | 4/2002 |
| WO | WO02/71248 | 9/2002 |
| WO | WO02/71249 | 9/2002 |
| WO | WO02/103532 | 12/2002 |
| WO | WO03/17095 | 2/2003 |
| WO | WO03/23616 | 3/2003 |
| WO | WO03/25781 | 3/2003 |
| WO | WO03/32975 | 4/2003 |
| WO | WO03/36507 | 5/2003 |

OTHER PUBLICATIONS

Ade et al., "Minimum Memory Buffers in DSP Applications," Electronics Letters, vol. 30, No. 6, Mar. 17, 1994, pp. 469–471.

Villasenor, John et al., "Configurable Computing,"*Scientific American,* vol. 276, No. 6, Jun. 1997, pp. 66–71.

Villasenor, John et al., "Configurable Computing Solutions for Automatic Target Recognition,"*IEEE,* 1996 pp. 70–79.

Tau, Edward et al., "A First Generation DPGA Implementation,"*FPD'95,* pp. 138–143.

Athanas, Peter et al., "IEEE Symposium on FPGAs For Custom Computing Machines,"*IEEE Computer Society Press,* Apr. 19–21, 1995, pp. i–vii, 1–222.

Athanas, Peter et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397–400.

Bittner, Ray A. Jr., "Wormhole Run–time Reconfiguration: Conceptualization and VLSI Design of a High Performance Computing System,"*Dissertation,* Jan. 23, 1997, pp. I–XX, I–415.

Myers, G. "Advances in Computer Architecture," Wiley–Interscience Publication, 2nd ed., John Wiley & Sons, Inc. pp. 463–494, 1978.

M. Saleeba, "A Self–Contained Dynamically Reconfigurable Processor Architecture," Sixteenth Australian Computer Science Conference, ASCS–16, QLD, Australia, Feb., 1993.

M. Morris Mano, "Digital Design," by Prentice Hall, Inc., Englewood Cliffs, New Jersey 07632, 1984, pp. 119–125, 154–161.

Maxfield, C. "Logic that Mutates While–U–Wait" EDN (Bur. Ed) (USA), EDN (European Edition), Nov. 7, 1996, Cahners Publishing, USA.

Norman, Richard S., "Hyperchip Business Summary, The Opportunity," Jan. 31, 2000, pp., 1–3.

Ferrante J. et al., "The Program Dependence Graph and its Use in Optimization ACM Transactions on Programming Languages and Systems," Jul. 1987, USA, [online] Bd. 9, Nr., 3, pp. 319–349, XP002156651 ISSN: 0164–0935 ACM Digital Library.

Hwang L. et al., "Min–cut Replication in Partitioned Networks" IEEE Transactions on Computer–Aided Design of Integrated Circuits and Systems, [online] Bd. 14, Nr. 1, Jan. 1995, pp. 96–106, XP00053228 USA ISSN: 0278–0070 IEEE Xplore.

Baumgarte, V., et al., PACT XPP "A Self–reconfigurable Data Processing Architecture," PACT Info. GMBH, Munchen Germany 2001.

Jantsch, Axel et al., "A Case Study on Hardware/software Partitioning," Royal Institute of Technology, Kista, Sweden, Apr. 10, 1994 IEEE, pp. 111–118.

Becker, J. et al., "Parallelization in Co–compilation for Configurable Accelerators—a Host/accelerator Partitioning Compilation Method," proceedings of Asia and South Pacific Design Automation Conference, Yokohama, Japan, Feb. 10–13, 1998.

Isshiki, Tsuyoshi et al., "Bit–Serial Pipeline Synthesis for Multi–FPGA Systems with C++Design Capture," 1996 IEEE, pp. 38–47.

Weinhardt, Markus, "Ubersetzingsmethoden fur strukturprogrammierbare rechner," Dissertation for Doktors der Ingenieurwissenschaften der Universitat Karlsruhe: Jul. 1, 1997.

Hammes, Jeff et al., "Cameron: High Level Language Compilation for Reconfigurable Systems," Department of Computer Science, Colorado State University, Conference on Parallel Architectures and Compilation Techniques, Oct. 12–16, 1999.

K. Wada et al., "A Performance Evaluation of Tree–based Coherent Distributed Shared Memory" Proceedings of the Pacific RJM Conference on Communications, Comput and Signal Processing, Victoria, May 19–21 1993.

Nilsson et al., "The Scalable Tree Protocol—A Cache Coherence Approaches for Large–Scale Multiprocessors" IEEE, pp. 498–506, Dec. 1992.

Wu et al., "A New Cache Directory Scheme", IEEE, pp 466–472, Jun. 1996.

Hauck "The Roles of FPGA's in Reprogrammable Systems," IEEE, Apr. 1998, pp. 615–638.

Wittig et al., "OneChip: An FPGA Processor with Reconfigurable Logic" IEEE, 1996 pp. 126–135.

Cadambi et al., "Managing Pipeline–reconfigurable FPGAs," ACM, 1998, pp. 55–64.

Hong Yu Xu et al., "Parallel QR Factorization on a Block Data Flow Architecture" Conference Proceeding Article, Mar. 1, 1992, pages 332–336 XPO10255276, page 333, Abstract 2.2, 2.3, 2.4—page 334.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157–1666.

Weinhardt, M. "Compilation Methods for Structure–programmable Computers", dissertation, ISBN 3–89722–011–3, 1997.

Cardoso, J.M.P., "Compilation of Java™Algorithms onto Reconfigurable Computing Systems with Exploitation of Operation–Level Parallelism," Ph.D. Thesis, Universidade Tecnica de Lisboa (UTL), Lisbon, Portugal Oct. 2000 (English Abstract included).

Kung, "Deadlock Avoidance for Systolic Communication", 1988 Conference Proceedings of 15$^{th}$Annual International Symposium on Computer Architecture, May 30, 1988, pp. 252–260.

TMS320C54X DSP: CPU and Peripherals, Texas Instruments, 1996, pp. 6–26 to 6–46.

TMS320C54x DSP: Mnemonic Instruction Set, Texas Instruments, 1996, p. 4–64.

XLINX, "Logic Cell Array Families: XC4000, XC4000A and XC4000H", product description, pages 2–7 to 2–15, Additional XC3000, XC31000 and XC3100A Data, pages 8–16 and 9–14.

Miller, Michael J. et al., "High–Speed FIFOs Contend with Widely Differing Data Rates: Dual–port RAM Buffer and Dual–pointer System Provide Rapid, High–density Data Storage and Reduce Overhead", Computer Design, Sep. 1, 1985, pp. 83–86.

Forstner, Peter "Wer Zuerst Kommt, Mahlt Zuerst!: Teil 3: Einsatzgebiete und Anwendungsbeispiele von FIFO–Speichem", Elektronik, Aug. 2000, pp. 104–109.

John R. Hauser et al., "Garp: A MIPS Processor with a Reconfigurable Coprocessor", University of California, Berkeley, IEEE, 1997, pp. 12–21.

Jorg Donandt, "Improving Response Time of Programmable Logic Controllers by Use of a Boolean Coprocessor", AEG Research Institute Berlin, IEEE, 1989, pages 4–167–4–169.

Alexandre F. Tenca et al., "A Variable Long–Precision Arithmetic Unit Design for Reconfigurable Coprocessor Architectures", University of California, Los Angeles, 1998, pp. 216–225.

Andreas Koch et al, "Practical Experiences with the SPARXIL Co–Processor", 1998, IEEE, pp. 394–398.

Gokhale M. B. et al., "Automatic Allocation of Arrays to Memories in FPGA processors with Multiple Memory Banks", Field–Programmable Custom Computing Machines, 1999, IEEE, pp. 63–67.

Christian Siemers, "Rechenfabrik Ansaetze Fuer Extrem Parallele Prozessoren", Verlag Heinze Heise GmbH., Hannover, DE No. 15, Jul. 16, 2001, pp. 170–179.

Pedro Diniz et al., "Automatic Synthesis of Data Storage and Control Structures for FPGA–based Computing Engines", 2000, IEEE, pp. 91–100.

Markus Weinhardt et al., "Pipeline Vectorization for Reconfigurable Systems", 1999, IEEE, pp. 52–60.

Lizy John et al., "A Dynamically Reconfigurable Interconnect for Array Processors", vol. 6, No. 1, Mar. 1998, IEEE, pp. 150–157.

Fineberg, Samuel et al., "Experimental Analysis of a Mixed–Mode Parallel Architecture Using Bitonic Sequence Sorting", vol. 11. No. 3, Mar. 1991, pp. 239–251.

* cited by examiner

0101

| C | D | G | CW-PAE |
|---|---|---|---|
| * | | | 1-0 |
| | * | | 2-0 |
| | * | | 3-0 |
| | * | * | 4-0 |
| * | | * | 1-1 |
| * | | | 1-2 |
| | * | * | 2-2 |
| * | | | 1-3 |
| | * | | 2-3 |
| | * | | 3-3 |
| | * | | 4-3 |
| | * | * | 5-3 |

Fig. 1

| C | D | G | CW-PAE |
|---|---|---|---|
| * | | | 1-0 |
| * | | | 1-1 |
| * | | | 1-2 |
| * | | | 1-3 |
| | * | | 2-0 |
| | * | | 3-0 |
| | * | | 2-3 |
| | * | | 3-3 |
| | * | | 4-3 |
| | * | * | 4-0 |
| | | * | 1-1 |
| | * | * | 2-2 |
| | * | * | 5-3 |

0202

0201

0203

Fig. 2

PIPELINE CONFIGURATION UNIT PROTOCOLS AND COMMUNICATION

Example embodiments of the present invention include methods which permit efficient configuration and reconfiguration of one or more reconfigurable subassemblies by one or more configuration units (CT) at high frequencies. An efficient and synchronized network may be created to control multiple CTs.

A subassembly or cell may include conventional FPGA cells, bus systems, memories, peripherals and ALUs as well as arithmetic units of processors. A subassembly may be any type of configurable and reconfigurable elements. For parallel computer systems, a subassembly may be a complete node of any function, e.g., the arithmetic, memory or data transmission functions.

The example method described here may be used in particular for integrated modules having a plurality of subassemblies in a one-dimensional or multidimensional arrangement, interconnected directly or through a bus system.

"Modules" may include systolic arrays, neural networks, multiprocessor systems, processors having multiple arithmetic units and logic cells, as well as known modules of the types FPGA, DPGA, XPUTER, etc.

For example, modules of an architecture whose arithmetic units and bus systems are freely configurable are used. An example architecture has been described in German Patent 4416881 as well as PACT02, PACT08, PACT10, PACT13. This architecture is referred to below as VPU. This architecture may include any desired arithmetic cells, logic cells (including memories) or communicative (IO) cells ("PAEs"), which may be arranged in a one-dimensional or multidimensional matrix "processing array" or "PA". The matrix may have different cells of any design. The bus systems may also have a cellular structure. The matrix as a whole or parts thereof may be assigned a configuration unit (CT) which influences the interconnections and function of the PA.

A special property of VPUs is the automatic and deadlock-free reconfiguration at run time. Protocols and methods required for have been described in PACT04, 05, 08, 10 and 13, the full content of which is included here through this reference. The publication numbers for these internal file numbers can be found in the addendum.

DESCRIPTION OF THE EXAMPLE EMBODIMENTS

Example Initial States of PAEs and Bus Protocol of the Configuration

Each PAE may be allocated states that may influence configurability. These states may be locally coded or may be managed through one or more switch groups, in particular the CT itself. A PAE may have at least two states:

"Not configured"—In this state, the PAE is inactive and is not processing any data and/or triggers. The PAE does not receive any data and/or triggers, nor does it generate any data and/or triggers. Only data and/or triggers relevant to the configuration may be received and/or processed. The PAE is completely neutral and may be configured. Registers for the data and/or triggers to be processed may be initialized, in e.g., by the CT.

"Configured"—The function and interconnection of the PAE is configured. The PAE may process and generate data and/or triggers to be processed. Such states may also be present repeatedly, largely independently of one another, in independent parts of a PAE.

It will be appreciated that there may be a separation between data and/or triggers for processing on the one hand and data and/or triggers for configuration of one or more cells on the other hand.

During configuration, the CT may send, together with a valid configuration word (KW), a signal indicating the configuration word's validity (RDY). This signal may be omitted if validity is ensured by some other means, e.g., in the case of continuous transmission or by a code in the KW. In addition, the address of the PAE to be configured may be coded in a KW.

According to the criteria described below and in the patent applications referenced, a PAE may decide whether it can accept the KW and alter its configuration or whether data processing must not be interrupted or corrupted by a new configuration. Information regarding whether or not configurations are accepted may be relayed to the CT if the decision has not already been made there. The following protocol may be used: If a PAE accepts the configuration, it sends an acknowledgment ACK to the CT. If the configuration is rejected, a PAE will indicate this by sending REJ (reject) to the CT.

Within the data processing elements (PAEs), a decision may be made by one or more of the elements regarding whether they can be reconfigured because the data processing is concluded or whether they are still processing data. In addition, no data is corrupted due to unconfigured PAEs.

Example Approach to Deadlock Freedom and Correctness of the Data

FILMO Principle

Efficient management of a plurality of configurations, each of which may be composed of one or more KWs and possibly additional control commands may be provided. The plurality of configurations may be configured overlappingly on the PA. When there is a great distance between the CT and the cell(s) to be configured, this may be a disadvantage in the transmission of configurations. It will be appreciated that no data or states are corrupted due to a reconfiguration. To ensure this, the following rules, which are called the FILMO principle, may be defined:

a) PAEs which are currently processing data are not reconfigured. A reconfiguration should take place only when data processing is completely concluded or it is certain that no further data processing is necessary. Reconfiguration of PAEs, which are currently processing data or are waiting for outstanding data may lead to faulty calculation or loss of data.)

b) The status of a PAE should not change from "configured" to "not configured" during a FILMO run. In addition to the method described in PACT10, a special additional method which allows exceptions (explicit/implict LOCK) is described below. A SubConf is a quantity of configuration words to be configured jointly into the cell array at a given time or for a given purpose. A situation may occur where two different SubConfs (A, D) are supposed to share the same resources, e.g., a PAE X. For example, SubConf A may chronologically precede SubConf B. SubConf A must therefore occupy the resources before SubConf D. If PAE X is still "configured" at the configuration time of SubConf A, but its status changes to "not configured" before the configuration of SubConf D, then a deadlock situation may occur if no special measures are taken. An example deadlock is if SubConf A can no longer configure the PAE X and SubConf D occupies only PAE X, but the remaining resources which are already occupied by SubConf A can perform no more configuration. Neither SubConf A nor SubConf D can be executed. A deadlock would occur.

c) A SubConf should have either successfully configured or allocated all the PAEs belonging to it or it should have received a reject (REJ) before the following SubConf is configured. However, this is true only if the two configurations share the same resources entirely or in part. If there is no resource conflict, the two SubConfs may be configured independently of one another. Even if PAEs reject a configuration (REJ) for a SubConf, then the configuration of the following SubConfs is performed. Since the status of PAEs does not change during a FILMO run (LOCK, according to section b), this ensures that no PAEs which would have required the preceding configuration may be configured during the following configuration. It will be appreciated that deadlock may occur if a SubConf which is to be configured later were to allocate the PAEs to a SubConf which is to be configured previously, e.g., because no SubConf could be configured completely.

d) Within one SubConf, it may be necessary for certain PAEs to be configured or started in a certain sequence. For example, PAE may be switched to a bus, only after the bus has also been configured for the SubConf. Switching to a different bus may lead to processing of false data.

e) In the case of certain algorithms, the sequence in the configuration of SubConf may need to correspond exactly to the sequence of triggers arriving at the CT. For example, if the trigger which initiates the configuration of SubConf 1 arrives before the trigger which initiates the configuration of SubConf 3, then SubConf 1 must be configured completely before SubConf 3 may be configured. If the order of triggers were reversed, this could lead to a defective sequence of subgraphs, depending on the algorithm (see PACT13).

Methods which meet most or all of the requirements listed above are described in PACT05 and PACT10.

Management of the configurations, their timing and arrangement and the design of the respective components, e.g., the configuration registers, etc., may be used to provide the technique described here, however, and possible improvements over known related art are described below.

To ensure that requirement e) is met as needed, the triggers received, which pertain to the status of a SubConf and a cell and/or reconfigurability, may be stored in the correct sequence by way of a simple FIFO, e.g., a FIFO allocated to the CT. Each FIFO entry include the triggers received in a clock cycle. All the triggers received in one clock cycle may be stored. If there are no triggers, no FIFO entry is generated. The CT may process the FIFO in the sequence in which the triggers were received. If one entry contains multiple triggers, the CT may first process each trigger individually, optionally either (I) prioritized or (ii) unprioritized, before processing the next FIFO entry. Since a trigger is usually sent to the CT only once per configuration, it may be sufficient to define the maximum depth of the FIFO relative to the quantity of all trigger lines wired to the CT. As an alternative method, a time stamp protocol as described in PACT18 may also be used. Two basic types of FILMO are described in PACT10:

Separate FILMO: The FILMO may be designed as a separate memory and may be separated from the normal CT memory which caches the SubConf. Only KWs that could not be configured in the PA are copied to the FILMO.

Integrated FILMO: The FILMO may be integrated into the CT memory. KWs that could not be configured are managed by using flags and pointers.

Example methods, according to the present invention, may be applied to both types of FILMO or to one type.

2.2. Example Differential Reconfiguration

With many algorithms, it may be advisable only to make minimal changes in configuration during operation on the basis of certain events represented by triggers or by time tuning without completely deleting the configuration of the PAEs. This may apply to the wiring of the bus systems or to certain constants. For example, if only one constant is to be changed, it may be advisable to be able write a KW to the respective PAE without the PAE being in an "unconfigured" state, reducing the amount of configuration data to be transferred. This may be achieved with a "differential reconfiguration" configuration mode, where the KW contains the information "DIFFERENTIAL" either in encoded form or explicitly in writing the KW. "DIFFERENTIAL" indicates that the KW is to be sent to a PAE that has already been configured. The acceptance of the differential configuration and the acknowledgment may be inverted from the normal configuration; e.g., a configured PAE receives the KW and sends an ACK. An unconfigured PAE rejects the KW and sends REJ because the prerequisite for "DIFFERENTIAL" is a configured PAE.

There may be various approaches to performing a differential reconfiguration. The differential reconfiguration may forced without regard for the data processing operation actually taking place in a cell. In that case, it is desirable to guarantee accurate synchronization with the data processing, which may be accomplished through appropriate design and layout of the program. To relieve the programmer of this job, however, differential reconfigurability may also be made to depend on other events, e.g., the existence of a certain state in another cell or in the cell that is to be partially reconfigured. It may be advantageous to store the configuration data, e.g., the differential configuration data, in or on the cell, e.g., in a dedicated register. The register contents may be called up, depending on a certain state, and entered into the cell. This may be accomplished, for example, by switching a multiplexer.

The wave reconfiguration methods described below may also be used. A differential configuration may be made dependent on the results (ACK/REJ) of a configuration performed previously in the normal manner. In this case, the differential configuration may be performed only after arrival of ACK for the previous nondifferential configuration.

An variant of synchronization of the differential configuration may be used, depending on how many different differential configurations are needed. The differential configuration is not. prestored locally. Instead, on recognition of a certain state, e.g., the end of a data input, a signal may be generated with a first cell, stopping the cell which is to be differentially reconfigured. Such a signal may be a STOP signal. After or simultaneously with stopping data processing in the cell which is to be reconfigured differentially, a signal may be sent to the CT, requesting differential reconfiguration of the stopped cell. This request signal for differential reconfiguration may be generated and sent by the cell which also generates the STOP signal. The CT may then send the data needed for differential reconfiguration to the stopped cell arid may trigger the differential reconfiguration. After differential reconfiguration, the STOP mode may be terminated, e.g., by the CT. It will be appreciated that Cache techniques may also be used in the differential reconfiguration method.

3. Example Function of Triggers

Triggers may be used in VPU modules to transmit simple information. Examples are listed below. Triggers may be transmitted by any desired bus system (network), e.g., a configurable bus system. The source and target of a trigger may be programmed.

A plurality of triggers may be transmitted simultaneously within a module. In addition to direct transmission from a source to a target, transmission from one source to multiple destinations or from multiple sources to one destination may also be provided.

Triggers transmissions may include:

Status information from arithmetic units (ALUs), e.g.,
- carry
- division by zero
- zero
- negative
- underflow/overflow Results of comparisons n-bit information (for small n)

Interrupt request generated internally or externally

Blocking and enable orders

Requests for configurations

Triggers may be generated by any cells and may be triggered in the individual cells by events. For example, the status register and/or the flag register may be used by ALUs or processors to generate triggers. Triggers may also be generated by a CT and/or an external unit arranged outside the cell array or the module.

Triggers may be received by any number of cells and may be analyzed in any manner. For example, triggers may be analyzed by a CT or an external unit arranged outside the cell array or the module.

Triggers may be used for synchronization and control of conditional executions and/or sequence controls in the array. Conditional executions and sequence controls may be implemented by sequencers.

3.1. Example Semantics of Triggers

Triggers may be used for actions within PAEs, for example:

STEP: Execute an operation within a PAE upon receipt of the trigger.

GO: Execute operations within a PAE upon receipt of the trigger. The execution is stopped by STOP.

STOP: Stop the execution started with GO; in this regard, see also the preceding discussion of the STOP signal.

LOCAL RESET: Stop the execution and transfer from the "allocated" or "configured" state to the "not configured" state.

WAVE: Stop the execution of operations and load a wave reconfiguration from by the CT. In wave reconfiguration, one or more PAEs may be subsequently reconfigured to run through the end of a data packet. Then, the processing of another data packet may take place, e.g., directly after reconfiguration, which may also be performed as a differential reconfiguration.

For example, a first audio data packet may be processed with first filter coefficients; after running through the first audio data packet, a partial reconfiguration may take place, and then a different audio data packet may be processed with a second set of filter coefficients. To do so, the new reconfiguration data, e.g., the second filter coefficients, may be deposited in or at the cell, and the reconfiguration may be prompted automatically on recognition of the end of the first data packet without requiring further intervention of a CT or another external control unit.

Recognition of the end of the first data packet, e.g., the time when the reconfiguration is to be performed, may be accomplished by generating a wave reconfiguration trigger. The trigger may be generated, for example, in a cell which recognizes a data end. Reconfiguration then may run from cell to cell with the trigger as the cells finish processing of the first data packet, comparable to a "wave" running through a soccer stadium.

For example, a single cell may generate the trigger and send it to a first cell, for to indicate to the first cell that the end of a first packet has been run through. This first cell to be reconfigured, addressed by the wave trigger generating cell, may also relay the wave trigger signal simultaneously with the results derived from the last data of the first packet, which may be sent to one or more subsequently processing cells, sending the signal to these subsequently processing cells. The wave trigger signal may also be sent or relayed to those cells which are not currently involved in processing the first data packet and/or do not receive any results derived from the last data. Then the first cell to be reconfigured, which is addressed by the wave trigger signal generating cell, is reconfigured and begins processing the data of the second data packet. During this period of time, the subsequent cells may still be processing the first data packet. It should be pointed out that the wave trigger signal generating cell may address not only individual cells, but also multiple cells which are to be reconfigured. This may result in an avalanche-like propagation of the wave configuration.

Data processing may be continued as soon as the wave reconfiguration has been configured completely. In WAVE, it is possible to select whether data processing is continued immediately after complete configuration or whether there is a wait for arrival of a. STEP or GO.

SELECT: Selects an input bus for relaying to the output. Example: Either a bus A or a bus B may be switched to an output. The setting of the multiplexer and thus the selection of the bus are selected by SELECT.

Triggers are used for the following actions within CTs, for example:

CONFIG: A configuration is to be configured by the CT into the PA.

PRELOAD: A configuration is to be preloaded by the CT into its local memory. Therefore, the configuration need be loaded only upon receipt of CONFIG. It will be appreciated that this may result in more predictable caching.

CLEAR: A configuration is to be deleted by the CT from its memory.

Incoming triggers may reference a certain configuration. The corresponding method is described below.

Semantics need not be assigned to a trigger signal in the network. Instead, a trigger may represent only a state. How this state may be utilized by a respective receiving PAE may be configured in the respective receiving PAE. For example, a sending PAE may send only its status, and the receiving PAE generates the semantics valid for the received status. If several PAEs receive one trigger, different semantics may be used in each PAE, e.g., a different response may occur in each PAE. For example, a first PAE may be stopped, and a second PAE may be reconfigured. If multiple PAEs send one trigger, the event generating the trigger may be different in each PAE.

It should be pointed out that a wave reconfiguration and/or a partial reconfiguration can also take place in bus systems and the like. A partial reconfiguration of a bus can take place, for example, in reconfiguration by sections.

3.2. Example System Status and Program Pointer

A system may include a module or an interlinked group of modules, depending on the implementation. For managing an array of PAEs, which is designed to include several modules in the case of a system, it may not be necessary to know the status or program pointer of each PAE. Several cases are differentiated below in order to explain this further:

PAEs as components not having a processor property. Such PAEs do not need their own program pointer. The status of an individual PAE is may be irrelevant, because only certain PAEs have a usable status (see PACT01, where the status represented by a PAE is not a program counter but instead is a data counter). The status of a group of PAEs may be determined by the linking of the states of the individual relevant PAEs. The information within the network of triggers may represent the status.

PAEs as processors. These PAEs may have their own internal program pointer and status. The information of only one PAE which is relevant for other PAEs may-be exchanged by triggers.

The interaction among PAEs may yield a common status which may be analyzed, e.g., in the CT, to determine how a reconfiguration is to take place. The analysis may include the instantaneous configuration of the network of lines and/or buses used to transmit the triggers if the network is configurable.

The array of PAEs (PA) may have a global status. Information may be sent through certain triggers to the CT. The CT may control the program execution through reconfiguration based on these triggers. A program counter may be omitted.

4. Example (Re)Configuration

VPU modules may be configured or reconfigured on the basis of events. These events may be represented by triggers (CONFIG) transmitted to a CT. An incoming trigger may reference a certain configuration (SubConf) for certain PAEs. The referenced SubConf may be sent to one or more PAES. Referencing may take place by using a conventional lookup system or any other address conversion or address generation procedure. For example, the address of the executing configuration (SubConf) may be calculated as follows on the basis of the number of an incoming trigger if the SubConfs have a fixed length:

offset+(trigger number*SubConf length).

VPU modules may have three configuration modes:

a) Global configuration: The entire VPU may be reconfigured if the entire VPU is in a configurable state, e.g., unconfigured.

b) Local configuration: A portion of the VPU may be reconfigured. The local portion of the VPU which is to be reconfigured may need to be in a configurable state, e.g., unconfigured.

c) Differential configuration: An existing configuration may be modified. PAEs to be reconfigured may need to be in a configured state, e.g., they must be configured.

A configuration may include a set of configuration words (KWs). Each configuration may be referenced by a reference number (ID), which may be unique.

A set of KWs identified by an ID is referred to below as a subconfiguration (SubConf). Multiple SubConfs, which may run simultaneously on different PAEs, may be configured in a VPU. These SubConfs may be different or identical.

A PAE may have one or more configuration registers, one configuration word (KW) describing one configuration register. A KW may be assigned the address of the PAE to be configured. Information indicating the type of configuration may also be assigned to a KW. This information may be implemented using various methods, e.g., flags or coding. Flags are described in detail below.

4.1. Example ModuleID

For some operations, it may be sufficient for the CT to know the allocation of a configuration word and of the respective PAE to a SubConf. For more complex operations in the processing array, the ID of the SubConf assigned to an operation may be stored in each PAE.

An ID stored in the PA is referred to below as moduleID to differentiate the IDs within the CTs. There are several reasons for introducing moduleID, some of which are described here:

A PAE may be switched only to a bus which also belongs to the corresponding SubConf. If a PAE is switched to the wrong (different) bus, this may result in processing of incorrect data. This problem can be solved by configuring buses prior to PAEs, which leads to a rigid order of KWs within a SubConf. By introducing moduleID, this pre configuration can be avoided, because a PAE compares its stored moduleID with that of the buses assigned to it and switches to a bus only when its moduleID matches that of the PAE. As long as the two moduleIDs are different, the bus connection is not established. As an alternative, a bus sharing management can also be implemented, as described in PACT 07.

PAEs may be converted to the "unconfigured" state by a local reset signal. Local reset may originate from a PAE in the array and not from a CT, and therefore is "local". The signal may need to be connected between all PAEs of a SubConf. This procedure may become problematical when a SubConf that has not yet been completely configured is to be deleted, and therefore not all PAEs are connected to local reset. By using moduleID, the CT can broadcast a command to all PAEs. PAEs with the corresponding moduleID may change their status to "not configured".

In many applications, a SubConf may be started only at a certain time, but it may already be configured in advance. By using the moduleID, the CT can broadcast a command to all PAEs. The PAEs with the corresponding moduleID then start the data processing.

The moduleID may also be identical to the ID stored in the CT.

The moduleID may be written into a configuration register in the respective PAE. Since IDs may have a considerable width, e.g., more than 10 bits in most cases, it may not be efficient to provide such a large register in each PAE. Alternatively, the moduleID of the respective SubConf be derived from the ID. The alternative module ID may have a small width and may be unique. Since the number of all modules within a PA is typically comparatively small, a moduleID width of a few bits (e.g., 4 to 5 bits) may be sufficient. The ID and moduleID can be mapped bijectively on one another. In other words, the moduleID may uniquely identify a configured module within an array at a certain point in time. The moduleID may be issued to a SubConf before configuration so that the SubConf is uniquely identifiable in the PA at the time of execution. A SubConf may be configured into the PA multiple times simultaneously (see macros, described below). A unique moduleID may be issued for each configured SubConf for unambiguous allocation.

The transformation of an ID to a moduleID may be accomplished with lookup tables or lists. Since there are numerous conventional mapping methods for this purpose, only one is explained in greater detail here:

A list whose length is $2^{ModuleID}$ contains the number of all IDs configured in the array at the moment, one ID being allocated to each list entry. The entry "0" characterizes an unused moduleID. If a new ID is configured, it must be assigned to a free list entry, whose address yields the corresponding moduleID. The ID is entered into the list at the moduleID address. On deletion of an ID, the corresponding list entry is reset at "0".

It will be appreciated that other mapping methods may be employed.

4.2. Example PAE States

Each KW may be provided with additional flags which may be used to check and control the status of a PAE:

CHECK: An unconfigured PAE is allocated and configured. If the status of the PAE is "not configured," the PAE is configured with the KW. This procedure may be acknowledged with ACK.

If the PAE is in the "configured" or "allocated" state, the KW is not accepted. The rejection may be acknowledged with REJ.

After receipt of CHECK, a PAE may be switched to an "allocated" state. Any additional CHECK is rejected, but data processing is not started.

DIFFERENTIAL: The configuration registers of a PAE that has already been configured may be modified. If the status of the PAE is "configured" or "allocated," then the PAE may be modified using the KW. This procedure may be acknowledged with ACK. If the PAE is in the "unconfigured" state, the KW is not accepted but is acknowledged by REJ (reject).

GO: Data processing may be started. GO may be sent individually or together with CHECK or DIFFERENTIAL.

WAVE: A configuration may be linked to the data processing.

When the WAVE trigger is received, the configuration characterized with the WAVE flag may be loaded into the PAE. If WAVE configuration is performed before receipt of the trigger, the KWs characterized with the WAVE flag remain stored until receipt of the trigger and become active only with the trigger. If the WAVE trigger is received before the KW which has the WAVE flag, data processing is stopped until the KW is received.

At least CHECK or DIFFERENTIAL must be set for each KW transmitted. However, CHECK and DIFFERENTIAL are not allowed at the same time. CHECK and GO or DIFFERENTIAL and GO are allowed and will start data processing.

In addition, a flag which is not assigned to any KW and is set explicitly by the CT may also be implemented:

LOCK: It will be appreciated that PAE may not always switch to the "not configured" state at will. If this were the case, the cell could still be configured, for example, and it could be involved with the processing of data while an attempt is being made to write a first configuration from the FILMO memory into the cell; then the cell terminates its activity during the additional FILMO run. Therefore, without any additional measures, it is possible that a second following configuration, which is stored in FILMO and may actually be executed only after the first configuration, could occupy this cell. This could then result in DEADLOCK situations. By temporarily limiting the change of configurability of the cell through the LOCK command, such a DEADLOCK can be avoided by preventing the cell from being configurable at an unwanted time. This locking of the cell against reconfiguration can take place in particular either when FILMO is run through, regardless of whether it is a cell which is in fact accessed for the purpose of reconfiguration, or alternatively, the cell may be locked to prevent reconfiguration by prohibiting the cell from being reconfigured for a certain phase, after the first unsuccessful access to the cell by a first configuration of the cell in the FILMO; this prevents inclusion of the second configuration only in those cells which are to be accessed with an earlier configuration.

Thus, according to the FILMO principle, a change may be allowed in FILMO only during certain states. As discussed above, the FILMO state machine controls the transition to the "not configured" state through LOCK.

Depending on the implementation, the PAE may transmit its instantaneous status to a higher-level control unit (e.g., the respective CT) or stores it locally.

Example Transition Tables

A simple implementation of a state machine for observing the FILMO protocol is possible without using WAVE or CHECK/DIFFERENTIAL. Only the GO flag is implemented here, a configuration being composed of KWs transmitted together with GO. The following states may be implemented:

Not configured: The PAE behaves completely neutrally, e.g., it does not accept any data or triggers, nor does it send any data or triggers. The PAE waits for a configuration. Differential configurations, if implemented, are rejected.

Configured: The PAE is configured and it processes data and triggers. Other configurations are rejected; differential configurations, if implemented, are accepted.

Wait for lock: The PAE receives a request for reconfiguration (e.g., through local reset or by setting a bit in a configuration register). Data processing may be stopped, and the PAE may wait for cancellation of LOCK to be able to change to the "not configured" state.

| Current PAE status | Event | Next status |
|---|---|---|
| not configured | GO flag | configured |
| configured | Local Reset Trigger | wait for lock |
| wait for lock | LOCK flag | not configured |

A completed state machine according to the approach described here makes it possible to configure a PAE which requires several KWs. This is the case, for example, when a configuration which refers to several constants is to be transmitted, and these constants are also to be written into the PAE after or together with the actual configuration. An additional status is required for this purpose.

Allocated: The PAEs have been checked by CHECK and are ready for configuration. In the allocated state, the PAE is not yet processing any data. Other KWs marked as DIFFERENTIAL are accepted. KWs marked with CHECK are rejected.

An Example

A corresponding transition table is shown below; WAVE is not included:

| Current PAE status | Event | Next status |
|---|---|---|
| not configured | CHECK flag | allocated |
| not configured | GO flag | configured |
| allocated | GO flag | configured |
| configured | Local Reset Trigger | wait for lock |
| wait for lock | LOCK flag | not configured |

4.2.1. Example Implementation of GO

GO may be set immediately during the configuration of a PAE together with the KW in order to be able to start data processing immediately. Alternatively, GO may be sent to the respective PAEs after conclusion of the entire SubConf.

The GO flag may be implemented in various ways, including the examples described below:

a) Register

Each PAE may have a register which is set at the start of processing. The technical implementation is comparatively simple, but a configuration cycle may be required for each PAE. GO is transmitted together with the KW as a flag according to the previous description.

If it is important in which order PAEs of different PACs belonging to one EnhSubConf are configured, an alternative approach may be used to ensure that this chronological dependence is maintained. Since there are also multiple CTs when there are multiple PACs, the CTs may notify one another regarding whether all PAEs which must be configured before the next in each PAE have already accepted their GO from the same configuration.

One possibility of resolving the chronological dependencies and preventing unallowed GOs from being sent is to reassign the KWs. With reassignment, a correct order may ensured by FILMO. FILMO then marks, e.g., by a flag for each configuration, whether all GOs of the current configuration have been accepted. If this is not the case, no additional GOs of this configuration are sent. Each new configuration may have an initial status indicating all GOs have been accepted.

To increase the probability that some PAEs are no longer being configured during the configuration, the KWs of an at least partially sequential configuration can be re-sorted. The re-sorting permits the configuration the KWs of the respective PAEs at a later point in time. Certain PAEs may be activated sooner, e.g., by rearranging the KWs of the respective configuration so that the respective PAEs are configured earlier. These approaches may be used if the order of the KWs is not already determined completely by time dependencies that must be maintained after resorting.

b) Wiring by Conductor

As is the case in use of the local reset signal, PAEs may be combined into groups which are to be started jointly. Within this group, all PAEs are connected to a line for distribution of GO. If one group is to be started, GO is signaled to a first PAE. The signalling may be accomplished by sending a signal or setting a register (see a)) of the first PAE. From the first PAE, GO may be relayed to the other PAEs. One configuration cycle may be necessary for starting. For relaying, a latency time may be needed to bridge great distances.

c) Broadcast

An alternative to a) and b) offers a high performance (only one configuration cycle) with a comparatively low complexity.

All modules may receive a moduleID which may be different from the SubConfID.

It will be appreciated that it may be desirable to keep the size of the moduleID as small as possible. A width of a few bits (3 to 5) may be sufficient. The use of moduleID is explained in greater detail below.

During configuration, the corresponding moduleID may be written to each PAE.

GO is then started by a broadcast, by sending the moduleID together with the GO command to the array. The command is received by all PAEs, but is executed only by the PAEs having the proper moduleID.

4.2.2. Locking the PAE Status

The status of a PAE may need to be prevented from changing from "configured" to "not configured" within a configuration or a FILMO run. Example: Two different SubConfs (A, D) share the same resources, in particular, a PAE X. In FILMO, SubConf A precedes SubConf D in time. SubConf A must therefore occupy the resources before SubConf D. PAE X is "configured" at the configuration time of SubConf A, but it changes its status to "not configured" before the configuration of SubConf D. This may result in a deadlock situation, because now SubConf A can no longer configure PAE X, but SubConf D can no longer configure the remaining resources which are already occupied by SubConf A. Neither SubConf A nor SubConf D can be executed. As mentioned previously, LOCK may ensure that the status of a PAE does not change in an inadmissible manner during a FILMO run. For the FILMO principle it is irrelevant how the status is locked. Several possible locking approaches are discussed below:

Basic LOCK

Before beginning the first configuration and with each new run of FILMO, the status of the PAEs is locked. After the end of each run, the status is released again. Thus, certain changes in status may be allowed only once per run.

Explicit LOCK

The lock signal is set only after the first REJ from the PA since the start of a FILMO run. This is possible because previously all the PAEs could be configured and thus already were in the "unconfigured" state. Only a PAE which generates a REJ could change its status from "configured" to "not configured" during the additional FILMO run. A deadlock could occur only after this time, namely when a first KW receives a REJ and a later one is configured. However, the transition from "configured" to "not configured" is prevented by immediately setting LOCK after a REJ. With this approach, during the first run phase, PAEs can still change their status, which means that they can change to the "unconfigured" state. If a PAE thus changes from "configured" to "not configured" during a run before a failed configuration attempt, their it can be configured in the same configuration phase.

Implicit LOCK

A more efficient extension of the explicit LOCK is the implicit handling of LOCK within a PAE.

In general, only PAEs which have rejected (REJ) a configuration may be affected by the lock status. Therefore, it is sufficient during a FILMO run to lock the status only within PAEs that have generated a REJ. All other PAEs may remain unaffected. LOCK is no longer generated by a higher-level instance (CT). Instead, after a FILMO run, the lock status in the respective PAEs may be canceled by a FREE signal. FREE can be broadcast to all PAEs directly after a FILMO run and can also be pipelined through the array.

Example Extended Transition Tables for Implicit LOCK;

A reject (REJ) generated by a PAE may be stored locally in each PAE (REJD=rejected). The information is deleted only on return after "not configured."

| Current PAE status | Event | Next status |
|---|---|---|
| not configured | CHECK flag | Allocated |
| not configured | GO flag | Configured |
| allocated | GO flag | Configured |
| configured | Local reset trigger | Wait for free |

-continued

| Current PAE status | Event | Next status |
|---|---|---|
| | and reject (REJD) | |
| configured | Local reset trigger and no reject (not REJD) | not configured |
| wait for free | FREE flag | not configured |

It will be appreciated that the transition tables are given as examples and that other approaches may be employed.

4.2.3. Example Configuration of a PAE

An example configuration sequence is described again in this section from the standpoint of the CT. A PAE shall also be considered to include parts of a PAE if they manage the states described previously, independently of one another.

If a PAE is to be reconfigured, the first KW may need to set the CHECK flag to check the status of the PAE. A configuration for a PAE is constructed so that either (a) only one KW is configured:

| CHECK | DIFFERENTIAL | GO | KW |
|---|---|---|---|
| X | — | * | KW0 |

or (b) multiple KWs are configured, with CHECK being set with the first KW and DIFFERENTIAL being set with all additional KWs.

| CHECK | DIFFERENTIAL | GO | KW |
|---|---|---|---|
| X | — | — | KW0 |
| — | X | — | KW1 |
| — | X | — | KW2 |
| — | X | * | KWn |

(X) set, (—) not set, GO is optional (*).

If CHECK is rejected (REJ), no subsequent KW with a DIFFERENTIAL flag is sent to the PAE. After CHECK is accepted (ACK), all additional CHECKs are rejected until the return to the state "not configured" and the PAE is allocated for the accepted SubConf. Within this SubConf, the next KWs may be configured exclusively with DIFFERENTIAL. It will be appreciated that this is allowed because it is known by CHECK that this SubConf has access rights to the PAE.

4.2.4. Resetting to the Status "Not Configured"

With a specially designed trigger (e.g., local reset), a signal which triggers local resetting of the "configured" state to "not configured" is triggered in the receiving PAEs. This occurs, at the latest, after a LOCK or FREE signal is received. Resetting may also be triggered by other sources, such as a configuration register.

Local reset can be relayed from the source generating the signal over all existing configurable bus connections, e.g., all trigger buses and all data buses, to each PAE connected to the buses. Each PAE receiving a local reset may in turn relay the signal over all the connected buses.

However, it may be desirable to prevent the local reset trigger from being relayed beyond the limit of a local group. Each cell may be independently configured. Each cell configuration may indicate whether and over which connected buses the local reset is to be relayed.

4.2.4.1. Deleting an Incompletely Configured SubConf

It may be found that the SubConf is not needed during configuration of a SubConf. For example, local reset may not change the status of all PAEs to "not configured" because the bus has not yet been completely established. Two alternative approaches are proposed. In both approaches, the PAE which would have generated the local reset sends a trigger to the CT. Then the CT informs the PAEs as follows:

4.2.4.2. When Using moduleID

If a possibility for storage of the moduleID is provided within each PAE, then each PAE can be requested to go to the status "not configured" with this specific ID. This may be accomplished with a simple broadcast in which the ID is also sent.

4.2.4.3. When Using the GO Signal

If a GO line is wired in exactly the order in which the PAEs are configured, a reset line may be assigned to the GO line. The reset line may set all the PAEs in the state "not configured."

4.2.4.4. Explicit Reset by the Configuration Register

In each PAE, a bit or a code may be defined within the configuration register. When this bit or code is set by the CT, the PAE is reset in the state "not configured."

4.3. Holding the Data in the PAEs

It is advantageous to hold the data and states of a PAE beyond a reconfiguration. Data stored within a PAE may be preserved despite reconfiguration. Appropriate information in the KWs, may define for each relevant register whether the register is reset by the reconfiguration.

Example

For example, if a bit within a KW is logical 0, the current register value of the respective data register or status register may be retained. A logical 1 resets the value of the register. A corresponding KW may then have the following structure:

| Input register | | | Output register | | Status flags | |
|---|---|---|---|---|---|---|
| A | B | C | H | L | equal/ zero | overflow |

Whether or not the data will be preserved, may then be selected with each reconfiguration.

4.4. Setting Data in the PAEs

Date may be written into the registers of the PAEs during reconfiguration of the CT. The relevant registers may be addressed by KWs. A separate bit may indicate whether the data is to be treated as a constant or as a data word.

A constant may be retained until it is reset.

A data word may be valid for precisely a certain number of counts, e.g., precisely one count. After processing the data word, the data word written to the register by the CT may no longer exist.

5. Example Extensions

The bus protocol may be extended by also pipelining the KWs and ACK/REJ signals through registers.

One KW or multiple KWs may be sent in each clock cycle. The FILMO principle may be maintained. An allocation to a KW may be written to the PA in such a way that the delayed acknowledgment is allocated subsequently to the KW. KWs depending on the acknowledgment may be re-sorted so that they are processed only after receipt of the acknowledgment.

Several alternative approaches are described below:

5.1. Example Lookup Tables (STATELUT)

Each PAE may send its status to a lookup table (STATELUT). The lookup table may be implemented locally in the CT. In sending a KW, the CT may check the status of the addressed PAE via a lookup in the STATELUT. The acknowledgment (ACK/REJ) may be generated by the STATELUT.

In a CT, the status of each individual PAE may be managed in a memory or a register set. For each PAE there is an entry indicating in which mode ("configured," "not configured") the PAE is. On the basis of this entry, the CT checks on whether the PAE can be reconfigured. This status is checked internally by the CT, e.g., without checking back with the PAEs. Each PAE sends its status independently or after a request, depending on the implementation, to the internal STATELUT within the CT. When LOCK is set or there is no FREE signal, no changes in status are sent by the PAEs to the STATELUT and none are received by the STATELUT.

The status of the PAEs may be monitored by a simple mechanism, with the mechanisms of status control and the known states that have already been described being implemented.

Setting the "Configured" Status

When writing a KW provided with a CHECK flag, the addressed may be marked as "allocated" in the STATELUT.

When the PAE is started (GO), the PAE may be entered as "configured."

Resetting the "Configured" Status to "not Configured"

Several methods may be used, depending on the application and implementation:

a) Each PAE may send a status signal to the table when the PAEs' status changes from "configured" to "not configured." This status signal may be sent pipelined.
b) A status signal (local reset) may be sent for a group of PAEs, indicating that the status for the entire group has changed from "configured" to "not configured". All the PAEs belonging to the group may be selected according to a list, and the status for each individual PAE may be changed in the table. The status signal may need to be sent to the CT from the last PAE of a group removed by a local reset signal. Otherwise, there may be inconsistencies between the STATELUT and the actual status of the PAEs. For example, the STATELUT may list a PAE as "not configured" although it is in fact still in a "configured" state.
c) After receipt of a LOCK signal, possibly pipelined, each PAE whose status has changed since the last receipt of LOCK may send its status to the STATELUT. LOCK here receives the "TRANSFER STATUS" semantics. However, PAEs transmit their status only after this request, and otherwise the status change is locked, so the approach remains the same except for the inverted semantics.

To check the status of a PAE during configuration, the STATELUT may be queried when the address of the target PAE of a KW is sent. An ACK or REJ may be generated accordingly. A KW may be sent to a PAE only if no REJ has been generated or if the DIFFERENTIAL flag has been set.

This approach ensures the chronological order of KWs. Only valid KWs are sent to the PAEs. One disadvantage here is the complexity of the implementation of the STATELUT and the resending of the PAE states to the STATELUT. Bus bandwidth and running time may also be required for this approach.

5.2. Example Re-sorting the KWs

The use of the CHECK flag for each first KW (KW1) sent to a PAE may be needed in the following approach.

The SubConf may be resorted as follows:

1. First, KW1 of a first PAE may be written. In the time (DELAY) until the receipt of the acknowledgment (ACK/REJ), there follow exactly as many dummy cycles (NOPs) as cycles have elapsed.
2. Then the KW1 of a second PAE may be written. During DELAY the remaining KWs of the first PAE may be written. Any remaining cycles are filled with dummy cycles. The configuration block from KW1 until the expiration of DELAY is referred to here as an "atom".
3. The same procedure may be followed with each additional PAE.
4. If more KWs are written for a PAE than there are cycles during DELAY, the remaining portion may distributed among the following atoms. As an alternative, the DELAY may also be actively lengthened, so a larger number of KWs may be written in the same atom.

Upon receipt of ACK for a KW1, all additional KW1s for the corresponding PAE may be configured. If the PAE acknowledges this with REJ, no other KW pertaining to the PAE may be configured.

This procedure guarantees that the proper order will be maintained in configuration.

A disadvantage of this approach is that the optimum configuration speed may not be achieved. To maintain the proper order, the waiting time of an atom may optionally have to be filled with dummy cycles (NOPs), so the usable bandwidth and the size of a SubConf are increased by the NOPs.

This restriction on the configuration speed may be difficult to avoid. To minimize the amount of configuration data and configuration cycles, the number of configuration registers may need to be minimized. At higher frequencies, DELAY necessarily becomes larger, so this collides with the requirement that DELAY be used appropriately by filling up with KW.

Therefore, approach is most appropriate for use in serial transmission of configuration data. Due to the serialization of KWs, the data stream is long enough to fill up the waiting time.

5.3. Analyzing the ACK/REJ Acknowledgment with Latency (CHECK, ACK/REJ)

The CHECK signal may be sent to the addressed PAE with the KWs over one or more pipeline stages. The addressed PAE acknowledges (ACK/REJ) this to the CT, also pipelined.

In each cycle, a KW may be sent. The KW's acknowledgment (ACK/REJ) is received by the CT n cycles later. The KW and its acknowledgment may be analyzed. However, during this period of time, no additional KWs are sent. This results in two problem areas:

Controlling the FILMO

Maintaining the sequence of KWs 5.3.1. Controlling the FILMO Within the FILMO, it must be noted which KWs have been accepted by a PAE (ACK) and which have been rejected (REJ). Rejected KWs may be sent again in a later FILMO run. In this later run, it may be more efficient to run through only the KWs that have been rejected.

The requests described here may be implemented as follows: Another memory (RELJMP) which has the same depth as the FILMO may be assigned to the FILMO. A first counter (ADR_CNT) points to the address in the FILMO of the KW currently being written into the PAE array. A second counter (ACK/REJ_CNT) points to the position in the FILMO of the KW whose acknowledgment (ACK/REJ) is currently returning from the array. A register (LASTREJ) stores the value of ACK/REJ_CNT which points to the address of the last KW whose configuration was acknowledged with REJ. A subtractor calculates the difference between ACK/REJ__CNT and LASTREJ. On occurrence of a REJ, this difference is written into the memory location having the address LASTREJ in the memory RELJMP.

RELJMP thus contains the relative jump width between a rejected KW and the following KW.

1. A RELJMP entry of "0" (zero) is assigned to each accepted KW.
2. A RELJMP entry of ">0", (greater than zero) is assigned to each rejected KW. The address of the next rejected KW is calculated in the FILMO by adding the current address having the RELJMP entry.
3. A RELJMP entry of "0" (zero) is assigned to the last rejected KW, indicating the end.

The memory location of the first address of a SubConf is occupied by a NOP in the FILMO. The associated RELJMP contains the relative jump to the first KW to be processed.

1. In the first run of the FILMO, the value is "1" (one).
2. In a subsequent run, the value points to the first KW to be processed, so it is ">0" (greater than zero).
3. If all KWs of the SubConf have been configured, the value is "0" (zero), by which the state machine determines that the configuration has been completely processed.

It will be appreciated that other approaches to coding various conditions may be employed.

5.3.2. Observing the Sequence (BARRIER)

The method described in section 5.3, may not guarantee a certain configuration sequence. This method only ensures the FILMO requirements according to 2.1 a)–c).

In certain applications, it is relevant to observe the configuration sequence within a SubConf (2.1 e)) and to maintain the configuration sequence of the individual SubConfs themselves (2.1 d)).

Observing sequences may be accomplished by partitioning SubConf into multiple blocks. A token (BARRIER) may be inserted between individual blocks, and can be skipped only if none of the preceding KWs has been rejected (REJ).

If the configuration reaches a BARRIER, and REJ has occurred previously, the BARRIER must not be skipped. A distinction is made between at least two types of barriers:

a) Nonblocking: The configuration is continued with the following SubConf.
b) Blocking: The configuration is continued with additional runs of the current SubConf. BARRIER is not skipped until the current SubConf has been configured completely.

Optimizing Configuration Speed.

Considerations on optimization of the configuration speed: It is not normally necessary to observe the sequence of the configuration of the individual KWs. However, the sequence of activation of the individual PAEs (GO) may need to be observed exactly. The speed of the configuration can be increased by re-sorting the KWs so that all the KWs in which the GO flag has not been set are pulled before the BARRIER. Likewise, all the KWs in which the CHECK flag has been set may need to be pulled before the BARRIER. If a PAE is configured with only one KW, the KW may need to be split into two words, the CHECK flag being set before the BARRIER and the GO flag after the BARRIER.

At the BARRIER it is known whether all CHECKS have been acknowledged with ACK. Since a reject (REJ) occurs only when the CHECK flag is set, all KWs behind the barrier are may be executed in the correct order. The KWs behind the barrier may be run through only once, and the start of the individual PAEs occurs properly.

5.3.3. Garbage Collector

Two different implementations of a garbage collector (GC) are suggested for the approach described in to 5.3.

a) A GC may be implemented as an algorithm or a simple state machine: At the beginning, two pointers point to the starting address of the FILMO: a first pointer (read pointer) points to the current KW to be read by the GC, and a second pointer (write pointer) points to the position to which the KW is to be written. Read pointer is incremented linearly. Each KW whose RelJmp is not equal to "0" (zero) is written to the write pointer address. RelJmp is set at "1" and write pointer is incremented.
b) The GC may be integrated into the FILMO by adding a write pointer to the readout pointer of the FILMO. At the beginning of the FILMO run, the write pointer points to the first entry. Each KW that has been rejected with a REJ in configuration of a PAE is written to the memory location to which the write pointer points. Then write pointer is incremented. An additional FIFO-like memory (e.g., including a shift register) may be needed to temporarily store the KW sent to a PAE in the proper order until the ACK/REJ belonging to the KW is received by the FILMO again. Upon receipt of an ACK, the KW may be ignored. Upon receipt of REJ, the KW may be written to the memory location to which the write pointer is pointing (as described above). Here, the memory of the FILMO may be designed as a multiport memory. In this approach, there is a new memory structure at the end of each FILMO run, with the unconfigured KWs standing in linear order at the beginning of the memory. No additional GC runs may be necessary. Implementation of RelJmp and the respective logic may be completely omitted.

5.4. Prefetching of the ACK/REJ Acknowledgment with Latency

Alternative to 5.3 may be used. The disadvantage of this alternative approach is the comparatively long latency time, corresponding to three times the length of the pipeline.

The addresses and/or flags of the respective PAEs to be configured may be sent on a separate bus system before the actual configuration. The timing may be designed so that at the time the configuration word is to be written into a PAE, its ACK/REJ information is available. If acknowledged with ACK, the CONFIGURATION may be performed; in the case of a reject (REJ), the KWs are not sent to the PAE (ACK/REJ-PREFETCH). FILMO protocol, in particular LOCK, ensures that there will be no unallowed status change of the PAEs between ACK/REJ-PREFETCH and CONFIGURATION.

5.4.1. Structure of FILMO

FILMO may function as follows: KWs may be received in the correct order, either (i) from the memory of the CT or (ii) from the FILMO memory.

The PAE addresses of the KWs read out may be sent to the PAEs, pipelined through a first bus system. The complete KWs may be written to a FIFO-like memory having a fixed delay time (e.g., a shift register).

The respective PAE addressed may acknowledges this by sending ACK or REJ, depending on the PAE's status. The depth of the FIFO corresponds to the number of cycles that elapse between sending the PAE address to a PAE and receipt of the acknowledgment of the PAE. The cycle from sending the address to a PAE until the acknowledgment of the PAE is received is known as prefetch.

Due to the certain delay in the FIFO-like memory, which is not identical to FILMO here, the acknowledgment of a PAE may be received at the CT exactly at the time when the KW belonging to the PAE appears at the output of the FIFO.

Upon receipt of ACK, the KW may be sent to the PAE. Here, no acknowledgment is expected. The PAE status has not changed in an admissible manner in the meantime, so that acceptance is guaranteed.

Upon receipt of REJ, the KW is not sent to the PAE but instead may be written back into the FILMO memory. An additional pointer is available for this, which points to the first address at the beginning of linear readout of the FILMO memory. The counter may be incremented with each value written back to the memory. In this way, rejected KWs are automatically packed linearly, which corresponds to an integrated garbage collector run (see also 5.3).

5.4.2. Sending and Acknowledging Over a Register Pipeline

The approach described here may be used to ensure a uniform clock delay between messages sent and responses received if different numbers of registers are connected between one transmitter and multiple possible receivers of messages. One example of this would be if receivers are located at different distances from the transmitter. The message sent may reach nearby receivers sooner than more remote receivers.

To achieve the same transit time for all responses, the response is not sent back directly by the receiver. Instead the response is sent further, to the receiver at the greatest distance from the sender. This path must have the exact number of receivers so that the response will be received at the time when a response sent simultaneously with the first message would be received at this point. From here out, the return takes place exactly as if the response were generated in this receiver at the greatest distance from the sender.

It will be appreciated that it does not matter here whether the response is actually sent to the most remote receiver or whether it is sent to another chain having registers with the same time response.

6. Hierarchical CT Protocol

As described in PACT10, VPU modules may be scalable by constructing a tree of CTs, the lowest CTs (low-level CTs) of the PAs being arranged on the leaves. A CT together with the PA assigned to the CT is known as a PAC. In general, any desired data or commands may be exchanged between CTs. Any technically appropriate protocol can be used for this purpose.

However, if the communication (inter-CT communication) causes SubConf to start on various low-level CTs within the CT tree (CTTREE), the requirements of the FILMO principle should be ensured to guarantee freedom from deadlock.

In general, two cases are to be distinguished:

1. In the case a low-level CT, the start of a SubConf may be requested. The SubConf may run only locally on the low-level CT and the PA assigned the low-level CT. This case can be processed at any time within the CTTREE and does not require any special synchronization with other low-level CTs.
2. In the case of a low-level CT, the start of a configuration may be requested. The SubConf may run on multiple low-level CTs and the PAs assigned to them. In this case, it is important to be sure that the configuration is called up "atomically" or invisibly on all the CTs involved. This may be accompanied by ensuring that no other SubConf is started during call-up and start of a given SubConf. Such a protocol is known from PACT10. However, a protocol that is even more optimized is desirable.

The protocol described in PACT10 may be inefficient as soon as a pipelined transmission at higher frequencies is necessary. This is because bus communication is subject to a long latency time.

An alternative approach is described in the following sections.

A main function of inter-CT communication is to ensure that SubConfs involving multiple PACs are started without deadlock. Enhanced subconfiguration ("EnhSubConfs") are SubConfs that are not just executed locally on one PAC but instead may be distributed among multiple PACs. An EnhSubConf may include multiple SubConfs, each started by way of low-level CTs. A PAC may include a PAE group having at least one CT.

In order for multiple EnhSubConfs to be able to run on identical PACs without deadlock, a prioritization of their execution may be defined by a suitable mechanism (for example, within the CTTREE). If SubConfs are to be started from multiple different EnhSubConfs running on the same PACs, then these SubConfs may be started on the respective PACs in a chronological order corresponding to their respective priorities.

Example: Two EnhSubConfs are to be started, namely EnhSubConf-A on PACs 1, 3, 4, 6 and EnhSubConf-B on PACs 3, 4, 5, 6. It is important to ensure that EnhSubConf-A is always configured on PACs 3, 4 and 6 exclusively either before or after EnhSubConf-B. For example, if EnhSubConf-A is configured before EnhSubConf-B on PACs 3 and 4, and if EnhSubConf-A is to be configured on PAC 6 after EnhSubConf-B, a deadlock occurs because EnhSubConf-A could not be started on PAC 6, and EnhSubConf-B could not be started on PACs 3 and 4. Such a case is referred to below as crossed or a cross.

To prevent deadlock, it is sufficient to prevent EnhSubConfs from crossing. If there is an algorithmic dependence between two EnhSubConfs, e.g., if one EnhSubConf must be started after the other on the basis of the algorithm, this is normally resolved by having one EnhSubConf start the other.

Example Protocol

Inter-CT communication may distinguish two types of data:

a) a SubConf containing the configuration information,
b) an ID chain containing a list of IDs to be started, together with the information regarding on which PAC the SubConf referenced by the ID is to be started. One EnhSubConf may be translated to the individual SubConfs* to be executed by an ID chain: $ID_{EnhSubConf}\}$ ID chain $\{PAC_1: ID_{SubConf1}), (PAC_2:ID_{SubConf2}), (PAC_3:ID_{SubConf3}), \ldots (PAC_n: ID_{SubConfn})\}$ Inter-CT communication may differentiate between the following transmission modes:

REQUEST: The start of an EnhSubConf may be requested by a low-level CT from the higher-level CT, or by a higher-level CT from another CT at an even higher level. This is repeated until reaching a CT which has stored the ID chain or reaching the root CT, which always has the ID chain in memory.

GRANT: A higher-level CT orders a lower-level CT to start a SubConf. This may be either a single SubConf or multiple SubConfs, depending on the ID chain.

GET: A CT requests a SubConf from a higher-level CT by sending the proper ID. If the higher-level CT has stored (cached) the SubConf, it sends this to the lower-level CT; otherwise, it requests the SubConf from an even higher-level CT and sends it to the lower-level CT after receipt. At the latest, the root CT SubConf will have stored the SubConf.

DOWNLOAD: Loading a SubConf into a lower-level CT.

REQUEST activates the CTTREE either until reaching the root CT, the highest CT in the CTTREE, or until a CT in the CTTREE has stored the ID chain. The ID chain may only be stored by a CT which contains all the CTs included in the list of the ID chain as leaves or branches. In principle, the root CT (e.g., CTR, as describe in PACT10) has access to the ID chain in its memory. GRANT is then sent to all CTs listed in the ID chain. GRANT is sent "atomically." All the branches of a CT may receive GRANT either simultaneously or sequentially but without interruption by any other activity between one of the respective CTs and any other CT which could have an influence on the sequence of the starts of the SubConfs of different EnhSubConfs on the PACs. A low-level CT which receives a GRANT may configure the corresponding SubConf into the PA immediately. The configuration may occur without interruption. Alternatively the SubConf may write into FILMO or into a list which gives the configuration sequence. This sequence may be needed to prevent a deadlock. If the SubConf is not already stored in the low-level CT, the low-level CT may need to request the SubConf using GET from the higher-level CT. Local SubConfs (SubConfs that are not called up by an EnhSubConf but instead concern only the local PA) may be configured or loaded into FILMO between GET and the receipt of the SubConf (DOWNLOAD) if allowed or required by the algorithm. SubConfs of another EnhSubConf started by a GRANT received later may be started only after receipt of DOWNLOAD, as well as configuration and loading into FILMO.

Examples of the structure of SubConf have been described in patent applications PACT05 and PACT10.

The approach discussed here includes separate handling of call-up of SubConf by ID chains. An ID chain is a SubConf having the following property:

Individual SubConfs may be stored within the CTTREE, e.g., by caching them. A SubConf need not be reloaded completely, but instead may be sent directly to the lower-level CT from a CT which has cached the corresponding SubConf. In the case of an ID chain, all the lower-level CTs may need to be loaded from a central CT according to the protocol described previously. It may be efficient if the CT at the lowest level in the CTTREE, which still has all the PACs listed in the ID chain as leaves, has the ID chain in its cache. CTs at an even lower level may need to not store anything in their cache, because they are no longer located centrally above all the PACs of the ID chain. Higher-level CTs may lose efficiency because a longer communication link is necessary. If a request reaches a CT having a complete ID chain for the EnhSubConf requested, this CT may trigger GRANTs to the lower-level CTs involved. The information may be split out of the ID chain so that at least the part needed in the respective branches is transmitted. To prevent crossing in such splitting, it may be necessary to ensure that the next CT level will also trigger all GRANTs of its part of the EnhSubConf without being interrupted by GRANTs of other EnhSubConfs. One approach to implementing this is to transmit the respective parts of the ID chain "atomically." To control the caching of ID chains, it may be useful to mark a split ID chain with a "SPLIT" flag, for example, during the transmission.

An ID chain may be split when it is loaded onto a CT which is no longer located centrally within the hierarchy of the CTTREE over all the PACs referenced within the ID chain. In this case, the ID chain may no longer be managed and cached by a single CT within the hierarchy. Multiple CTs may process the portion of the ID chain containing the PACs which are leaves of the respective CT. A REQUEST may need to be relayed to a CT which manages all the respective PACs. It will be appreciated that the first and most efficient CT in terms of hierarchy (from the standpoint of the PACs) which can convert REQUEST to GRANT may be the first CT in ascending order, starting from the leaves, which has a complete, unsplit ID chain. Management of the list having allocations of PAC to ID does not require any further explanation. The list can be processed either by a program running within a CT or it may be created from a series of assembler instructions for controlling lower-level CTs.

A complete ID chain may then have the following structure: $ID_{EnhSubConf}\}$ ID chain{SPLIT, $(PAC_1{:}ID_{SubConf1})$, $(PAC_2{:}\ ID_{SubConf2})$, $(PAC_3{:}ID_{SubConf3})$ . . . $(PAC_n{:}ID_{SubConfn})$}

6.1. Example Procedure for Precaching SubConfs

Within the CTTREE, SubConfs may be preloaded according to certain conditions, e.g., the SubConfs may be cached before they are actually needed. This method may greatly improve performance within the CTTREE.

A plurality of precache requests may be provided. These may include:

a) A load request for an additional SubConf may be programmed within a SubConf being processed on a low-level CT.
b) During data processing within the PA, a decision may be made as to which SubConf is to be preloaded. The CT assigned to the PA may be requested by a trigger. Accordingly, the trigger may be translated to the ID of a SubConf within the CT, to preload a SubConf. It may also be possible for the ID of a SubConf to be calculated in the PA or to be configured in advance in the PA. The message to the assigned CT may contain the ID directly.

The SubConf to be loaded may be cached without being started. The start may take place at the time when the SubConf would have been started without prior caching. The difference is that at the time of the start request, the SubConf is already stored in the low-level CT or one of the middle-level CTs and either may be configured immediately or may be loaded very rapidly onto the low-level CT and then started. This may eliminate a time-consuming run-through of the entire CTTREE.

A compiler, which generates the SubConf, makes it possible to decide which SubConf is to be cached next. Within the program sequence graphs, it may be possible to see which SubConfs could be executed next. These are then cached. The program execution decides in run time which of the cached SubConfs is in fact to be started.

A preloading mechanism may be provided which removes the cached SubConf to make room in the memory of the CT for other SubConfs. Like precaching, deletion of certain SubConfs by the compiler can be predicted on the basis of program execution graphs.

Mechanisms for deletion of SubConfs as described in PACT10, (e.g., the one configured last, the one configured first, the one configured least often (see PACT10)) may be provided in the CTs in order to manage the memory of the CT accordingly. It will be appreciated that not only explicitly precached SubConfs can be deleted, but also any SubConf in a CT memory generally be deleted. If the garbage collector has already removed a certain SubConf, the explicit deletion becomes invalid and may be ignored.

An explicit deletion can be brought about through a command which may be started by any SubConf. This includes any CT within the tree, its own CT or explicit deletion of the same SubConf (e.g., deletion of its own Subconf in which the command stands, in which case correct termination must be ensured).

Another possibility of explicit deletion is to generate, on the basis of a certain status within the PAs, a trigger which is relayed to the CT and analyzed as a request for explicit deletion.

6.2. Interdependencies Among PAEs

For the case when the sequence in which PAEs of different PACs belonging to one EnhSubConf are configured is relevant, an alternative procedure may be provided to ensure that this chronological dependence is maintained. Since there may be multiple CTs in the case of multiple PACs, these CTs may exchange information to determine whether all PAEs which must be configured before the next PAE in each PAC have already accepted their GO from the same configuration. One possibility of breaking up the time dependencies and preventing unallowed GOs from being sent is to exchange the exclusive right to configuration among the CTs. The KWs may be recognized so that a correct order is ensured through the sequence of their configurations and the transfer of the configuration rights. Depending on how strong the dependencies are, it may be sufficient if both CTs configure their respective PA in parallel up to a synchronization point. The CTs may then wait for one another and continue configuring in parallel until the next synchronization point. Alternatively, if no synchronization point is available, the CTs may continue configuring in parallel until the end of the EnhSubConf.

7. Example SubConf Macros

It will be appreciated that caching of SubConf may be especially efficient if as many SubConfs as possible can be cached. Efficient use of caching may be particularly desirable with high-level language compilers, because compilers often generate recurring routines on an assembler level, e.g., on a SubConf level in VPU technology.

In order to maximize reuse of SubConf, special SubConf macros (SubConfM) having the following properties may be introduced:

- no absolute PAE addresses are given; instead a SubConf is a prelaid-out macro which uses only relative addresses;
- application-dependent constants are transferred as parameters.

With a special SubConf macros, the absolute addresses are not calculated until the time when the SubConf is loaded into the PA. Parameters may be replaced by their actual values. To do so, a modified copy of the original special SubConf may be created so that either (I) this copy is stored in the memory of the CT (integrated FILMO) or (ii) it is written immediately to the PA, and only rejected KWs (REJ) are written into FILMO (separate FILMO). It will be appreciated that in case (ii), for performance reasons, the address adder in the hardware may sit directly on the interface port of the CT to the PA/FILMO. Likewise, hardware implementations of parameter transformation may also me employed, e.g., through a lookup table which is loaded before configuration.

8. Re-storing Cache Statistics

International Patent WO 99/44120 (PACT10) describes application-dependent cache statistics and control. This method permits an additional data-dependent optimization of cache performance because the data-dependent program performance is expressed directly in cache optimization.

One disadvantage of the known method is that cache performance is optimized only during run time. When the application is restarted, the statistics are lost. When a SubConf is removed from the cache, its statistics are also lost and are no longer available, even when called up again even within the same application processing.

In an example embodiment according to the present invention, on termination of an application or removal of a SubConf from the cache, the cache statistics may be sent first together with the respective ID to the next higher-level CT by way of the known inter-CT communication until the root CT receives the respective statistics. The statistics may be stored in a suitable memory, e.g., in a volatile memory, a nonvolatile memory or a bulk memory, depending on the application. The memory may be accessed by way of a host. The statistics may be stored so that they are allocated to the respective SubConf. The statistics may also be loaded again when reloading the SubConf. In a restart of SubConf, the statistics may also be loaded into the low-level CT.

The compiler may either compile neutral blank statistics or generates statistics which seem to be the most suitable statistics for a particular approach. These statistics preselected by the compiler may then be optimized in run time according to the approach described here. The preselected statistics may also be stored and made available in the optimized version the next time the application is called up.

If a SubConf is used by several applications or by different low-level CTs within one application (or if the SubConf is called up from different routines), then it may not be appropriate to keep cache statistics because the request performance and run performance in each case may produce different statistics. Depending on the application, either no statistics are used or a SubconfM may be used.

When using a SubConfM, the transfer of parameters may be extended so that cache statistics are transferred as parameters. If a SubConfM is terminated, the cache statistics may be written back to the SubConf (ORIGIN) which previously called up the SubConfM. In the termination of ORIGIN, the parameters may then be stored together with the cache statistics of ORIGIN. The statistics may be in a subsequent call-up and again be transferred as parameters to the SubConfM.

Keeping and storing application-based cache statistics may be also be suitable for microprocessor, DIPS, FPGA and similar modules.

9. Structure of the Configuration Bus System

PACT07 describes an address—and pipeline-based data bus system structure. This bus system is suitable for transmitting configuration data.

In an example embodiment of the present invention, in order to transmit data and configurations over the same bus system, status signals indicating the type of data transmitted may be introduced. The bus system may be designed so that the CT can optionally read back configuration registers and data registers from a PAE addressed previously by the CT.

Global data as describe in PACT07 as well as KWs may be transmitted over the bus system. The CT may act as its own bus node. A status signal may be employed to characterize the transmission mode. For example, the following structure is possible with signals S0 and S1:

| S1 | S0 | Meaning |
|---|---|---|
| 0 | 0 | Write data |
| 0 | 1 | Read data |
| 1 | 0 | Write a KW and/or a PAE address |
| 1 | 1 | Return a KW or any register from the addressed PAE |

The REJ signal may be added to the bus protocol (ACK) according to PACT07 to signal rejects to the CT describe in FILMO protocol.

10. Example Procedure for Combining Individual Registers

Independent configuration registers may be used for a logical separation of configuration data. The logical separation may be needed for the differential-configuration because logically separated configuration data is not usually known when carrying out a differential configuration. This may result in a large number of individual configuration registers, each individual register containing a comparatively small amount of information. In the following example, the 3-bit configuration values KW-A, B, C, D can be written or modified independently of one another:

| | | | | |
|---|---|---|---|---|
| 0000 | 0000 | 0000 | 0 | KW-A |
| 0000 | 0000 | 0000 | 0 | KW-B |
| 0000 | 0000 | 0000 | 0 | KW-C |
| 0000 | 0000 | 0000 | 0 | KW-D |

Such a register set may be inefficient, because only a fraction of the bandwdith of the CT bus is used.

The structure of configuration registers may be greatly optimized by assigning an enable to each configuration value, indicating whether the value is to be overwritten in the current configuration transfer.

Configuration values KW-A, B, C, D of the above example are combined in one configuration register. An enable is assigned to each value. For example, if EN-x is logical "0," the KW-x is not changed in the instantaneous transfer; if EN-x is logical "1," KW-x is overwritten by the instantaneous transfer.

| | | | | | | | |
|---|---|---|---|---|---|---|---|
| En-A | KW-A | En_B | KW-B | En-C | KW-C | En-D | KW-D |

11. Wave Reconfiguration (WRC)

Figure 24:
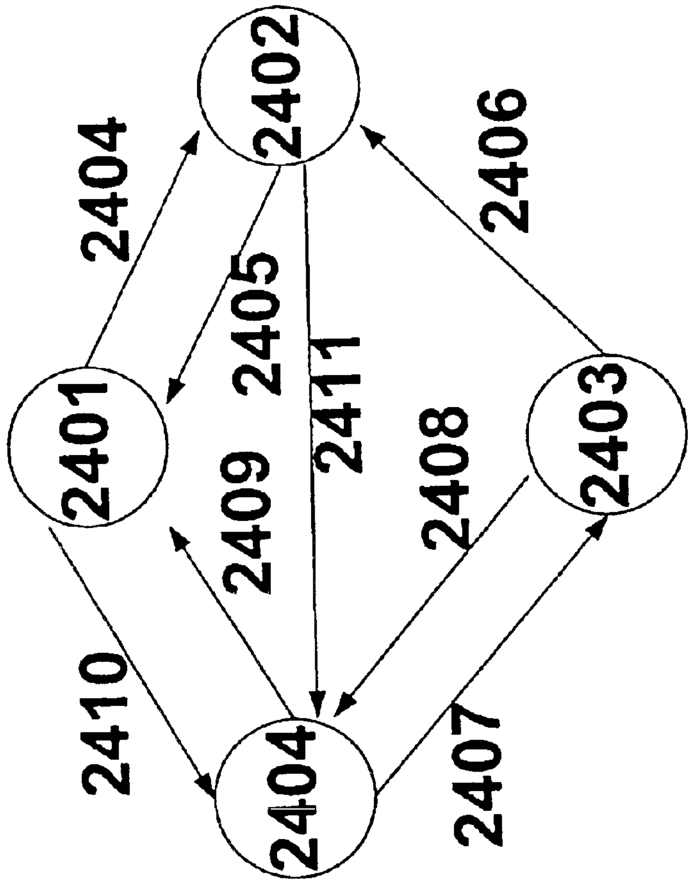

PACT13 describes a reconfiguration method ("wave reconfiguration "or" "WRC") in which reconfiguration is synchronized directly and chronologically with the data stream See, e.g., FIG. 24 in PACT13.

The proper functioning of Wave reconfiguration, may require that unconfigured PAEs can neither accept nor send data or triggers. This means that an unconfigured PAE behaves completely neutrally. This may be provided in VPU technology by using handshake signals (e.g., RDY/ACK) for trigger buses and data buses (see, e.g., U.S. Pat. No. 6,425,068). An unconfigured PAE then generates no RDYs, so no data or triggers are sent, no ACKs, so no data or triggers are received.

This mode of functioning is not only helpful for wave reconfiguration, but it is also one of the possible bases for run time reconfigurability of VPU technology.

An extension of this approach is explained below. Reconfiguration may be synchronized with ongoing data processing. Within data processing in the PA, it is possible to decide I. which next SubConf becomes necessary in the reconfiguration;

ii. at what time the SubConf must become active, e.g., with which data packet (ChgPkt) the SubConf must be linked.

The decision as to which configuration is loaded may be made based on conditions and is represented by triggers (wave configuration preload=WCP).

Linking of the data packets to the KWs of a SubConf may be ensured by the data bus protocol (RDY/ACK) and the CT bus protocol (CHECK, ACK/REJ). An additional signal (wave configuration trigger=WCT) may indicate in which data packet (ChgPkt) reconfiguration is to be performed and optionally which new configuration is to be carried out or loaded. WCT can be implemented through simple additional lines or the trigger system of the VPU technology. Multiple VPUs may be used simultaneously in the PA, and each signal may control a different reconfiguration.

11.1. Example Procedure for Controlling the Wave Reconfiguration

It will appreciated that a distinction may be made between two application-dependent WRCs:

A1) wave reconfiguration within one SubConf,

A2) wave reconfiguration of different SubConfs.

In terms of the hardware, a distinction may be made between two basic types of implementation:

I1) implementation in the CT and execution on request

I2) implementation through additional configuration registers (WRCReg) in the PAEs. Example embodiments of the WRCRegs are described below. The WRCs are either be a) preloaded by the CT at the time of the first configuration of the respective SubConf, or b) preloaded by the CT during execution of a SubConf depending on incoming WCPs.

During data processing, the WRCRegs that are valid at that time may be selected by one or more WCTs.

The effects of wave reconfiguration on the FILMO principle are discussed below.

11.1.1. Performing WRC According to A1

Reconfiguration by WRC may be possible at any time within a SubConf (A1). First, the SubConf may be configured normally, so the FILMO principle is ensured. During program execution, WRCs may need to use only resources already allocated for the SubConf.

Case I1)

WRC may performed by differential configuration of the respective PAEs. WCP may be sent to the CT. Depending on the WCP, there may be a jump to a token within the configured SubConf:

An example code is given below:

```
begin SubConf
main:
    PAE 1, CHECK&GO
    PAE 2, CHECK&GO
    . . .
    PAE n, CHECK&GO
    set TriggerPort 1 // WCT 1
    set TriggerPort 2 // WCT 2
scheduler:
    on TriggerPort 1, do main1 // jump depending on WCT
    on TriggerPort 2, do main2 // jump depending on WCT
wait:
    wait for trigger
main1:
    PAE 1, DIFFERENTIAL&GO
    PAE 2, DIFFERENTIAL&GO
    . . .
    PAE n, DIFFERENTIAL&GO
    wait for trigger
main2:
    PAE 1, DIFFERENTIAL&GO
    PAE 2, DIFFERENTIAL&GO
    . . .
    PAE n, DIFFERENTIAL&GO
    wait for trigger
end SubConf
```

The interface (TrgIO) between CT and WCP may be configured by "set Triggerport." According to the FILMO protocol, TrgIO behaves like a PAE with respect to the CT, e.g., TrgIO corresponds exactly to the CHECK, DIFFERENTIAL, GO protocol and responds with ACK or REJ for each trigger individually or for the group as a whole.

If a certain trigger has already been configured, it may Despond with REJ.

If the trigger is ready for configuration, it responds with ACK.

Figure 8:
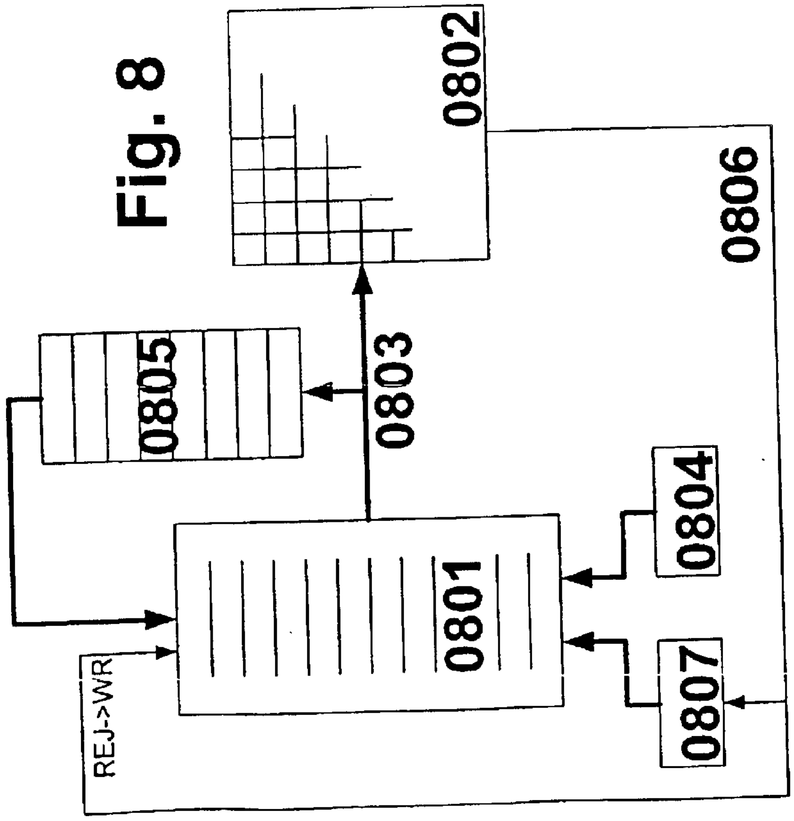

FIG. 8 from PACT10 is to be extended accordingly by including this protocol.

Upon receipt of WCT, the respective PAE may start the corresponding configuration.

Case I2)

If the WRCRegs have already been written during the configuration, the WCP may be omitted because the complete SubConf has already been loaded into the respective PAE Alternatively, depending on certain WCPs, certain WRCs may be loaded by the CT into different WRCRegs defined in the WRC. This may be necessary when, starting from one SubConf, it branches off into more different WRCs due to WRTs than are present as physical WRCRegs.

The trigger ports within the PAEs may be configured so that certain WRCRegs are selected due to certain incoming WRTs:

```
begin SubConf
  main:
    PAE1_TriggerPort 1
    PAE1_TriggerPort 2
    PAE1_WRCReg1
    PAE1_WRCReg2
    PAE1_BASE, CHECK&GO
    . . .
    PAE2_TriggerPort 1
    PAE2_TriggerPort 2
    PAE2_WRCReg1
    PAE2_WRCReg2
    PAE2_BASE, CHECK&GO
    . . .
    PAEn_TriggerPort 1
    PAEn_TriggerPort 2
    PAEn_WRCReg1
    PAEn_WRCReg2
    PAEn_BASE, CHECK&GO
endSubConf
```

11.1.2. Performing WRC According to A2

Case I1)

The CT performing a WRC between different SubConfs corresponds in principle to A1/I1. The trigger ports and the CT-internal sequencing may need to correspond to the FILMO principle. KWs rejected by the PAEs (REJ) may be written to FILMO. These principles have been described in PACT10.

All WCPs may be executed by the CT. It will be appreciated that this may guarantee a deadlock-free (re) configuration. Likewise, the time of reconfiguration, which may be marked by WCT, may be sent to the CT and may be handled atomically by the CT. For example, all PAEs affected by the reconfiguration may receive the reconfiguration request through WCT either simultaneously or at least without interruption by another reconfiguration request. It will be appreciated that this approach may guarantee freedom from deadlock.

Case I2)

If the WRCRegs are already written during the configuration the WCP may be omitted because the complete SubConf is already loaded into the respective PAE.

Alternatively, depending on certain WCPs, WRCs determined by the CT may be loaded into different WRCRegs defined in the WRC. It will be appreciated this approach may be necessary when, starting from a SubConf, branching off into more different WRCs due to WRTs than there are physical WRCRegs.

Several WCTs being sent to different PAEs at different times may need to be prevented because this may result in deadlock.

For example: WCT1 of a SubConf SA reaches PAE p1 in cycle t1, and WCT2 of a SubConf SB reaches PAE p2 at the same time. The PAEs are configured accordingly. At time t2, WCT1 reaches p2 and. WCT2 reaches p1. A deadlock has occurred. It should also be pointed out that this example can also be applied in principle to A2-I1. It will be appreciated that, this is why WCT there may be sent through the trigger port of the CT and may be handled by the CT.

A deadlock may also be prevented by the fact that the WCTs generated by different PAEs (sources) are prioritized by a central instance (ARB). This permits exactly one WCT is sent to the respective PAEs in one cycle. Various approaches to prioritization may be used. Example prioritization approaches are listed below.

a) An arbiter may be used. For example, the round robin arbiter described in PACT10 is especially suitable. It will be appreciated that the exact chronological order of occurrence of WCTs may be lost.

b) If chronological order is to be preserved, the following example methods are suggested:

b1) A FIFO first stores the incoming WCTs in order of receipt. WCTs received simultaneously are stored together. If no WCT occurs at a given time, no entry is generated. An arbiter downstream from the FIFO selects one of the entries if there have been several at the same time.

b2) A method described in PACT18 permits time sorting of events on the basis of an associated time information (time stamp). The correct chronological order of WCTs may be ensured by analyzing this time stamp.

Suitable relaying of WCTs from ARB to the respective PAEs may ensure that prioritized WCTs are received by the PAEs in the correct order. An example approach to ensuring this order is for all triggers going from ARB to the respective PAEs to have exactly the same length and transit time. This may be ensured by suitable programming. This may also be ensured by a suitable layout through a router, e.g., by adjusting the wiring using registers to compensate for latency at the corresponding points. To ensure correct relaying, the procedure described in PACT18 may also be used for time synchronization of information.

No explicit prioritization of WCPs may be needed because the WCPs sent to the CT may be processed properly by the FILMO principle within the CT. It may be possible to ensure that the time sequence is maintained, e.g., by using the FILMO principle (see 2.1e).

11.1.3. Note for all Cases

The additional configuration registers of the PAEs for wave reconfiguration may be configured to behave according to the FILMO principle, i.e., the registers may support the states described and the sequences implemented and respond to protocols such as CHECK and ACK/REJ.

11.2. Example Reconfiguration Protocols and Structure of WRCReq

The wave reconfiguration procedure will now be described in greater detail. Three alternative reconfiguration protocols are described below.

Normal CT protocol: The CT may reconfigure each PAE individually only after receipt of a reconfiguration reques. For example, the CT may receive a reconfiguration request for each PAE reached by ChgPkt. This approach may not be efficient because it entails a very high communication complexity, e.g., for pipelined bus systems.

Synchronized pipeline: This protocol may be much more efficient. The pipelined CT bus may be used as a buffer. The pipeline register assigned to a PAE may store the KWs of this PAE until the PAE can receive the KWs. Although the CT bus pipeline (CBP) is blocked, it can be filled completely with the KWs of the wave reconfiguration.

a) If the CBP runs in the same direction as the data pipeline, a few cycles of latency time may be lost. The loss may occur until a KW of the PAE which follows directly is received by its pipeline register after a PAE has received a KW.

b) If the CBP runs opposite the data pipeline, the CBP can be filled completely with KWs which are already available at the specific PAEs. Thus, wave reconfiguration without any time lag may be possible.

Synchronized shadow register: (This protocol may be the most efficient). Immediately after selection of the SubConf (I) and before receipt of ChgPkt (ii), the CT may write new KWs into the shadow registers of all PAEs. The shadow registers may be implemented in any embodiment. The following possibilities are suggested in particular: a) a register stage connected upstream from the actual configuration register, b) a parallel register set which is selected by multiplexers, c) a FIFO stage upstream from the actual configuration registers. At the time when ChgPkt (ii) is received by a PAE, it copies the shadow register into the corresponding configuration register. In the optimum case, this copying may take place in such a way that no working cycle is lost. If no writing into the shadow register takes place (e.g., if it is empty) despite the receipt of ChgPkt, data processing may stop until the KW is received by the shadow register. If necessary, the reconfiguration request may be relayed together with ChgPkt from one PAE to the next within a pipeline.

12. Forms of Parallelism and Sequential Processing

Due to a sufficiently high reconfiguration performance, sequential computational models can be mapped in arrays. Pro example, the low-level CTs may represent a conventional code fetcher. The array may operate with microprogrammable networking as a VLIW-ALU. Different forms of parallelism may be mapped in arrays of computing elements. Examples may include:

Pipelining: Pipelines may be made up of series-connected PAEs. VPU-like protocols may allow simple control of the pipeline.

Instruction level parallelism: Parallel data paths may be constructed through parallel-connected PAEs. VPU-like protocols, e.g., the trigger signals, allow a simple control.

SMP, multitasking and multiuser: Independent tasks may be executed automatically in parallel in one PA. It will be appreciated that this parallel execution may be facilitated by the freedom from deadlock of the configuration methods.

With a sufficient number of PAEs, all the essential parts of conventional microprocessors may be configured on the PA. This may allow sequential processing of a task even without a CT. The CT need not become active again until the configured processor is to have a different functionality, e.g., in the ALU, or is to be replaced completely.

13. Exemplary Embodiments and Diagrams

FIGS. 1 through 3 show the structure of an example SubConf. CW-PAE indicates the number of a KW within a PAE having the address PAE (e.g., 2–3 is the second KW for the PAE having address 3). In addition, this also shows the flags C=check, D=differential, G=go), a set flag being indicated with "*" symbol.

FIG. 1 illustrates the simplest linear structure of a SubConf. This structure has been described in PACT10. A PAE may be tested during the first configuration (C), then may be configured further (D) and finally is started (G) (see PAE having address 0). Simultaneous testing and starting are also possible (CG,) This is illustrated for the PAE having address 1 (0101).

FIG. 2 illustrates a SubConf which has been re-sorted so that a barrier (0201) has been introduced. All PAEs must be tested before the barrier. The barrier then waits until receipt of all ACKs or REJs. If no REJ occurs, the barrier is skipped, the differential configurations are performed, and the PAEs are started. If a REJ occurs, the barrier is not skipped, and instead FILMO runs are executed until no more REJ occurs and then the barrier is skipped. Before the barrier, each PAE must be tested, and only thereafter can the PAEs be configured differentially and started. If testing and starting originally took place in the same cycle, the KW must now be separated (0101⇒0202, 0203).

FIG. 3 illustrates an example a SubConf that has been re-sorted so that no barrier is necessary. Instead a latency period during which no further check can be performed is inserted between check and receipt of ACK/REJ. This may be accomplished by combining the KWs into atoms (0301). The first KW of an atom may perform a check (0302). The block may then be filled with differential KWs or optionally NOPs (0303) until the end of the latency period. The number of differential KWs depends on the latency period. For reasons of illustration, a latency period of three cycles has been selected as an example. ACK/REJ is received at 0304. At this point a decision may be made as to whether configuration is to be continued with the next Kw, which may (but need not necessarily) contain a check (0305). Alternatively, the configuration may be terminated on the basis of a REJ to preserve the order.

It will be appreciated that in configuring a PAE X a check may first be performed then, receipt of ACK/REJ may be waited on. A PAE that has already been checked may be configured further during this period of time, or NOPs must be introduced. PAE X may then be configured further. Example: Check of PAE (0302), continuation of configuration (0306). At 0307, NOPs may need to be introduced after a check because no differential configurations are available. Points 0308 illustrate the splitting of configurations over multiple blocks (three in this case), with one check being omitted (0309).

Figure 4:
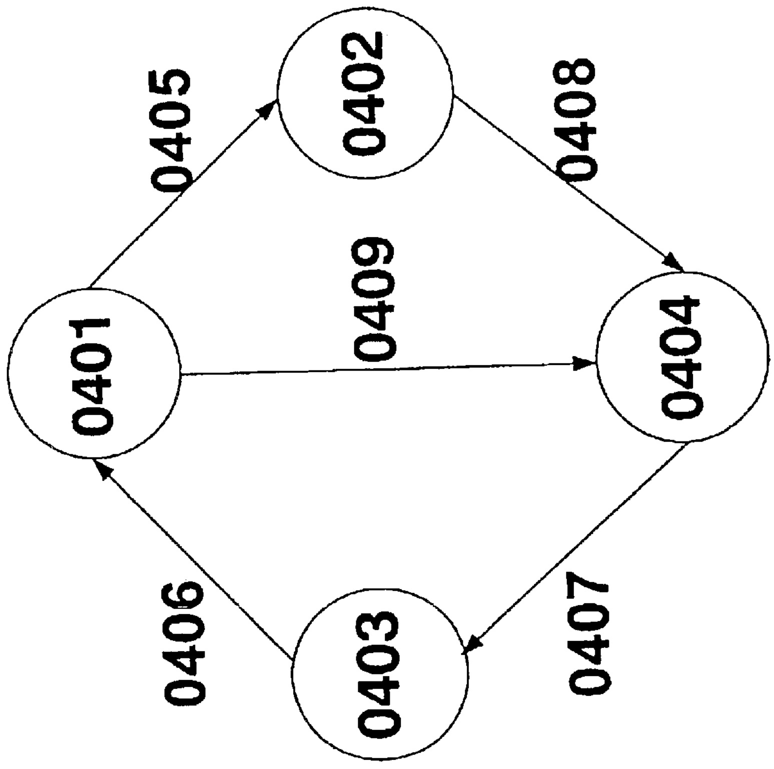

FIG. 4 illustrates an example state machine for implementation of PAE states, according to an example embodiment of the present invention. The initial status is IDLE (0401). By configuring the check flag (0405), the state machine goes into the "allocated" state (0402). Configuring the LAST flag (0409, 0408) starts the PAE; the status is "configured" (0404). By local reset (0407) the PAE goes into the "unconfigured" state (0403). In this embodiment, the PAE returns to IDLE only after a query about its status by LOCK/FREE (0406).

Local reset and LAST can also be sent by the CT through a broadcast (see moduleID).

FIGS. 5 through 9 show possible implementations of FILMO procedures, as described in section 5. It will be appreciated that only the relevant subassemblies which function as an interface with the PA are shown. Interfaces with the CT are not described here. These can be implemented as described in PACT10, with minor modifications, if any.

Figure 5:
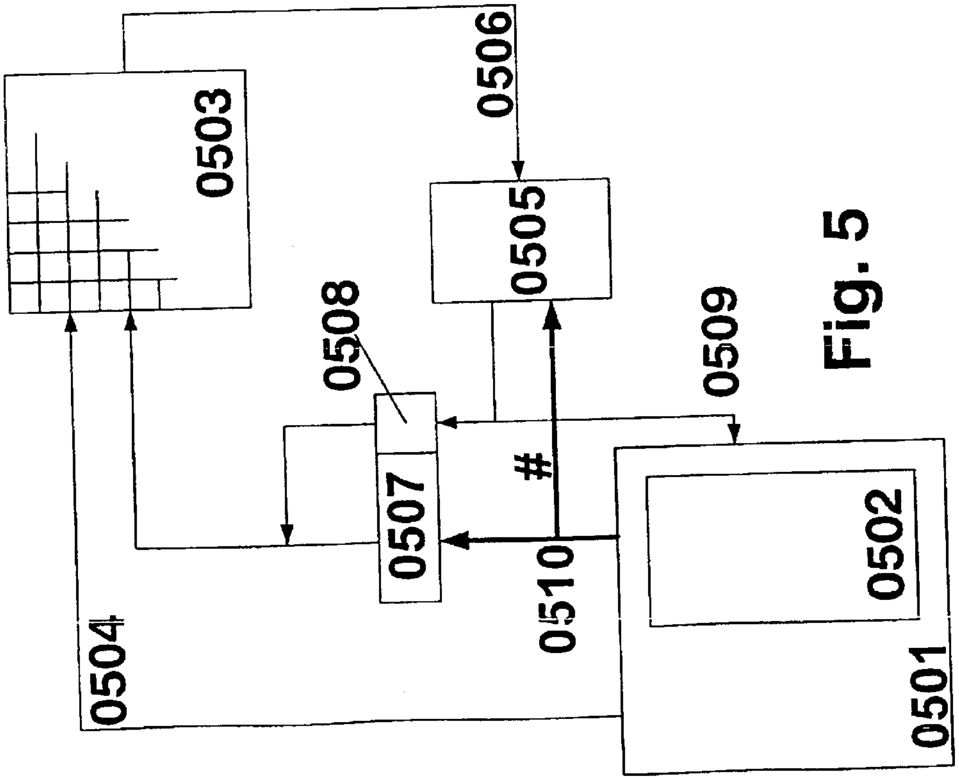

FIG. 5 illustrates the structure of a CT interface to the PA when using a STATELUT, according to an example embodiment of the present invention. According to 5.1. A CT 0501 having RAM and integrated FILMO (0502) is shown in abstracted form and is not the function of the CT is described in PACT10 and PACT05. The CT may inquire as to the status of the PA (0503) by setting the LOCK signal (0504). Each PAE whose status has changed since the last LOCK relays (0506) this change to the STATELUT (0505). This relaying may take place so that the STATELUT can allocate its status uniquely to each PAE. Several conventional approaches may be used for this purpose. For example, each PAE may send its address and status to the STATELUT, which then stores the status of each PAE under its address.

The CT may write KWs (0510) first into a register (0507). At the same time, a lookup may performed under the address (#) of the PAE pertaining to the respective KW in the STATELUT (0505). If the status of the PAE is "not configured," the CT may receive an ACK (0509), otherwise a REJ. A simple protocol converter (0508) converts an ACK into a RDY in order to write the KW to the PA, and REJ is converted to notRDY to prevent writing to the PA.

It will be appreciated that relaying LOCK, RDY and KW to the PA and in the PA, like the acknowledgment of the status of the PAEs by the PA, may be pipelined, e.g., by running through registers.

Figure 6:
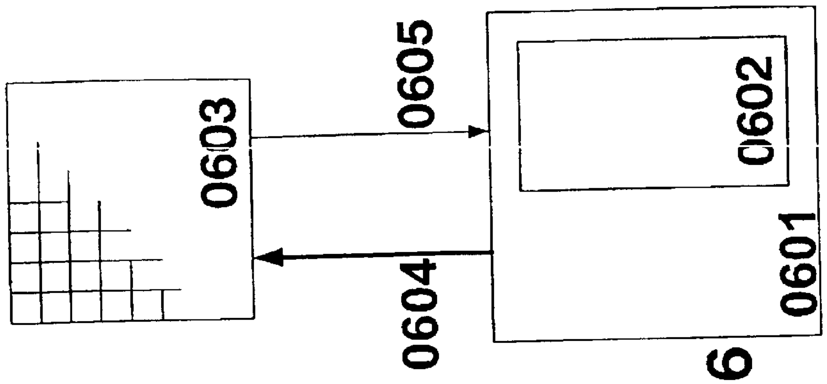

FIG. 6 illustrates an example procedure for re-sorting KWs, according to an embodiment of the present invention. This procedure has a relatively low level of complexity. A CT (0601) having integrated FILMO (0602) is modified so that an acknowledgment (0605) (ACK/REJ) is expected only for the first KW (0604) of an atom sent to the PA (0603). The acknowledgment may be analyzed for the last KW of an atom. In the case of ACK, the configuration may be continued with the next atom, and REJ causes termination of configuration of the SubConf.

Figure 7:
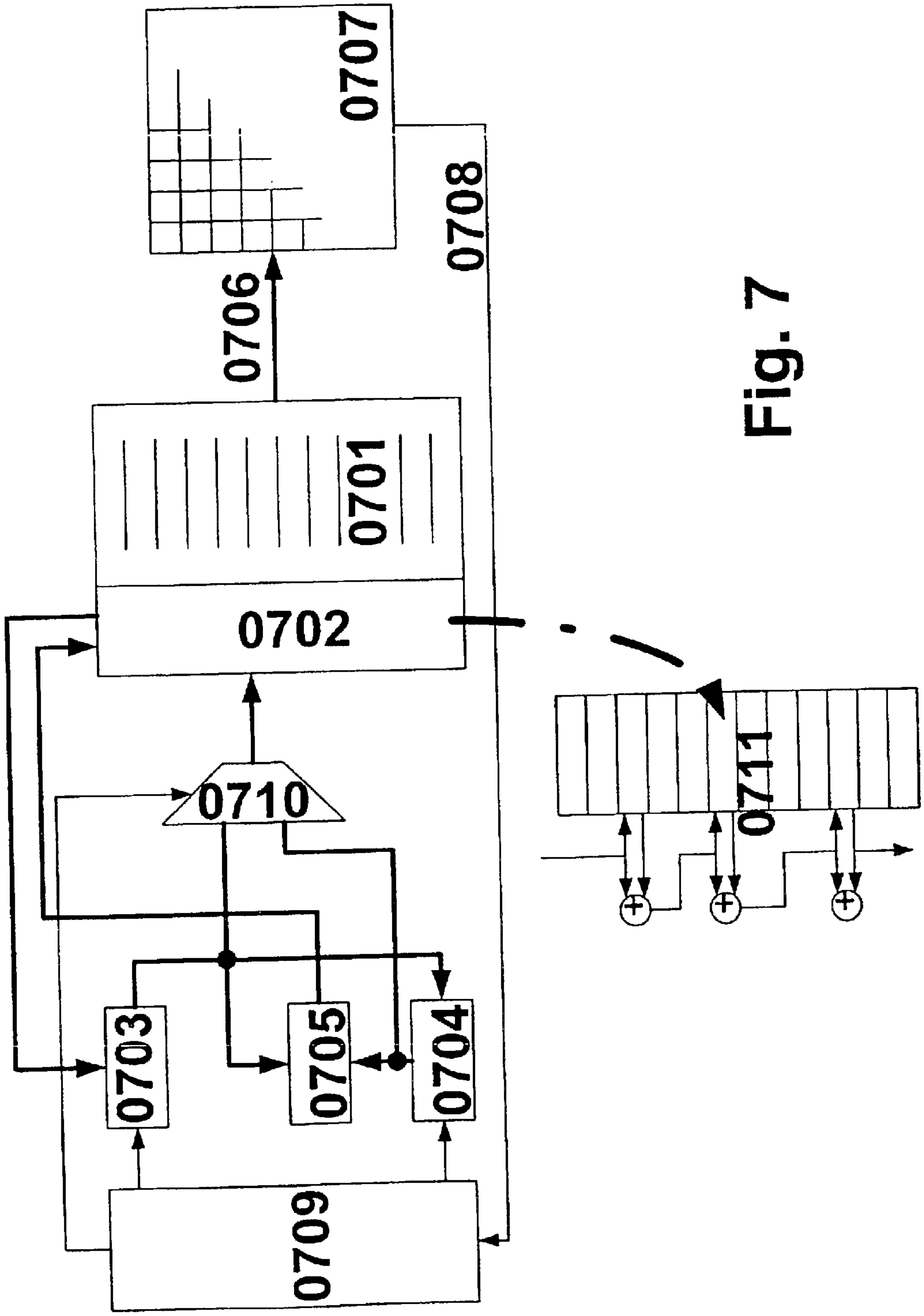

FIG. 7 illustrates an example FILMO (0701), according to an example embodiment of the present invention. The RELJMP memory (0702) may be assigned to FILMO, each entry in RELJMP being assigned to a FILMO entry. FILMO here is designed as an integrated FILMO, as described in PACT10. It will be appreciated that RELJMP may represent a concatenated list of KWs to be configured. It will also be appreciated that FILMO may contain CT commands and concatenation, as described in PACT10. The concatenated list in RELJMP may be generated as follows: The read pointer (0703) points to the KW which is being configured. The address of the KW rejected (REJ) most recently is stored in 0704. If the KW (0706) being configured is accepted by the PA (0707) (ACK, 0708), then the value stored in 0702 at the address to which 0703 points may be added to 0703. This results in a relative jump.

The KW being configured at the moment may be rejected (REJ, 0708. Then, the difference between 0703 and 0704, may be calculated by a subtractor (0705. The difference may be stored in RelJmp, e.g., at the address of the KW rejected last and stored in 0704. The current value of 0703 may be stored in 0704. Then the value stored in 0702 at the address to which 0703 points may be added to 0703. This yields a relative jump. Control may be assumed by a state machine (0709). The state machine may be implemented according to the sequence described here. The address for RelJmp may be determined by the state machine 0709, e.g., using a multiplexer (0710). Depending on the operation, the address may be selected from 0703 or 0704. To address 0701 and 0702 efficiently and differently at the same time, 0702 may be physically separated from 0701, so that there are two separate memories which can be addressed separately.

0711 illustrates the functioning of the relative addressing. The address pointing at an entry in RelJmp may be added to the content of RelJmp, yielding the address of the next entry.

FIG. 8 illustrates an example procedure for analyzing acknowledgments, possible implementation of the method according to an example embodiment of the present invention Entries in FILMO (O801) may be managed linearly, so RelJmp may not be needed. FILMO 0801 is implemented as a separate FILMO. KWs (0803) written into the PA (0802) may be addressed by a read pointer (0804). All KWs may be written in the order of their configuration into a FIFO or a FIFO-like memory (0805).

The FIFO may be implemented as a shift register. The depth of the memory is exactly equal to the number of cycles elapsing from sending a KW to the PA until receipt of the acknowledgment (RDY/ACK, 0806).

Upon receipt of a REJ, the rejected KW, which is assigned to the REJ and is at the output of the FIFO, may be written into 0801. REJ is used here as a write signal for FILMO (REJ->WR). The write address may be generated by a write pointer (0807), which may be incremented after the write access.

Upon receipt of an ACK, nothing happens, the configured KW assigned to the ACK is ignored and 0807 remains unchanged.

It will be appreciated that this procedure may result in a new linear sequence of rejected KWs in the FILMO. The FILMO may be implemented as a dual-ported RAM with separate read and write ports.

Figure 9:
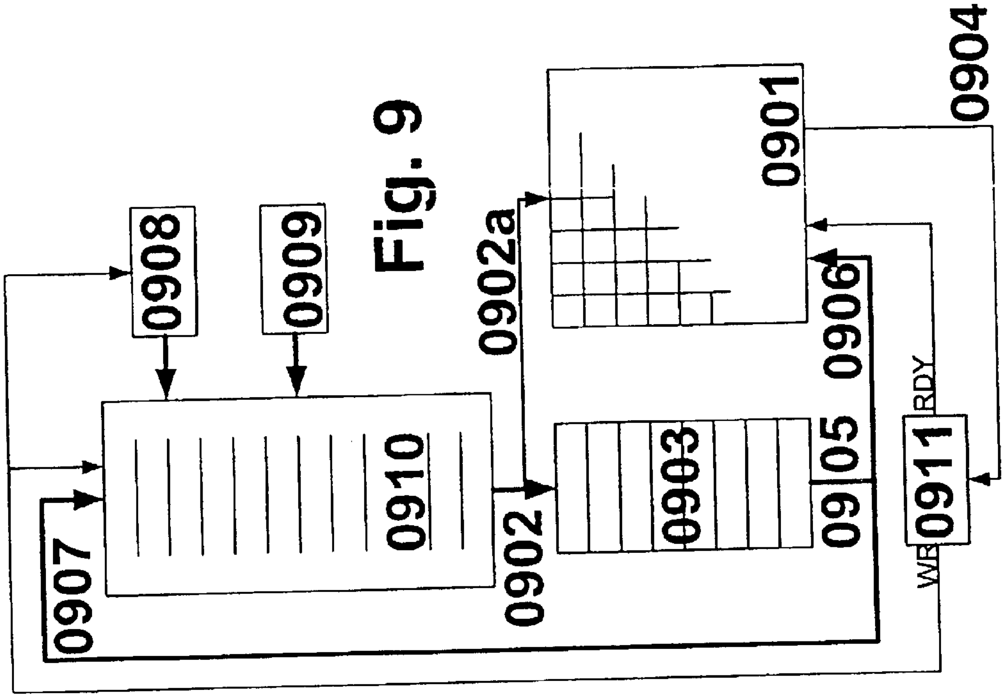

FIG. 9 illustrated an example procedure for pre-fetching, according to an example embodiment of the present invention. It will be appreciated that this procedure is a modification of the procedure described in 5.3.

The KW (0902) to be written into the PA (0901) may be addressed by a read pointer (0909) in FILMO (0910). The address and flags (0902*a*) of the PAE to be configured may be sent to the PA as a test. The KW having the address of the PAE to be configured may be written to a FIFO-like memory (0903). It will be appreciated that this FIFO may correspond to 0805. 0902*a* may be transmitted to the PA in a pipeline. Access is analyzed and acknowledged in the PAE addressed. Acknowledgment (RDY/ACK) may also be sent back pipelined (0904). 0903 delays exactly for as many cycles as have elapsed from sending 0902*a* to the PA until receipt of the acknowledgment (RDY/ACK, 0904).

If acknowledged with ACK, the complete KW (0905) (address+data) at the output of 0903 which is assigned to the respective acknowledgment may be pipelined to the PA (0906). No acknowledgment is expected for this, because it is already known that the addressed PAE will accept the KW.

In the case of REJ, the KW may be written back into the FILMO (0907). A write pointer (0708) which corresponds to 0807, may be used for this purpose. The pointer may be incremented in this process.

0904 may be converted here by a simple protocol converter (0911) (i) into a write signal for the PA (RDY) in the case of ACK and (ii) into a write signal 0901 for the FILMO (WR) in the case of REJ.

It will be appreciated that a new linear sequence of rejected KWs may be stored in the FILMO. The FILMO may be implemented as a dual-ported RAM with separate read and write ports.

Figure 10:
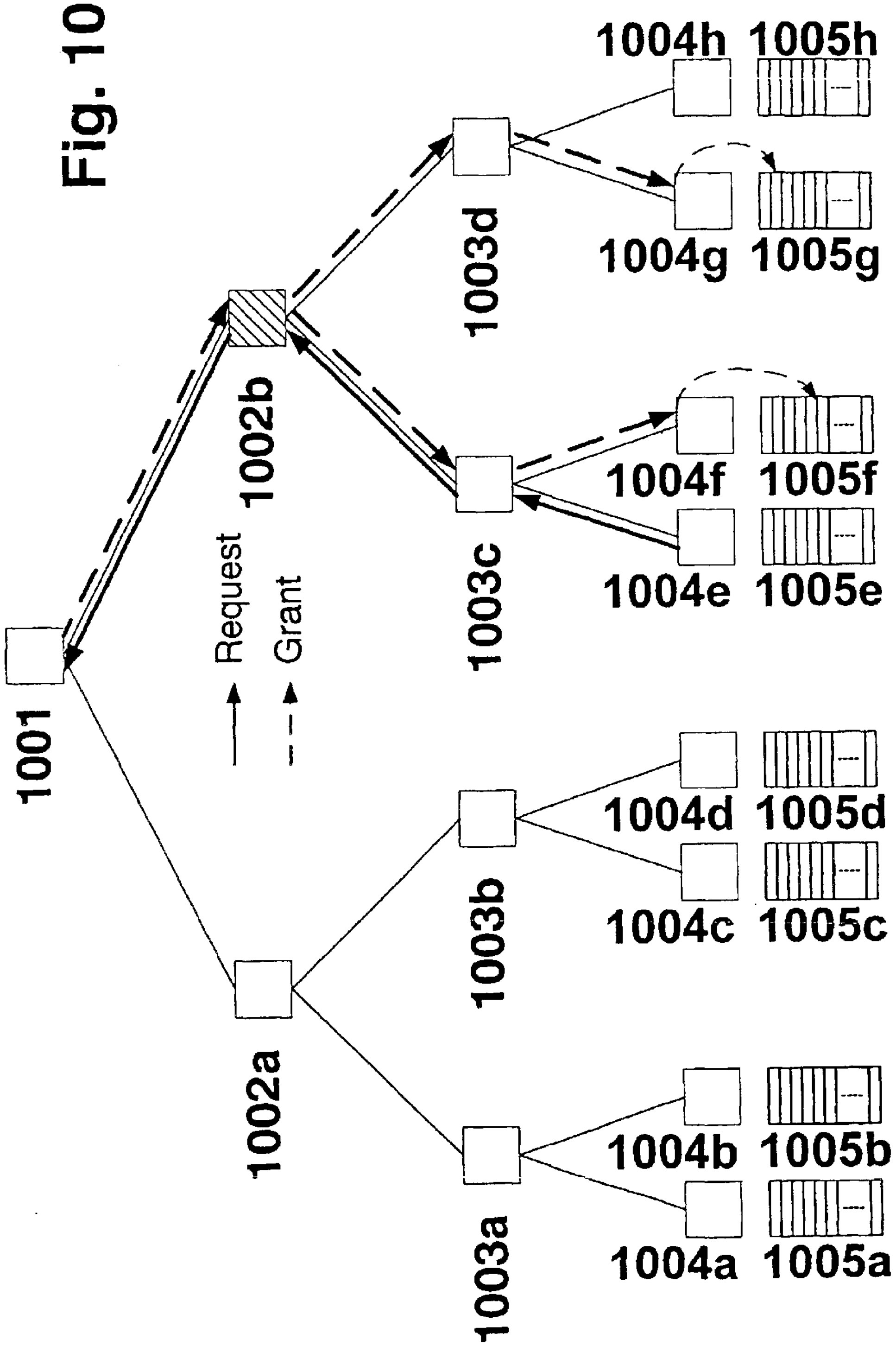

FIG. 10 illustrates an example inter-CT protocol, according to an example embodiment of the present invention. Four levels of CT are shown: the root CT (1001), CTs of two intermediate levels (1002*a*–*b* and 1003*a*–*d*), the low-level CTs (1004a–h) and their FILMOs (1005a–h). In the PA assigned to 1004e, a trigger may be generated. The trigger can not be translated to any local SubConf within 1004e. Instead, the trigger may be assigned to an EnhSubConf. CT 1004e may send a REQUEST for this EnhSubConf to CT 1003c. CT 1003c has not cached the ID chain. EnhSubConf is partially also carried out on CT 1004g, which is not a leaf of CT 1003c. Thus, CT 1003c may relay the REQUEST to CT 1002b. The hatching indicates that CT 1002b might have cached the ID chain because CT 1004g is a leaf of CT 1002b. However, CT 1002b has neither accepted nor cached the ID chain and therefore may request it from CT 1001. CT 1001 may load the ID chain from the CTR, as described in see PACT10. CT 1001 may send the ID chain to CT 1002b. This process is referred to below as GRANT. CT 1002b has cached the ID chain because all participating CTs are leaves of CT 1002b.

Then CT 1002b may send GRANT to CT 1003c and CT 1003d as an atom, e.g., without interruption by another GRANT. The ID chain may be split here and sent to two different CTs, so none of the receivers may be a common arbiter of all leaves. The SPLIT flag may be set; the receivers and all lower-level CTs can no longer cache the ID chain. CT 1003c and CT 1003d again send GRANT to low-level CTs 1004f and 1004g as an atom. The low-level CTs store the incoming GRANT directly in a suitable list, indicating the order of SubConf to be configured. This list may be designed to be separate, or it may be formed by performing the configuration directly by optionally entering the rejected KWs into FILMO.

Figure 11:
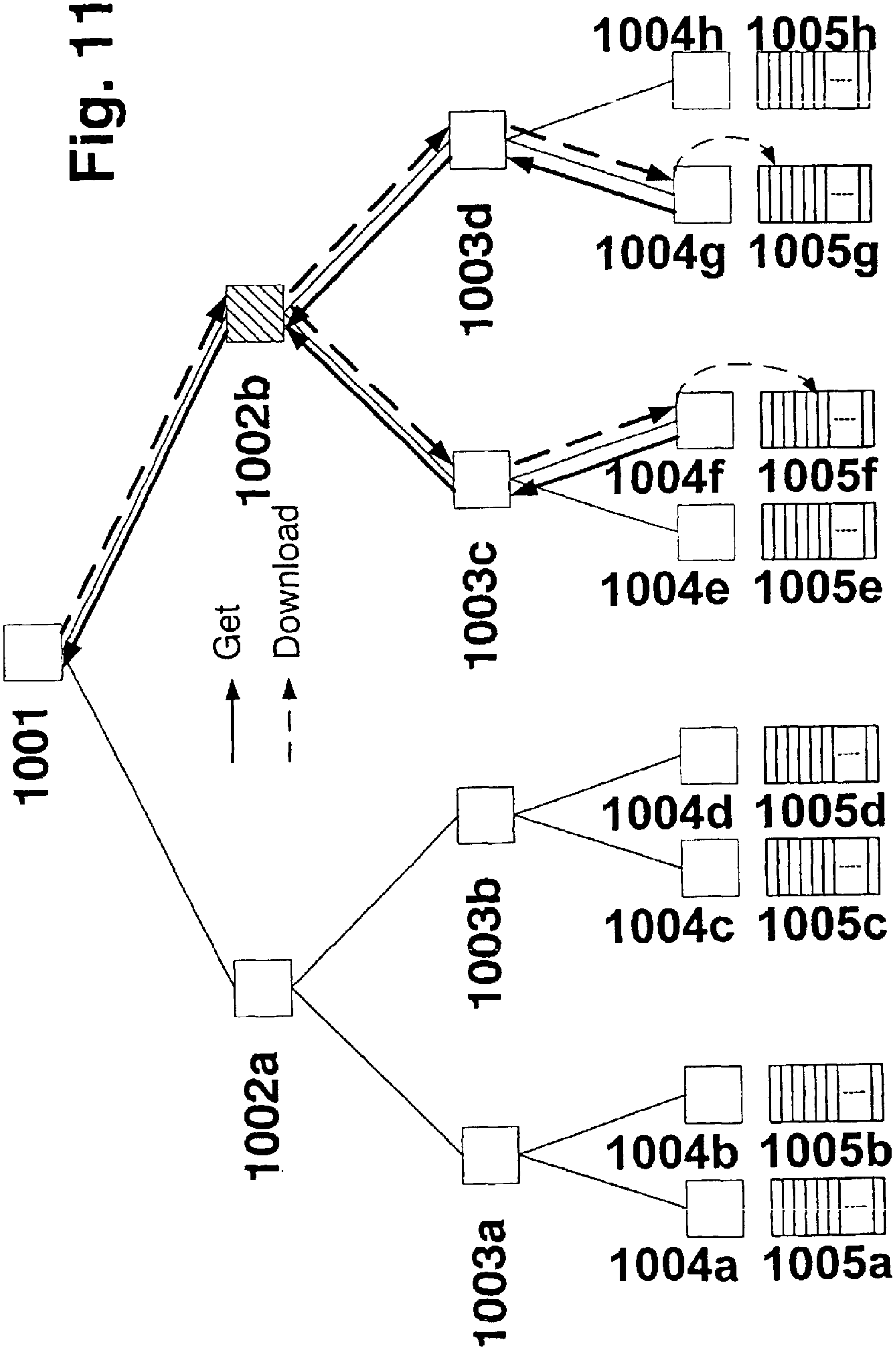

Two example variants for the low-level CTs:

They have already cached the SubConf to be started, corresponding to the ID according to the ID chain. Here, the configuration is started immediately, They have not yet cached the SubConf corresponding to the ID according to the ID chain. Here, they may need to request it first from the higher-level CTs. The request (GET) is illustrated in FIG. 11, where it is again assumed that none of the CTs from the intermediate level has cached the SubConf. Therefore, the respective SubConf may be loaded by the root CT from the CTR and Bent to the low-level CTs (DOWNLOAD). Thia sequence is described in more detail in PACT10.

After receipt of a GRANT, the received GRANT may need to be executed before any other GRANT. For example, if GRANT A is received before GRANT B, then GRANT A may need to be 30 configured before GRANT B. This may also be needed if the SubConf of GRANT A needs to be loaded first while the SubConf of GRANT B would be cached in the low-level CT and could be started immediately. The order of incoming GRANTs may need to be maintained, because otherwise a deadlock can occur among the EnhSubConf.

In an alternative embodiment of the procedure described here,

CTs of the CTTREE may directly access configurations without including the higher-level CTs. The CTs may have a connection to any type of volatile memory, nonvolatile memory or bulk memory. For example, this memory may be an SRAM, DRAM, ROM, flash, CDROM, hard drive or server system, which may be connected via a network (WAN, LAN, Internet). It will be appreciated that a CT may directly access a memory for configuration data, bypassing the higher-level CTs. In such a case, the configuration may be synchronized within the CTTREE, including higher-level CTs, e.g., with EnhSubConf.

Figure 12A:
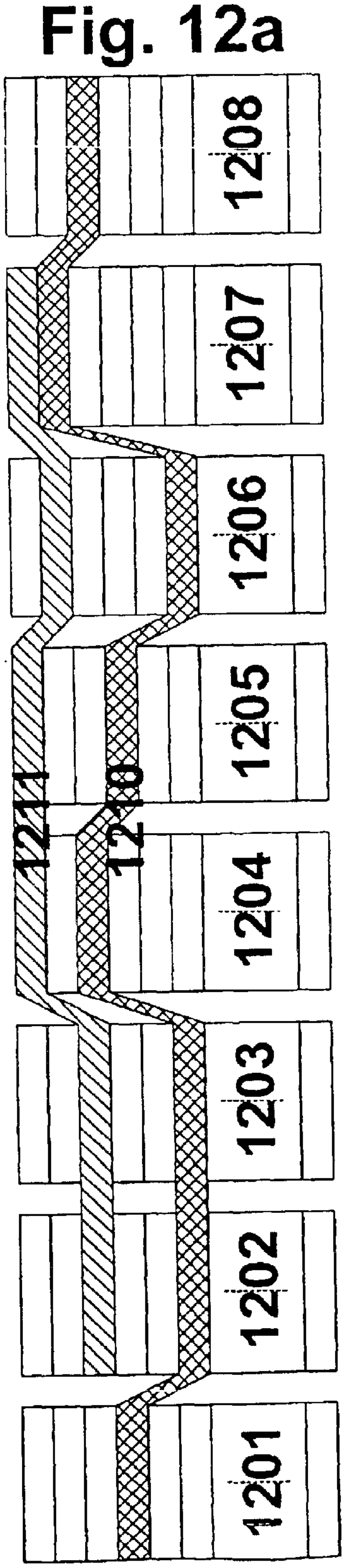
Figure 12B:
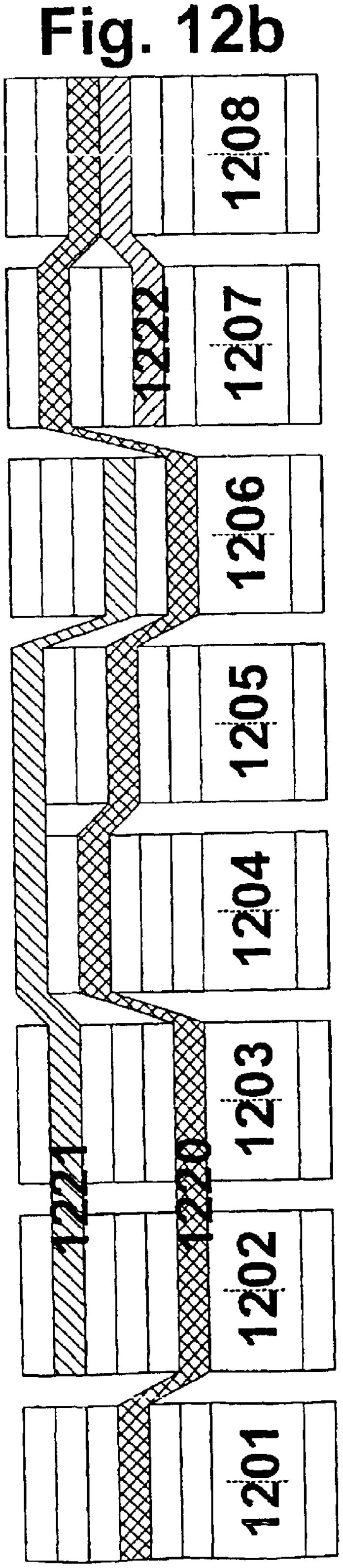
Figure 12C:
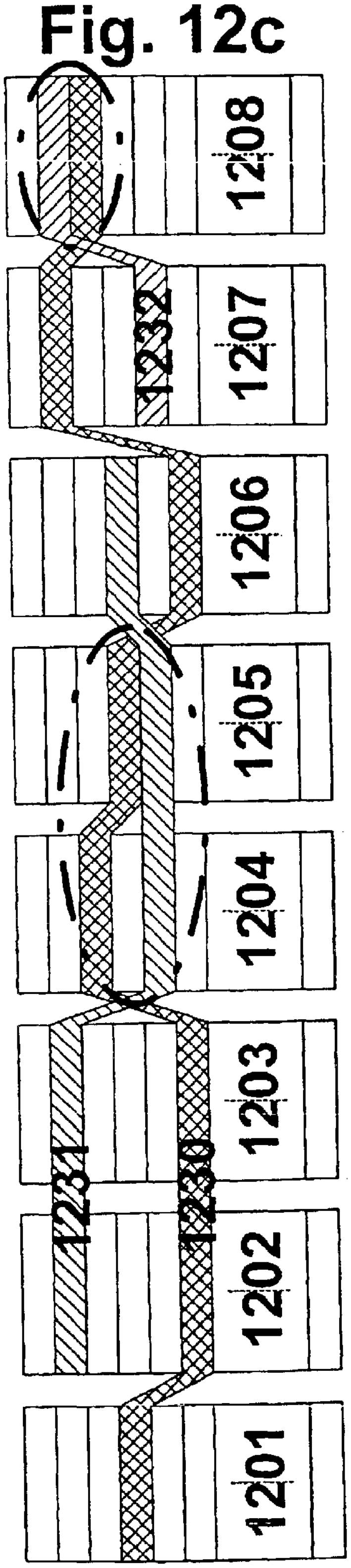

FIG. 12 illustrates three examples (FIGS. 12a–12c), a configuration stack of 8 CTs (1201–1208), according to an example embodiment of the present invention. The configuration stack contains the list of SubConfs to be configured. The SubConfs may be configured in the same order as they are entered in the list. For example, a configuration stack may be formed by concatenation of individual SubConfs as described in PACT10 (FIGS. 26 through 28). Another alternative is a simple list of IDs pointing to SubConfs, as shown FIG. 12. Lower-level entries may be configured first, and higher-level entries may be configured last. FIG. 12a illustrates two EnhSubConfs (1210, 1211) which are positioned correctly within the configuration stack of the individual CTs. The individual SubConfs of the EnhSubConfs are configured in the proper order without a deadlock. The order of GRANTs was preserved. The example in FIG. 12b is also correct. Three EnhSubConf are shown (1220, 1221, 1222). 1220 is a large EnhSubConf affecting all CTs. 1221 pertains only to CTs 1202–1206, and another pertains only to CTs 1207 and 1208. All SubConfs are configured in the proper order without a deadlock. The GRANT for 1222 was processed completely before the GRANT for 1220, and the latter was processed before the GRANT for 1221.

The example in FIG. 12c illustrates several deadlock situations. In 1208, the order of GRANTs from 1230 and 1232 has been reversed, resulting in resources for 1230 being occupied in the PA allocated to 1208 and resources for 1232 being occupied in the PA allocated to 1208. These resources are always allocated in a fixed manner. This results in a deadlock, because no EnhSubConf can be executed or configured to the end.

Likewise, GRANTs of 1230 and 1231 are also chronologically reversed in CTs 1204 and 1205. This also may result in a deadlock for the same reasons.

Figure 13A:
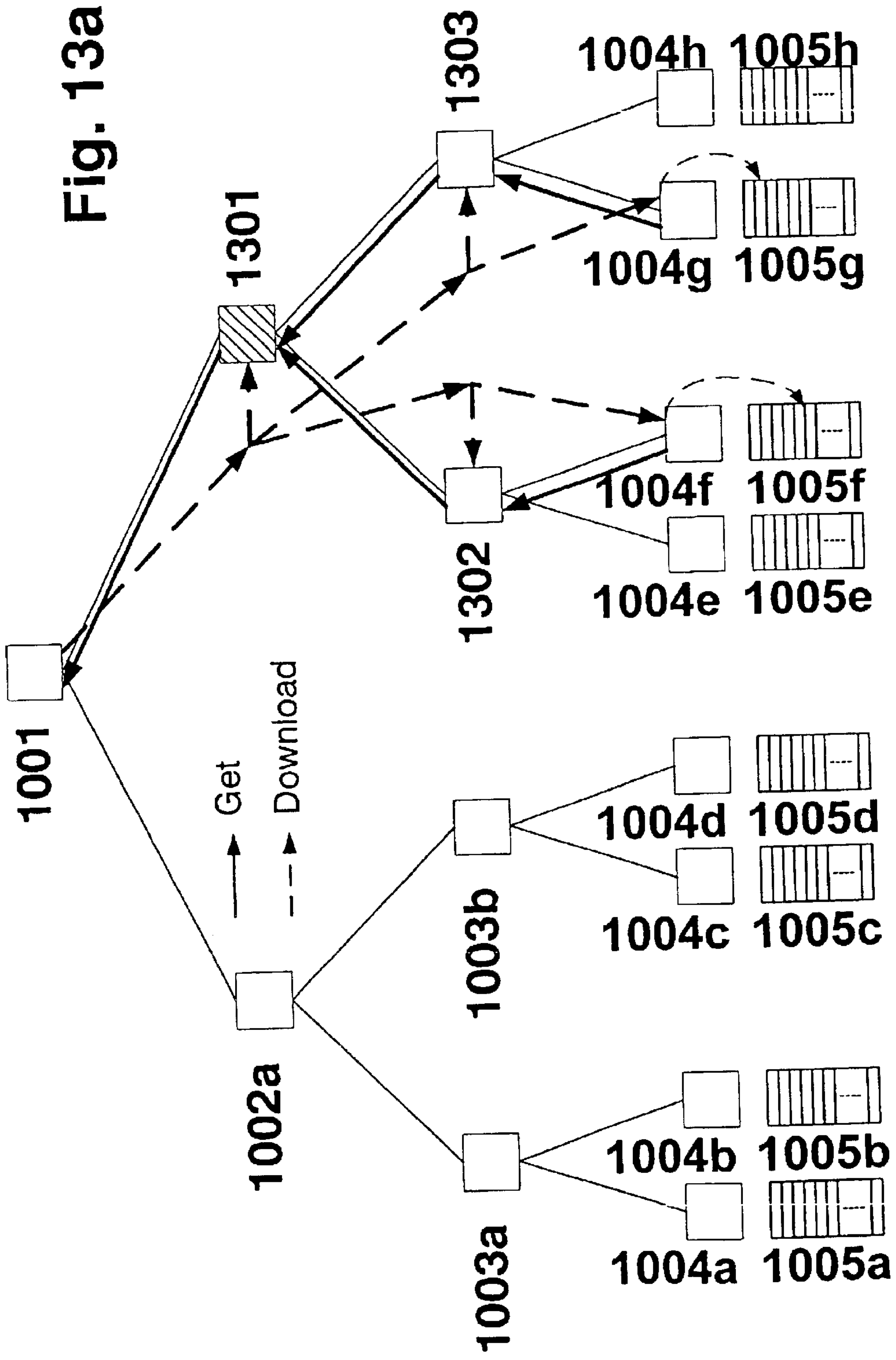
Figure 13B:
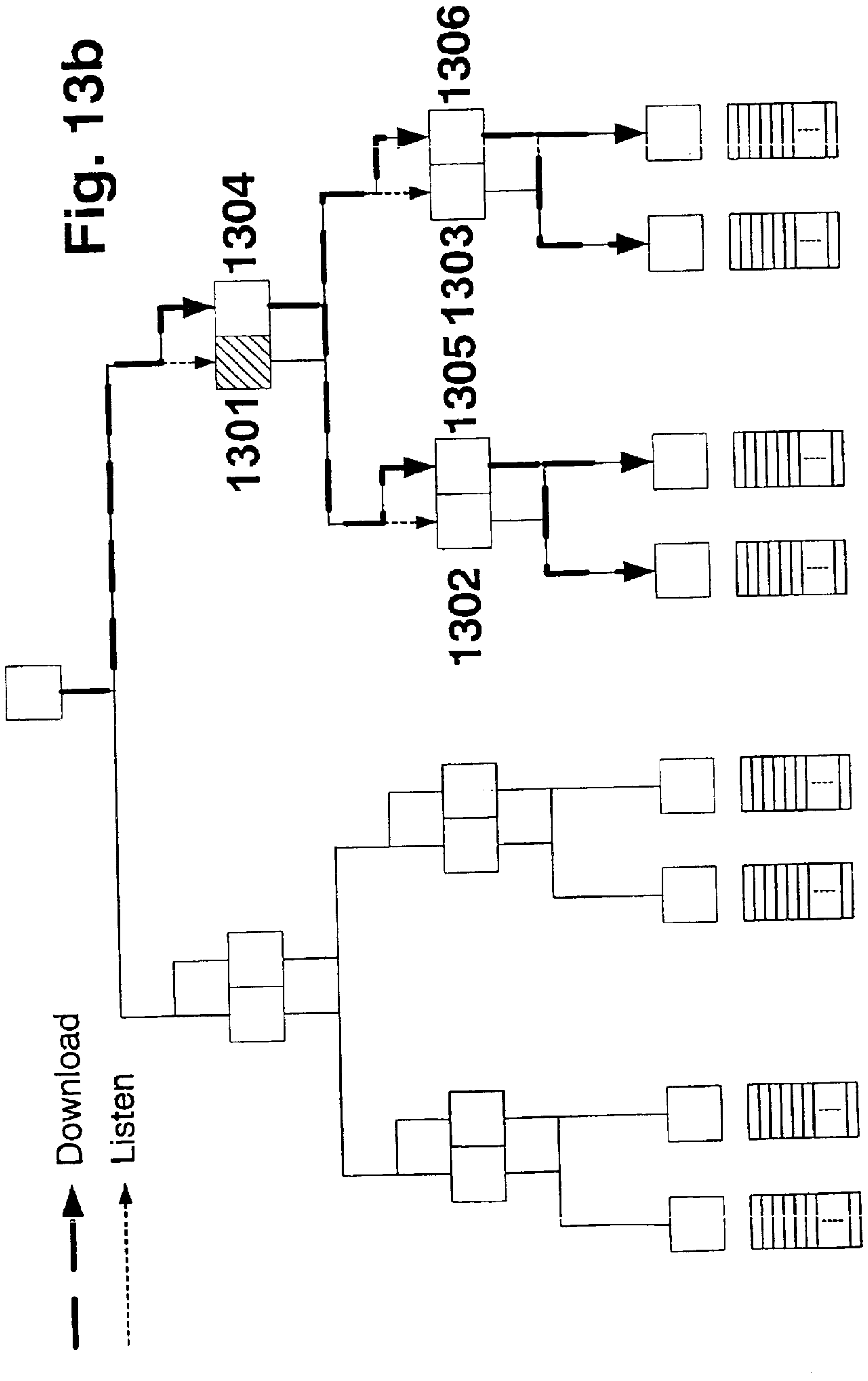

FIG. 13a illustrates a performance-optimized version of inter-CT communication according to an example embodiment of the present invention. A download may be performed directly to the low-level CT. Here, mid-level CTs need not first receive, store and then relay the SubConfs. Instead, these CTs may "listen" (1301, 1302, 1303, LISTENER) and cache the SubConfs. An example schematic bus design is illustrated in FIG. 13b, according to an example embodiment of the present invention. A bypass (1304, 1305, 1306), may carry the download past the mid-level CTs. This bypass may be provided as a register.

Figure 14:
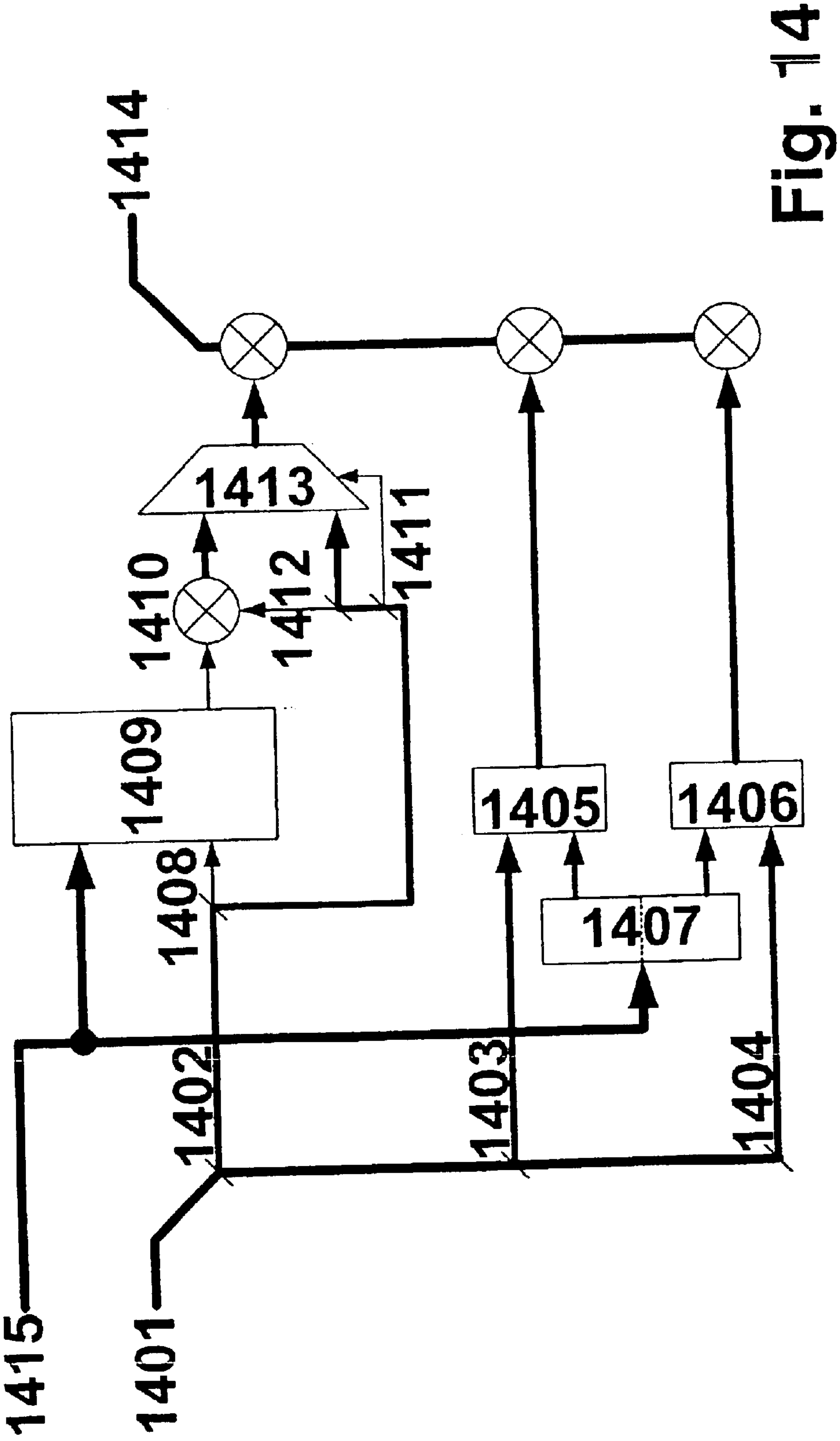

FIG. 14 illustrates an example circuit providing simple configuration of SubConf macros, according to an example embodiment of the present invention. The example circuit may be provided between a CT and a PA. A KW may be transmitted by the CT over the bus (1401). The KW is broken down into its configuration data (1402) plus PAE addresses X (1403) and Y (1404). It will be appreciated that, in the case of multidimensional addressing, more addresses may be broken down. 1405 adds an X offset to the X address, and 1406 adds a Y offset to the Y address. The offsets may be different and may be stored in a register (1407). The parameterizable part of the data (1408) may be sent as an address to a lookup table (1409) where the actual values are stored. The values may be linked (1410) to the nonparameterizable data (1412). A multiplexer (1413) may be used to select whether a lookup is to be performed or whether the data should be used directly without lookup. The choice may be made using a bit (1411). All addresses and the data may be linked again and sent on a bus to the PA. Depending on implementation, the FILMO may be connected upstream or downstream from the circuit described here. Integrated FILMOs may be connected upstream, and separate FILMOs may be connected downstream. The CT may set the address offsets and the parameter translation in 1409 via bus 1415. 1409 may be implemented as a dual-ported RAM.

A corresponding KW may be structured as follows:

| | | | | |
|---|---|---|---|---|
| X address | Y address | Data | Address for 1409 | MUX = 1 |
| X address | Y address | Data | Data | MUX = 0 |

If MUX=1, then a lookup may be performed in 1409. If MUX=0, data may be relayed directly to 1414.

Figure 15:
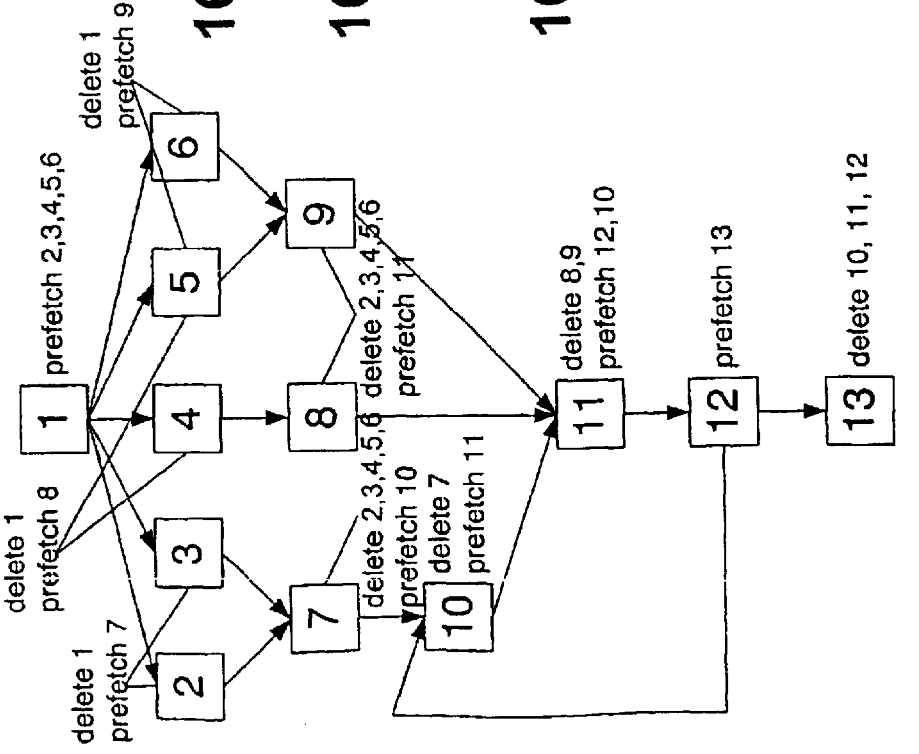

FIG. 15 illustrates the execution of an example graph, according to an example embodiment of the present invention.

The next possible nodes (1 . . . 13) of the graph may be preloaded (prefetch), and preceding nodes and unused jumps may be deleted (delete). Within a loop, the nodes of the loop are not deleted (10, 11, 12), and corresponding nodes are removed only after termination. Nodes may be loaded only if they are not already present in the memory of the CT. Therefore, multiple processing of 11 need not result in multiple loading of 12 or 10; e.g., "delete 8, 9" is ignored in 11 if 8 and/or 9 has already been removed.

Figure 16:
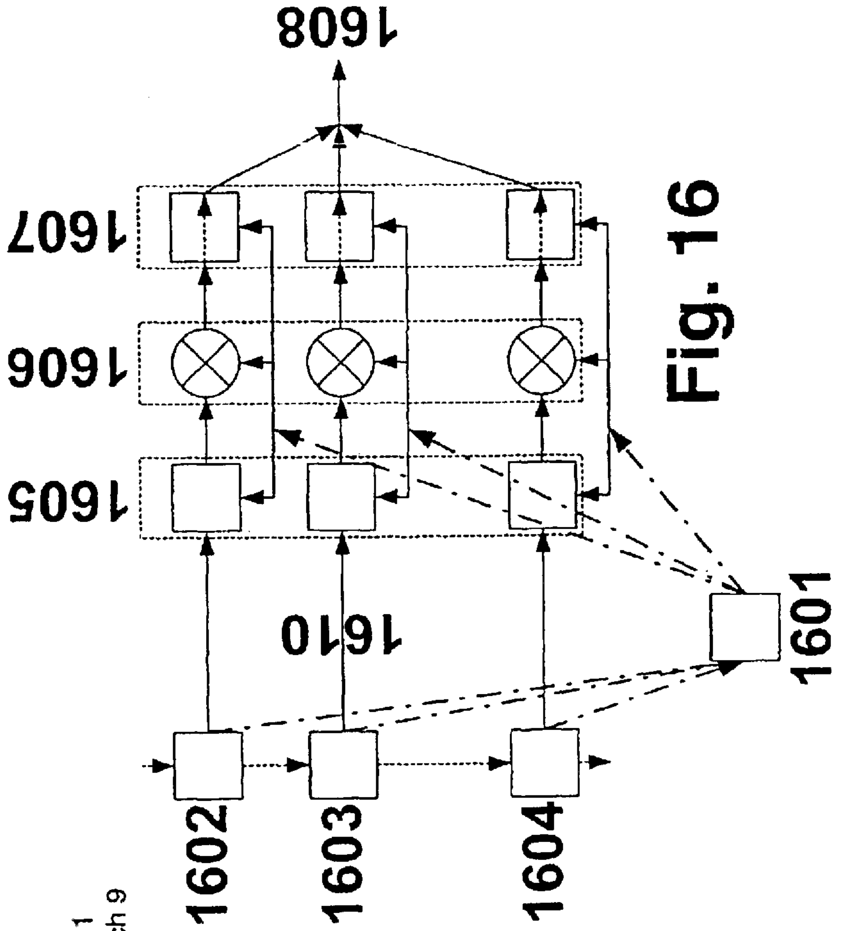

FIG. 16 illustrates multiple instantiation of an example SubConf macro (1601), according to an example embodiment of the present invention. Various SubConfs (1602, 1603, 1604) call up 1601. Parameters for 1601 may be preloaded (1610) in a lookup table (1605) by the requesting SubConf. 1605 is implemented only once but is shown several times in FIG. 16 to represent the various contents.

1601 may be called up. The KWs may be transmitted to 1605, 1606 and 1607. These elements operate as follows: Based on a lookup, the corresponding content of 1605 is linked again (1606) to the KWs. The KW is sent to the PA (1608) after the multiplexer 1413 (1607) selects whether the original KW is valid or whether a lookup has been performed.

FIG. 17 shows the sequence of an example wave reconfiguration, according to an example embodiment of the present invention. Areas shown with simple hatching represent data-processing PAEs, with 1701 representing PAEs after reconfiguration and 1703 representing PAEs before reconfiguration. Areas shown with crosshatching (1702) indicate PAEs which are in the process of being reconfigured or are waiting for reconfiguration.

Figure 17A:
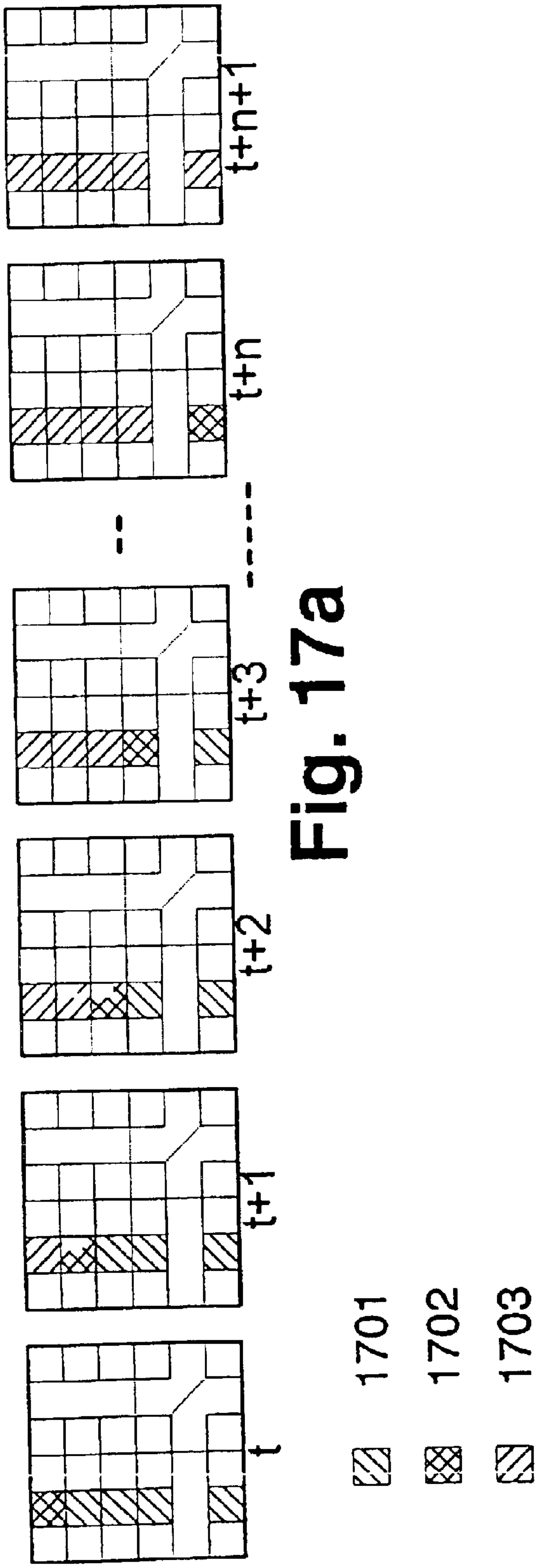

FIG. 17*a* shows the influence of wave reconfiguration on a simple sequential algorithm, according to an example embodiment of the present invention. Exactly those PAEs to which a new function has been allocated maybe reconfigured. Since a PAE can receive a new function in each cycle, this may be performed efficiently, e.g., simultaneously.

One row of PAEs from the matrix of all PAEs of a VPU is shown as an example. The states in the cycles after cycle t are shown with a delay of one cycle each.

Figure 17B:
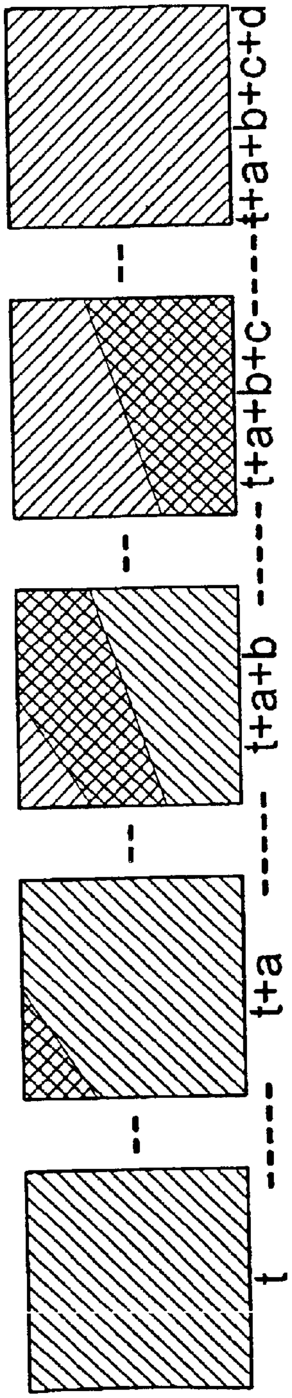

FIG. 17*b* illustrates the time effect of reconfiguration of large portions of a VPU, according to an example embodiment of the present invention. A number of PAEs of one VPU is shown as an example, indicating the states in the cycles after cycle t with a different delay of several cycles each.

Although at first only a small portion of the PAEs is reconfigured or is waiting for reconfiguration, this area becomes larger over time, until all the PAEs have been reconfigured. The increase in size of this area (1702) shows that, due to the time delay in reconfiguration, more and more PAEs are waiting for reconfiguration. This may result in lost computing performance.

A broader bus system may be used between the CT (in particular, the memory of the CT) and the PAEs, providing enough lines to reconfigure several PAEs at the same time within one cycle.

| Not configured | Wave trigger | W | C | D | |
|---|---|---|---|---|---|
| X | — | X | X | — | Wave reconfiguration |
| X | — | X | — | X | REJ |
| — | X | X | X | — | REJ |
| — | X | X | — | X | Differential wave reconfiguration |
| | | — | | | Normal configuration |

Figure 18:
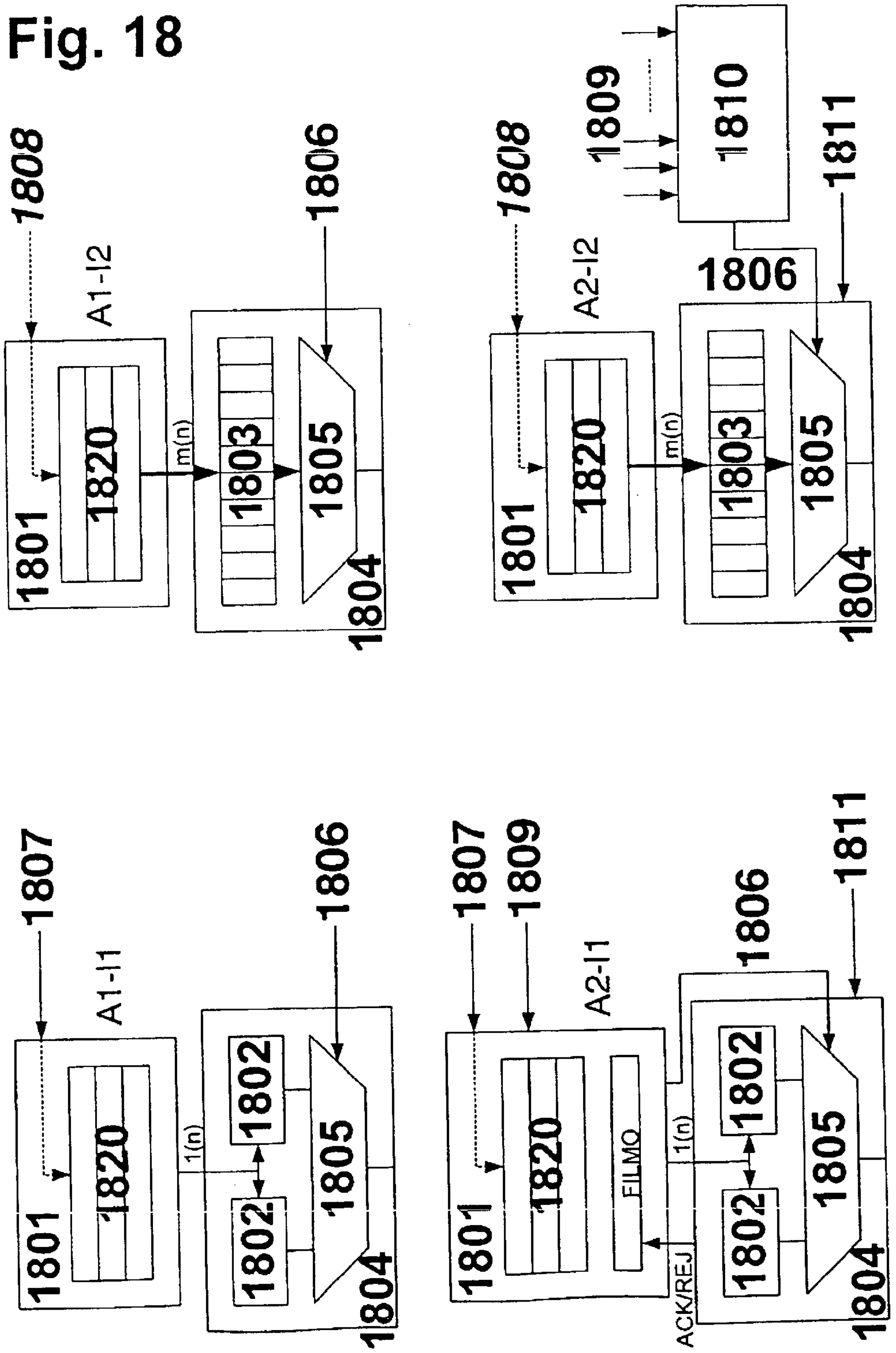

FIG. 18 illustrates example configuration strategies for a reconfiguration procedure like the "synchronized shadow register", according to an example embodiment of the present invention. The CT (1801), as well as one of several PAEs (1804), are shown schematically with only the configuration registers (1802, 1803) within the PAE and a unit for selecting the active configuration (1805) being illustrated. To simplify the drawings, additional functional units within the PAE have not been shown. Each CT has n SubConfs (1820), the corresponding KWs of a SubConf being loaded when a WCP occurs (1(n)), in cases-I1, and in the cases-I2, the KWs of m SubConfs from the total number of n are loaded (m(n)). The different tie-ins of WCT (1806) and WCP (1807) are shown, as are the optional WCPs (1808), as described below.

In A1-I1, a next configuration may be selected within the same SubConfs by a first trigger WCP. This configuration may use the same resources, alternative resources may be used that already prereserved and are not occupied by any other SubConfs except for that optionally generating the WCP. The configuration may be loaded by the CT (1801). In the example shown here, the configuration is not executed directly, but instead is loaded into one of several alternative registers (1802). By a second trigger WCT, one of the alternative registers is selected at the time of the required reconfiguration. This causes the configuration previously loaded on the basis of WCP to be executed.

It will be appreciated that a certain configuration may be determined and preloaded by WCP. The time of the actual change in function corresponding to the preloaded reconfiguration may be determined by WCT.

WCP and WCT may each be a vector, so that one of several configurations may be preloaded by WCT($v_1$). The configuration to be preloaded may be specified by the source of WCP. Accordingly, WCT($v_2$) may select one of several preloaded configurations. In this case, a number of configuration registers 1802 corresponding to the quantity of configurations selectable by v2 may be needed. The number of such registers may be fixedly predetermined so that v2 corresponds to the maximum number.

An example version having a register set 1803 with a plurality of configuration registers 1802 is shown in A1-I2. If the number of registers in 1803 is large enough that all possible following configurations can be preloaded directly, the WCP can be eliminated. In this case, only the time of the change of function as well as the change itself may need to be specified by WCT($v_2$).

A2-I1 illustrates an example WRC where the next configuration does not utilize the same resources or whose resources are not prereserved or are occupied by another SubConf in addition to that optionally generating the WCP ($v_1$) The freedom from deadlock of the configuration may be guaranteed by the FILMO-compliant response and the configuration on WCP($v_1$). The CT also may start configurations by $WCT(v_2)$ (1806) through FILMO-compliant atomic response to the receipt of triggers (ReconfReq) characterizing a reconfiguration time.

In A2-I2, all the following SubConfs are either preloaded into configuration register 1803 with the first loading of a SubConf. Alternatively, if the number of configuration registers is not sufficient, the following SubConfs may be re-loaded by the CT, e.g., by way of running a $WCP(v_1)$.

The triggers (ReconfReq, 1809) which may determine a reconfiguration time and trigger the actual reconfiguration may first be isolated in time by way of a suitable prioritizer (1810). The triggers may then be sent as $WCT(v_2)$ to the PAEs so that exactly only one $WCT(v_2)$ is always active on one PAE at a time, and the order of incoming $WCT(v_2)$s is always the same with all the PAEs involved.

In the case of A2-I1 and A2-I2, an additional trigger system may be used. In processing of WCT by CT 1801, i.e., in processing by 1810, there may be a considerable delay until relaying to PAE 1804. However, the timing of ChgPkt may need to be rigorously observed because otherwise the PAEs may process the following data incorrectly. Therefore, another trigger (1811, WCS=wave configuration stop) may be used. The WCS trigger only stops data processing of PAEs until the new configuration has been activated by arrival of the WCT. WCS is may be generated within the SubConf active at that time. The ReconfReq and WCS may be identical, because if ReconfReq is generated within the SubConf currently active, this signal may indicate that ChgPkt has been reached.

Figure 19:
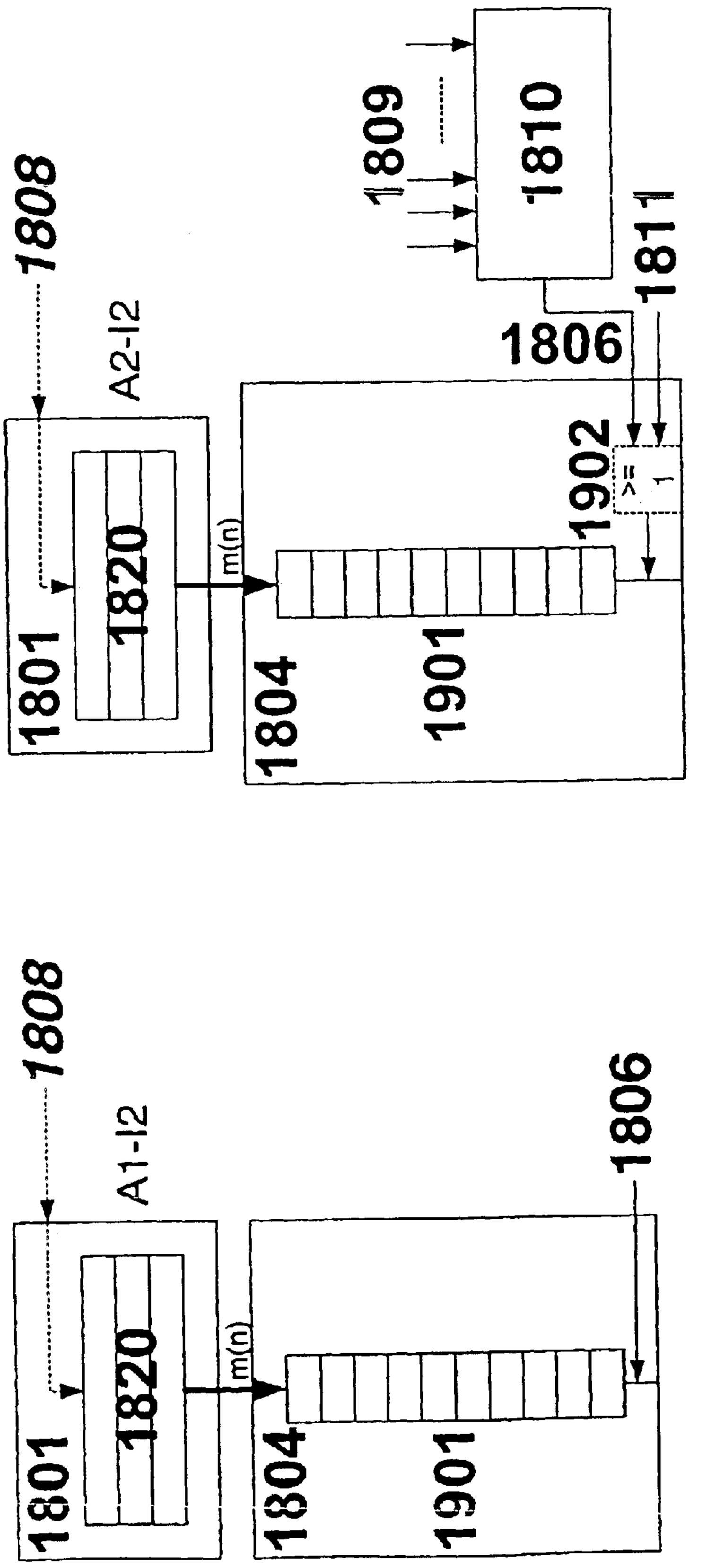

FIG. 19 illustrates an alternative implementation of A1-I2 and A2-I2, according to an example embodiment of the present invention. A FIFO memory (1901) may be used to manage the KW instead of using a register set. The order of SubConfs preselected by WCP may be fixed. Due to the occurrence of WCT (or WCS, alternatively represented by 1902), only the next configuration can be loaded from FIFO. The function of WCS, e.g., stopping ongoing data processing, may be exactly the same as that described in conjunction with FIG. 18.

Figure 20:
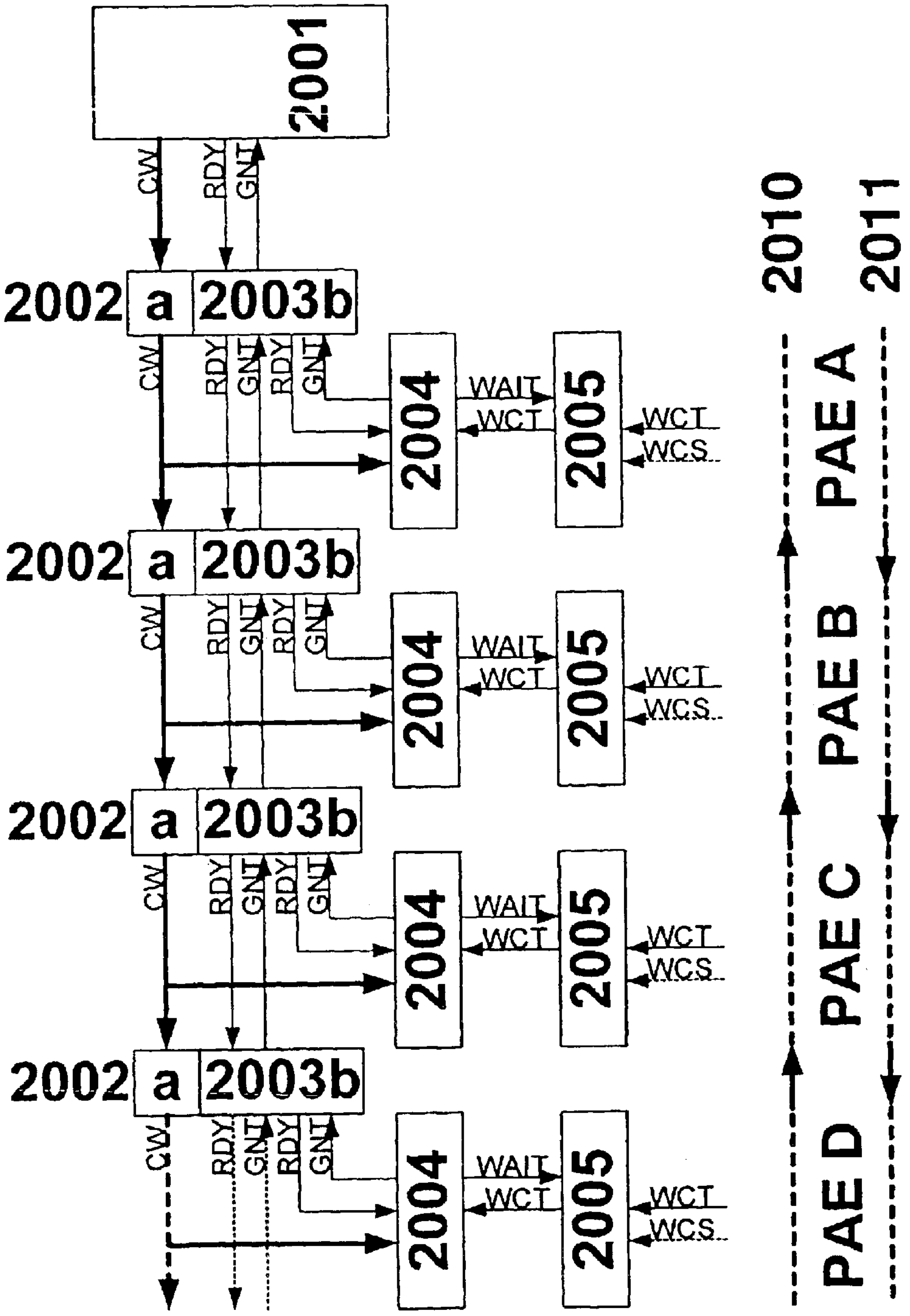

FIG. 20 illustrates a section of a row of PAEs carrying out a reconfiguration method like the "synchronized pipeline" according to an example embodiment of the present invention. One CT (2001) may be allocated to multiple CT interface subassemblies (2004) of PAEs (2005). 2004 may be integrated into 2005 and is shown with an offset only to better illustrate the function of WAIT and WCT. It will be appreciated that signals for transmission of configuration data from 2004 to 2005 are not shown here.

The CT may be linked to PAEs 2004 by a pipelined bus system, 2002 representing the pipeline stages. 2002 may include a register (**2003*b*) for the configuration data (CW) and another register (2003*a*) having an integrated decoder and logic. Register 2003*a* may decode the address transmitted in CW and sends a RDY signal to 2004 if the respective local PAE is addressed. Register 2003*a* may send a RDY signal to the next step 2002, if the local PAE is not addressed. Accordingly, 2003*a* may receive the acknowledgment (GNT), from 2002 or 2004**, e.g., as a RDY/ACK. This results in a pipelined bus which transmits the CW from the CT to the addressed PAE and its acknowledgment back to the CT.

When WCT is active at 2004, pending CWs which are characterized with WAVE as part of the description may be configured in 2004. Here, GNT may acknowledged with ACK. If WCT is not active but CWs are pending for configuration, then GNT may not be acknowledged. The pipeline may be blocked until the configuration has been performed.

If 2005 is expecting a wave reconfiguration, characterized by an active WCT, and no CWs characterized with WAVE are already present at 2004, then 2004 may acknowledge with WAIT. This may put the PAE (2005) in a waiting, non-data-processing status until CWs characterized with WAVE have been configured in 2004. CWs that have not been transmitted with WAVE may be rejected with REJ during data processing.

It will be appreciated that optimization may be performed by special embodiments for particular applications. For example, incoming CWs characterized with WAVE and the associated reconfiguration may be stored temporarily by a register stage in 2004, preventing blocking of the pipeline if CWs sent by the CT are not accepted immediately by the addressed 2004. For further illustration, 2010 and 2011 may be used to indicate the direction of data processing. If data processing proceeds in direction 2010, a rapid wave reconfiguration of the PAEs is possible as follows. The CT may send CWs characterized with WAVE into the pipeline so that first the CWs of the most remote PAE are sent. If CWs cannot be configured immediately, the most remote pipeline stage (2002) may be blocked. Then, the CT may send CWs to the PAE which is then the most remote and so forth, until the data is ultimately sent to the next PAE.

As soon as ChkPkt runs through the PAEs, the new CWs may be configured in each cycle. It will be appreciated that this approach may also be efficient if ChgPkt is running simultaneously with transmission of CWs from the CT through the PAEs. In this case, the respective CW required for configuration may also be pending at the respective PAE in each cycle.

If data processing proceeds in the opposite direction (2011), the pipeline may optionally be configured from the PAE most remote from the CT to the PAE next to the CT. If ChgPkt does not take place simultaneously with data transmission of the CWs, the method may remain optimal. On occurrence of ChgPkt, the CWs may be transmitted immediately from the pipeline to 2004.

However, if ChgPkt appears simultaneously with CWs of wave reconfiguration, this may result in waiting cycles. For example, PAE B is to be configured on occurrence of ChgPkt in cycle n. CWs are pending and are configured in 2004. In cycle n+1, ChgPkt (and thus WCT) are pending at PAE C. However, in the best case, CWs of PAE C are transmitted only to 2002 of PAE B in this cycle, because in the preceding cycle, 2002 of PAE B was still occupied with its CW. Only in cycle n+2 are the CWs of PAE C in 2002 and can be configured. A waiting cycle has occurred in cycle n+1.

Figure 21:
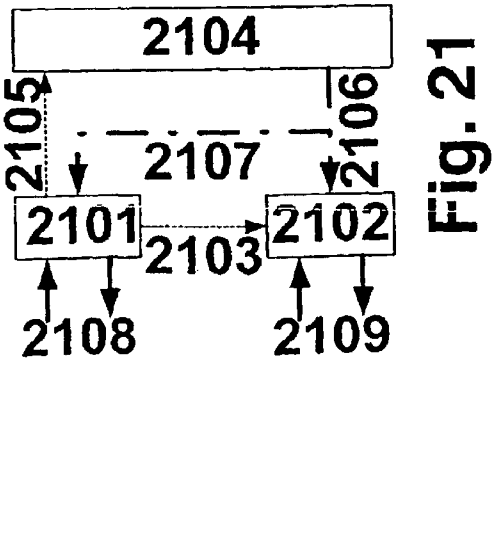

FIG. 21 illustrates a general synchronization strategy for a wave reconfiguration, according to an example embodiment of the present invention. A first PAE 2101 may recognize the need for reconfiguration on the basis of a status that is occurring. This recognition may take place according to the usual methods, e.g., by comparison of data or states. Due to this recognition, 2101 sends a request (2103) to one or more PAEs (2102) to be reconfigured. This may be accomplished through a trigger. This may stop the data processing. In addition, 2101 sends a signal (2105), which may also be the same as signal 2103, to a CT (2104) to request reconfiguration. CT 2104 may reconfiguration 2102 (2106). After successful reconfiguration of all PAEs to be reconfigured, the CT may inform 2101 (2107) regarding the end of the procedure, e.g., by way of reconfiguration. Then 2001 may take back stop request 2103, and data processing may be continued. Here, 2108 and 2109 each symbolize data and trigger inputs and outputs.

Figure 22:
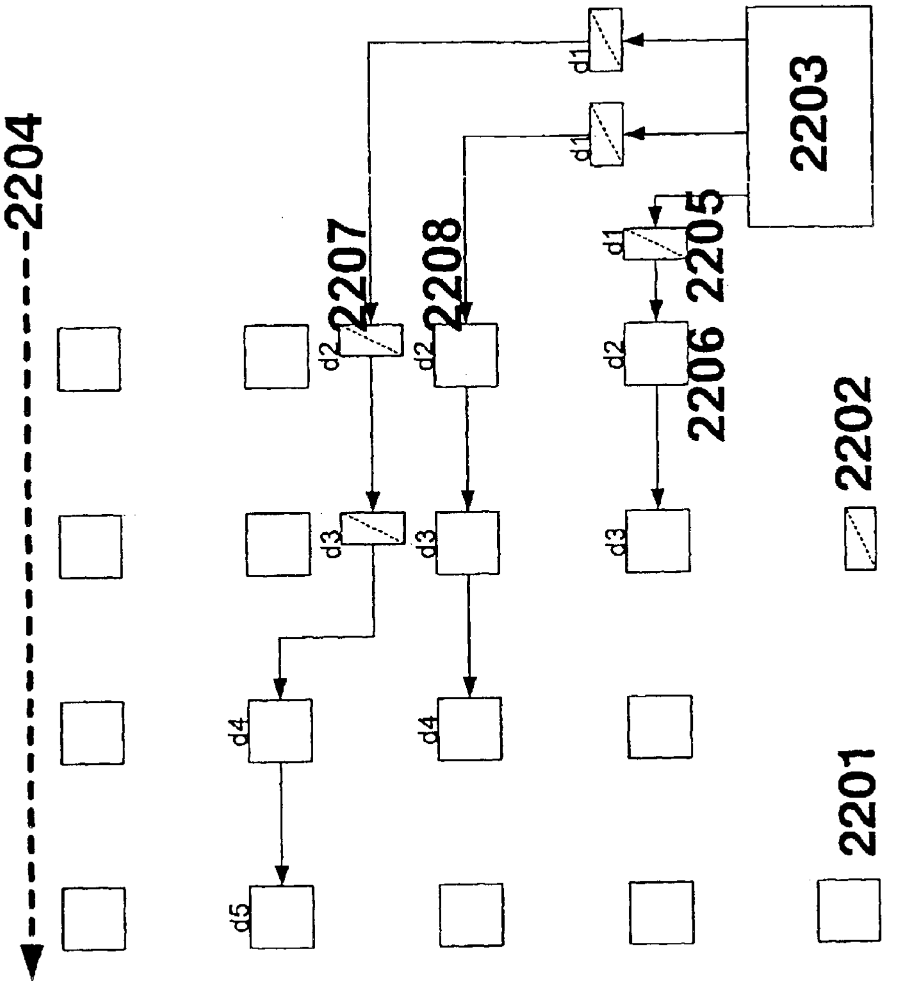

FIG. 22 illustrates an example approach for using routing measures to ensure a correctly timed relaying of WCT, according to an example embodiment of the present invention. Several WCTs may be generated for different PAEs (2201) by a central instance (2203). The WTCs may need to be coordinated with one another in time. The different distances to PAEs 2201 in the matrix may result in different transmit times or latency times. Timing coordination may be achieved in the present example through suitable use of pipeline stages (2202). These may be allocated using a router assigned to the compiler, as described in PACT13. The resulting latencies indicated here as d1–d5. It can be seen here that the same latencies occur in the direction of data flow (2204) in each stage (column). For example, 2205 may not be necessary, because the distance of 2206 from 2003 is very small. However, one 2202 each must be inserted for 2207 and 2208 because of the transit time resulting from the longer distance, so 2205 may be needed to equalize the transmit time.

Figure 23B:
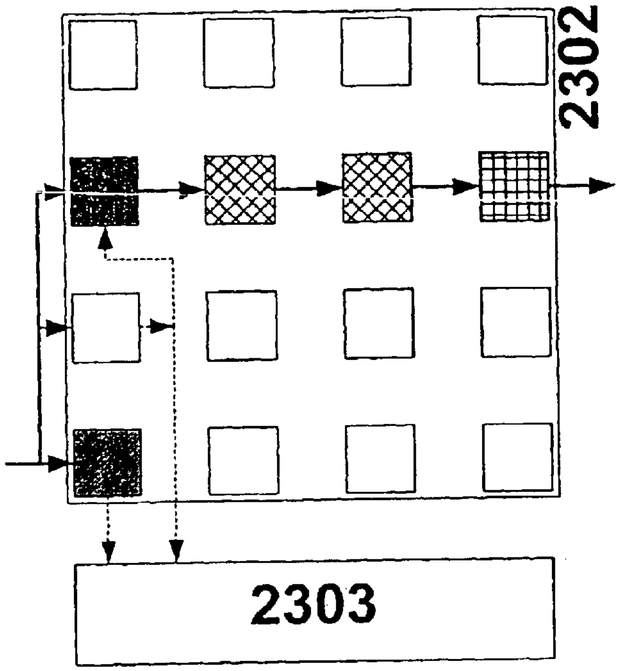
Figure 23A:
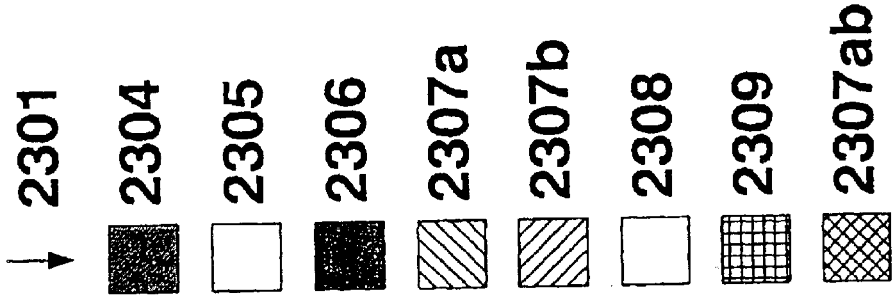
Figure 23A:
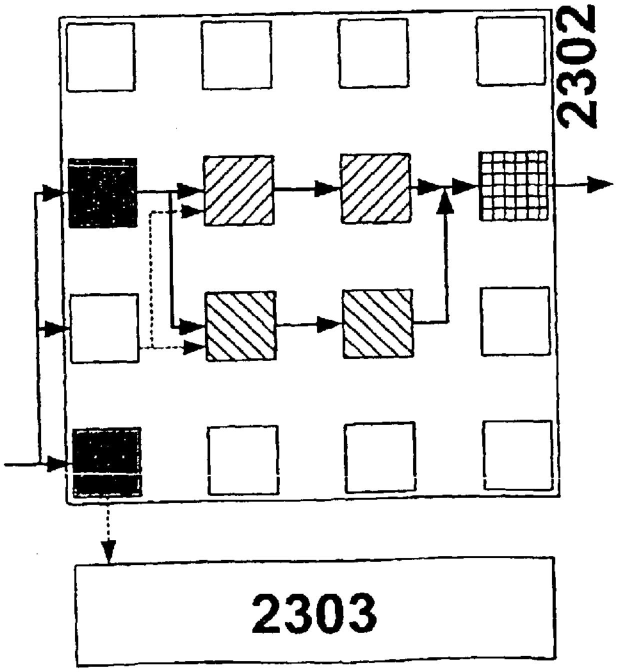

FIG. 23 illustrates an example application of wave reconfiguration, according to an example embodiment of the present invention. This figure also illustrates optional utilization of PAE resources or reconfiguration time to perform a task, yielding an intelligent trade-off between cost and performance that can be adjusted by the compiler or the programmer.

A data stream is to be calculated (2301) in an array (2302) of PAEs (2304–2308). A CT (2303) assigned to the array is responsible for its reconfiguration. 2304 is responsible for recognition of the end state of data processing which makes reconfiguration necessary. This recognition is signaled to the CT. 2306 marks the beginning and 2309 the end of a branch represented by 2307*a*, 2307*b* or 2307*ab*. PAEs 2308 are not used. The various triggers are represented by 2309.

In FIG. 23*a*, one of two branches 2307*a*, 2307*b* may be selected by 2305 and activated by trigger simultaneously with data received from 2306.

In FIG. 23*b*, branches 2307*a* and 2307*b* may not need to be completely preconfigured, but instead both possible branches should share resources 2307*ab* by reconfiguration. 2305 also selects the branch necessary for data processing. Information may now be sent to 2303 and also to 2306 to stop data processing until reconfiguration of 2307*ab* has been completed according to FIG. 21.

FIG. 24 illustrates an example implementation according to of a state machine for sequence control of the PAE, according to an example embodiment of the present invention. The following states may be implemented:

Not Configured (2401)
Allocated (2402)
Wait for lock (2403)
Configured (2404)

The following signals trigger may trigger a change of status:

LOCK/FREE (2404, 2408)
CHECK (2405, 2407)
RECONFIG (2406, 2409)
GO (2410, 2411)

Figure 25:
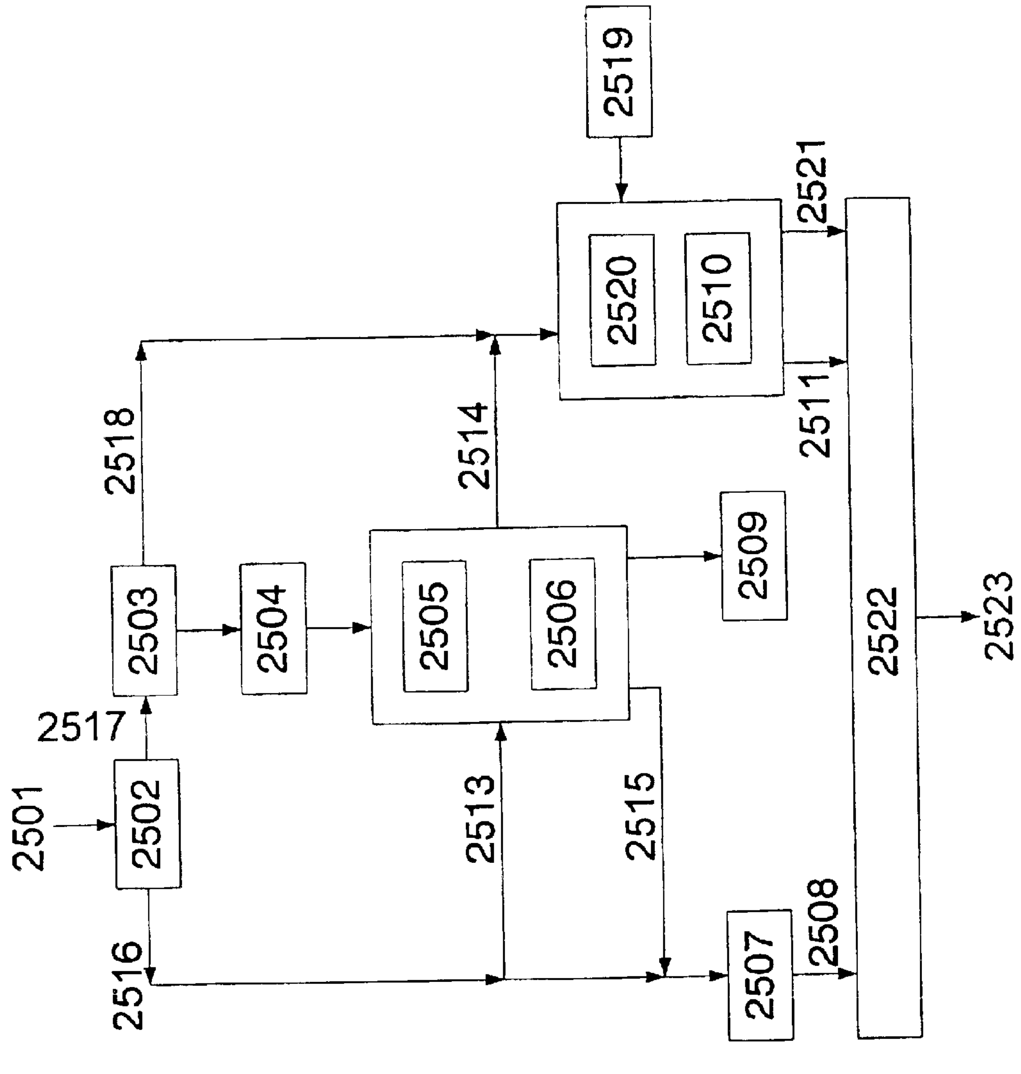

FIG. 25 illustrates an example high-level language compiler, according to an example embodiment of the present invention. This compiler has also been described in PACT13. The compiler may translate ordinary sequential high-level languages (C, Pascal, Java) to a VPU system. Sequential code (2511) may be separated from parallel code (2508) so that 2508 is processed directly in the array of PAEs.

There are three possible embodiments for 2511:

1. Within a sequencer of a PAE. (See PACT13, 2910)
2. By using a sequencer configured into the VPU. The compiler generates a sequencer optimized for the task, while directly generating the algorithm-specific sequencer code See PACT13, 2801.
3. On an ordinary external processor. (See PACT13, 3103)
4. By rapid configuration by a CT. Here the ratio between the number of PAEs within a PAC and the number of PACs may be selected so that one or more PACs can be set up as dedicated sequencers. The dedicated sequencer's op codes and command execution may be configured by the respective CT in each operating step. The respective CT may respond to the status of the sequencer to determine the following program sequence. The status may be transmitted by the trigger system. The possibility that is selected may depend on the architecture of the VPU, the computer system and the algorithm.

This principle was described generally PACT13. However, the example embodiment of the present invention may include extensions of the router and placer (2505).

The code (2501) may first be separated in a preprocessor (2502) into data flow code (2516) and ordinary sequential code (2517). The data flow code may be written in a special version of the respective programming language optimized for data flow. 2517 may be tested for parallelizable subalgorithms (2503) and the sequential subalgorithms may be sorted out (2518). Parallelizable subalgorithms may be placed and routed as macros on a provisional basis.

In an iterative procedure, the macros may be placed, routed and partitioned (2505) together with the data flow-optimized code (2513). Statistics (2506) evaluate the individual macros as well as their partitioning with regard to efficiency, with the reconfiguration time, and the complexity of the reconfiguration. Inefficient macros may be removed and sorted out as sequential code (2514).

The remaining parallel code (2515) may be compiled and assembled (2507) together with 2516. VPU object code may be output (2508). Statistics regarding the efficiency of the code generated as well as individual macros (including those removed with 2514) may be output (2509). It will be appreciated that the programmer thus receives important information regarding optimization of the speed of the program.

Each macro of the remaining sequential code may be tested for its complexity and requirements (2520). The suitable sequencer in each case may be selected from a database, which depends on the VPU architecture and the computer system (2519). The selected sequencer may output as VPU code (2521). A compiler (2521) may generate the assembler code of the respective macro for the respective sequencer selected by 2520. The assembler code may then be output (2511). 2510 and 2520 are closely linked together. Processing may proceed iteratively to find the most suitable sequencer having the fastest and minimal assembler code.

A linker (2522) may compile the assembler codes (2508, 2511, 2521) and generate executable object code (2523).

Definition of Terms

EXAMPLE

ACK/REJ: Acknowledgment protocol of a PAE to a (re) configuration attempt. ACK may indicate that the configuration has been accepted, REJ may indicate that the configuration has been rejected. The protocol may provide for waiting for receipt of either ACK or REJ and optionally inserting waiting cycles until the receipt.

CT: Unit for interactive configuration and reconfiguration of configurable elements. A CT may have a memory for temporary storage and/or caching of SubConfs. CTs that are not root CTs may also have a direct connection to a memory for SubConfs, which may not need to be loaded by a higher-level CT.

CTTREE: One-dimensional or multidimensional tree of CTs.

EnhSubConf: Configuration containing multiple SubConfs to be executed on different PACs.

Configuration: An executable algorithm

Configurable element: An element whose function may be determined by a configuration from a range of possible function. For example, a configurable element may be designed as a logical function unit, arithmetic function unit, memory, peripheral interface or bus system; this includes in particular elements of known technologies such as FPGA (e.g., CLBs), DPGAs, VPUs and other elements known under the term "reconfigurable computing." A configurable element may also be a complex combination of multiple different function units, e.g., an arithmetic unit with an integrated allocated bus system.

KW: Configuration word. One or more pieces of data intended for the configuration or part of a configuration of a configurable element.

Latency: Delay within a data transmission, which usually takes place in synchronous systems based on cycles. Latency may be measured in clock cycles.

PA: Processing array. This may include an arrangement of multiple PAEs, including PAEs of different designs.

PAC: A PA with an associated CT responsible for configuration and reconfiguration of the PA.

PAE: Processing array element, configurable element.

ReconfReq: Triggers based on a status which may require a reconfiguration.

Reconfiguration may include loading a new configuration. This loading may occur simultaneously or overlapping or in parallel with data processing, without interfering with or corrupting the ongoing data processing.

Root CT: Highest CT in the CTTREE. The Root CT may have a connection to the configuration memory. It may be the only CT so connected.

SubConf: Part of a configuration composed of multiple KWs.

WCT: The WCT may indicate the time at which a reconfiguration is to take place. A WCT may optionally select one of several possible configurations via transmission of additional information. A WCT may run in exact synchronization with the termination of the data processing underway, which may be terminated for the reconfiguration. If WCT is transmitted later for reasons of implementation, WCS may be used for synchronization of data processing.

WCP: A request for one or more alternative next configuration(s) from the CT for (re)configuration.

WCS: Stops the data processing until receipt of WCT. May need to be used if WCT does not indicate the exact time of a required reconfiguration.

Cell: Configurable element

REFERENCES

PACT01 4416881

PACT02 19781412.3 and U.S. Pat. No. 6,425,068

PACT04 19654842.2-53

PACT05 19654593.5-53

PACT07 19880128.9

PACT08 19880129.7

PAC10 19980312.9 and 19980309.9 and PCT/DE99/00504

PACT13 PCT/DE00/01869

PACT18 10110530.4

What is claimed is:

1. A method of controlling a data processing system having a cellular structure, comprising:

transmitting a first configuration word to a first processing unit in the cellular structure;

processing data with the first processing unit in accordance with the first configuration word;

transmitting a second configuration word to the first processing unit;

transmitting a reconfiguration signal to the first unit, the reconfiguration signal indicating that the first unit should begin processing data in accordance with the second configuration word;

if the first processing unit has completed processing data in accordance with the first configuration word prior to when the reconfiguration signal is received by the first processing unit, processing data with the first processing unit in accordance with the second configuration word; and if the first processing unit has not completed processing data in accordance with the first configuration word, continuing to process data with the first processing unit in accordance with the first configuration word.

2. The method of claim 1, further comprising:

if the first processing unit has completed processing data in accordance with the first configuration word prior to when the reconfiguration signal is received by the first processing unit, sending an acknowledgment signal in response to the receipt of the reconfiguration signal.

3. The method of claim 1, further comprising:

if the first processing unit has not completed processing data in accordance with the first configuration word, sending a rejection signal in response to the receipt of the reconfiguration signal.

4. The method of claim 1, wherein the reconfiguration signal is transmitted together with the second configuration word.

5. The method of claim 1, further comprising:

storing the second reconfiguration word in the first processing unit prior to the processing of data with the first processing unit in accordance with the first configuration word, wherein the reconfiguration signal is transmitted after the processing of data with the first processing unit in accordance with the first configuration word has commenced.

6. The method of claim 1, further comprising:

setting a state variable associated with the first processing unit to indicate the first processing unit is in a configured state prior to processing data with the first processing unit in accordance with the first configuration word.

7. The method of claim 6, further comprising:

setting the state variable associated with the first processing unit to indicate the first processing unit is in an unconfigured state when processing of data with the first processing unit in accordance with the first configuration word has been completed.

8. The method of claim 7, further comprising:

testing the state variable associated with the first processing unit when the reconfiguration signal is received by the first processing unit.

9. The method of claim 1, further comprising:

transmitting a differential reconfiguration signal to the first processing unit.

10. The method of claim 9, further comprising:

if the first processing unit is processing data in accordance with the first configuration word when the differential reconfiguration signal is received, terminating the processing of data by the first processing unit in accordance with the first configuration word and commencing processing of data by the first processing unit in accordance with the second configuration word.

11. The method according to claim 10, further comprising:

sending an acknowledgment signal from the first processing unit if the first processing unit is processing data in accordance with the first configuration word when the differential reconfiguration signal is received by the first processing unit.

12. The method according to claim 9, further comprising:

sending a rejection signal from the first processing unit if the first processing unit is not processing data in accordance a configuration word when the differential reconfiguration signal is received by the first processing unit.

13. The method of claim 1, further comprising:

delaying the transmission of the configuration signal, the delay being sufficient to prevent the second configuration signal from arriving at the first processing unit before the first processing unit has completed processing data in accordance with the first configuration word.

14. The method of claim 1, further comprising:

routing the transmission of the reconfiguration signal to the first processing unit via a first transmission path to the first processing unit that is longer than a shortest transmission path to the first processing unit, the first transmission path being selected so that the first transmission path is sufficiently long to ensure that the reconfiguration signal reaches the first processing unit after the processing of data by the first processing unit in accordance with the first configuration word has been completed.

15. The method according to claim 1, further comprising:

sending a start signal to the first processing unit;

beginning the processing of data in the first processing unit in accordance with the first configuration word when the start signal is received by the first processing unit.

16. A method of controlling a data processing system having a cellular structure, comprising:

transmitting a first configuration word to a first processing unit in the cellular structure;

setting a state variable associated with the first processing unit to a value indicative that the first processing unit is in a configured state;

processing data with the first processing unit in accordance with the first configuration word;

when the processing of data with the first processing unit in accordance with the first configuration word has been completed, setting the state variable associated with the first processing unit to a value indicative that the first processing unit is in an unconfigured state;

transmitting a second configuration word to the first processing unit;

transmitting a reconfiguration signal to the first unit, the reconfiguration signal indicating that the first unit should begin processing data in accordance with the second configuration word;

if the state variable indicates the first processing unit is in an unconfigured state when the reconfiguration signal is received by the first processing unit, processing data with the first processing unit in accordance with the second configuration word; and if the first processing unit is in a configured state when the reconfiguration signal is received by the first processing unit, continuing to process data with the first processing unit in accordance with the first configuration word.

17. The method according to claim 16, further comprising:

if the state variable indicates the first processing unit is in an unconfigured state when the reconfiguration signal is received by the first processing unit, sending an acknowledgment signal from the first processing unit in response to the reconfiguration signal.

18. The method according to claim 16, further comprising:

if the first processing unit is in a configured state when the reconfiguration signal is received by the first processing unit, sending a rejection signal from the first processing unit in response to the reconfiguration signal.

19. The method according to claim 16, further comprising:

transmitting a differential reconfiguration signal to the first processing unit;

if the first processing unit is in an unconfigured state when the differential reconfiguration signal is received by the first processing unit, maintaining the first processing unit in an unconfigured state; and if the first processing unit is in a configured state, processing data with the first processing unit in accordance with the second configuration word.

20. The method according to claim 19, further comprising:

sending an acknowledgment in response to the differential configuration signal, if the first processing unit is in a configured state when the differential configuration signal is received by the first processing unit.

* * * * *

UNITED STATES PATENT AND TRADEMARK OFFICE

CERTIFICATE OF CORRECTION

PATENT NO. : 7,003,660 B2 
APPLICATION NO. : 10/297959
DATED : February 21, 2006
INVENTOR(S) : Vorbach et al.

It is certified that error appears in the above-identified patent and that said Letters Patent is hereby corrected as shown below:

Column 2, line 29, change "FILMO" to --2.1 FILMO--;

Column 2, line 50, change "implict" to --implicit--;

Column 4, line 23, change "may forced" to --may be forced--;

Column 4, line 45, change "An" to --A--;

Column 4, line 48, change "not. prestored" to --not prestored--;

Column 4, line 59, change "arid" to --and--;

Column 7, line 5, change "is may be" to --may be--;

Column 7, line 15, change "may-be" to --may be--;

Column 17, line 65, change "are may be" to --may be--;

Column 25, line 20, change "bandwdith" to --bandwidth--;

Column 28, line 66, change "reque." to --request.-- and

Column 33, line 41, change "Thia" to --This--.

Signed and Sealed this

Second Day of January, 2007

JON W. DUDAS

*Director of the United States Patent and Trademark Office*